(12) United States Patent
Dao et al.

(10) Patent No.: US 12,089,137 B2
(45) Date of Patent: *Sep. 10, 2024

(54) QUALITY OF SERVICE INFORMATION NOTIFICATION TO USER EQUIPMENT, USERS, AND APPLICATION SERVER

(71) Applicant: HUAWEI TECHNOLOGIES CO., LTD., Shenzhen (CN)

(72) Inventors: Ngoc Dung Dao, Kanata (CA); Xu Li, Nepean (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/144,562

(22) Filed: May 8, 2023

(65) Prior Publication Data
US 2023/0276344 A1    Aug. 31, 2023

Related U.S. Application Data

(63) Continuation of application No. 16/586,747, filed on Sep. 27, 2019, now Pat. No. 11,678,252.
(Continued)

(51) Int. Cl.
*H04W 48/06* (2009.01)
*H04M 15/00* (2024.01)
(Continued)

(52) U.S. Cl.
CPC .......... *H04W 48/06* (2013.01); *H04M 15/66* (2013.01); *H04W 4/40* (2018.02); *H04W 8/08* (2013.01);
(Continued)

(58) Field of Classification Search
None
See application file for complete search history.

(56) References Cited

U.S. PATENT DOCUMENTS 9,559,975 B1   1/2017   Chen et al.
9,854,486 B2   12/2017  Siomina et al.
(Continued)

FOREIGN PATENT DOCUMENTS

CN    101145977 A    3/2008
CN    102307338 A    1/2012
(Continued)

OTHER PUBLICATIONS

ATandT et al: "Network DataAnalytics", 3GPP Draft; S2-171604,3rd Generation Partnership Project (3GPP), Mobilecompetence Centre ; vol. SA WG2, No. Dubrovnik, Croatia; Feb. 13, 2017-Feb. 17, 2017 Feb. 18, 2017(Feb. 18, 2017), XP051240823, total 6 pages.
(Continued)

*Primary Examiner* — Liem H. Nguyen

(57) ABSTRACT

The present invention provides methods and apparatus for notifying Quality of Service (QoS) information to User Equipment (UE), Users, and Application server. Embodiments of the present invention may analyze the network QoS and/or statistics of QoS parameters using one or more functions such as Network Data Analytics Function (NWDAF). Embodiments may also provide control plane (CP) functions which may send the QoS information to the UE depending on the UE subscription, application and/or network slice.

16 Claims, 11 Drawing Sheets

Related U.S. Application Data

(60) Provisional application No. 62/741,853, filed on Oct. 5, 2018.

(51) Int. Cl.
*H04W 4/40* (2018.01)
*H04W 8/08* (2009.01)
*H04W 24/10* (2009.01)
*H04W 28/02* (2009.01)
*H04W 80/10* (2009.01)

(52) U.S. Cl.
CPC ....... *H04W 24/10* (2013.01); *H04W 28/0268* (2013.01); *H04W 80/10* (2013.01)

(56) References Cited

U.S. PATENT DOCUMENTS

| | | | |
|---|---|---|---|
| 10,469,981 B1* | 11/2019 | Dannamaneni | G01S 19/05 |
| 10,531,365 B2 | 1/2020 | Kaur et al. | |
| 11,770,724 B2* | 9/2023 | Kim | H04W 28/02 |
| | | | 370/252 |
| 2003/0217128 A1 | 11/2003 | Yanosy | |
| 2008/0126379 A1 | 5/2008 | Jain et al. | |
| 2010/0015926 A1 | 1/2010 | Luff | |
| 2012/0046872 A1 | 2/2012 | Kuhn et al. | |
| 2012/0060198 A1 | 3/2012 | Tremblay | |
| 2012/0158949 A1 | 6/2012 | Lee | |
| 2014/0071814 A1 | 3/2014 | Landscheidt et al. | |
| 2014/0344472 A1 | 11/2014 | Lovsen et al. | |
| 2015/0207727 A1 | 7/2015 | Roy et al. | |
| 2015/0244678 A1 | 8/2015 | Stevens, IV et al. | |
| 2015/0245238 A1 | 8/2015 | Zhang | |
| 2015/0249601 A1 | 9/2015 | Tofighbakhsh | |
| 2015/0264620 A1* | 9/2015 | Timus | H04W 36/324 |
| | | | 455/440 |
| 2015/0289123 A1* | 10/2015 | Shatzkamer | H04W 4/24 |
| | | | 455/406 |
| 2015/0326461 A1* | 11/2015 | Singh | H04L 43/12 |
| | | | 709/224 |
| 2015/0381498 A1 | 12/2015 | Nomura et al. | |
| 2016/0081103 A1 | 3/2016 | Chen et al. | |
| 2016/0088509 A1 | 3/2016 | Jain et al. | |
| 2016/0277953 A1 | 9/2016 | Andersson et al. | |
| 2016/0301579 A1 | 10/2016 | Djukic et al. | |
| 2017/0215093 A1* | 7/2017 | Zhang | H04W 24/08 |
| 2017/0215094 A1 | 7/2017 | Akoum et al. | |
| 2017/0230269 A1 | 8/2017 | Kamath et al. | |
| 2017/0337394 A1 | 11/2017 | Wang et al. | |
| 2018/0054796 A1 | 2/2018 | Edge et al. | |
| 2018/0123913 A1 | 5/2018 | Zhang | |
| 2018/0204129 A1* | 7/2018 | Vasseur | H04L 12/1827 |
| 2018/0242177 A1 | 8/2018 | Wu | |
| 2018/0262924 A1* | 9/2018 | Dao | H04W 24/08 |
| 2018/0368140 A1 | 12/2018 | Centonza et al. | |
| 2019/0174466 A1* | 6/2019 | Zhang | H04L 5/0057 |
| 2019/0215235 A1 | 7/2019 | Chou et al. | |
| 2019/0215378 A1* | 7/2019 | Munishwar | H04W 4/44 |
| 2019/0222489 A1* | 7/2019 | Shan | H04M 15/8022 |
| 2019/0261199 A1 | 8/2019 | Salkintzas et al. | |
| 2020/0015034 A1* | 1/2020 | Ahn | H04W 60/04 |
| 2020/0045559 A1* | 2/2020 | Kim | H04W 28/0268 |
| 2020/0099572 A1* | 3/2020 | Peng | H04M 15/60 |
| 2020/0100070 A1* | 3/2020 | Cheng | H04W 4/08 |
| 2020/0112868 A1* | 4/2020 | Shariat | H04W 48/06 |
| 2020/0252813 A1* | 8/2020 | Li | H04W 24/08 |
| 2020/0374742 A1* | 11/2020 | Chong | H04W 72/542 |
| 2020/0404547 A1* | 12/2020 | Qiao | H04W 24/06 |
| 2021/0250251 A1* | 8/2021 | Fan | H04W 24/02 |
| 2021/0258842 A1* | 8/2021 | Fiorese | H04W 36/36 |
| 2021/0282038 A1* | 9/2021 | Li | H04W 24/08 |
| 2021/0306887 A1* | 9/2021 | Kim | H04W 24/08 |
| 2021/0337555 A1* | 10/2021 | Fan | H04L 41/40 |

FOREIGN PATENT DOCUMENTS

| | | |
|---|---|---|
| CN | 103107958 A | 5/2013 |
| CN | 104519117 A | 4/2015 |
| CN | 104598557 A | 5/2015 |
| CN | 104782168 A | 7/2015 |
| CN | 105828357 A | 8/2016 |
| CN | 105828430 A | 8/2016 |
| CN | 108322287 A | 7/2018 |
| CN | 108347748 A | 7/2018 |
| CN | 108401275 A | 8/2018 |
| EP | 2779718 A1 | 9/2014 |
| WO | 2015089802 A1 | 6/2015 |
| WO | 2018041000 A1 | 3/2018 |
| WO | 2018141093 A1 | 8/2018 |
| WO | 2018141169 A1 | 8/2018 |
| WO | 2019032968 A1 | 2/2019 |
| WO | 2020057717 A1 | 3/2020 |

OTHER PUBLICATIONS

Huawei: "Discussion about Big Data Driven NetworkArchitecture", 3GPP Draft; S2-173192-BIG Data Driven Network Architecture, 3rd Generation Partnership Project (3GPP), France, vol. SA WG2, No. Hangzhou, China; May 15, 2017-May 19, 2017 May 9, 2017 (May 9, 2017), XP051268656, total 11 pages.

3GPP TS 23.503 V15.3.0 (Sep. 2018), 3rd Generation Partnership Project; Technical Specification Group Services and System Aspects; Policy and Charging Control Framework for the 5G System; Stage 2(Release 15), 69 pages.

3GPP TR 23.791 V1.0.0 (Sep. 2018), 3rd Generation Partnership Project; Technical Specification Group Services and System Aspects; Study of Enablers for Network Automation for 5G(Release 16), 66 pages.

"System Architecture for the 5G System; Stage 2"; 3GPP TS 23.501 V15.3.0 (Sep. 2018).

"Procedures for the 5G System; Stage 2"; 3GPP TS 23.502 V15.3.0 (Sep. 2018).

"Study on architecture enhancements for EPS and 5G System to support advanced V2X services"; 3GPP TR 23.786 V0.8.0 (Aug. 2018).

3GPP TR 23.791 V0.4.0:"3rd Generation Partnership Project; Technical Specification Group Services and System Aspects; Study of Enablers for Network Automation for 5G(Release 16)", Jun. 2018, total 32 pages.

Tno, Huawei, Kpn B.V., Importance of load information exchange in energy saving. 3GPP TSG RAN WG3 Meeting #70, Jacksonville, Florida, USA, Nov. 15-19, 2010, R3-103300, 3 pages.

3GPP TR 23.791 V1.1.0 (Oct. 2018), 3rd Generation Partnership Project; Technical Specification Group Services and System Aspects; Study of Enablers for Network Automation for 5G(Release 16).

3GPP TS 23.502 V0.3.0 (Mar. 2017), 3rd Generation Partnership Project; Technical Specification Group Services and System Aspects; Procedures for the 5G System; Stage 2(Release 15), 115 pages.

3GPP TS 23.503 V15.3.0 (Sep. 2018), 3rd Generation Partnership Project; Technical Specification Group Services and System Aspects; Policy and Charging Control Framework for the 5G System; Stage 2(Release 15), 70 pages.

"Study on Architecture for Next Generation System"; 3GPP TR 23.799 V2.0.0 (Nov. 2016).

"System Architecture for the 5G System"; 3GPP TS 23.501 V0.3.0 (Feb. 2017).

3GPP TS 23.501 V0.3.1 (Mar. 2017),3rd Generation Partnership Project; Technical Specification Group Services and System Aspects;System Architecture for the 5G System; Stage 2(Release 15), total 97 pages.

Huawei, HiSilicon, Number of packet filters supported by UE. 3GPP TSG-SA2 Meeting #128Bis , Sophia-Antipolis, France, 20th Aug. 24, 2018, S2-188209, 5 pages.

* cited by examiner

QUALITY OF SERVICE INFORMATION NOTIFICATION TO USER EQUIPMENT, USERS, AND APPLICATION SERVER

CROSS-REFERENCE TO RELATED APPLICATIONS

This application claims the benefit and priority from U.S. Provisional Patent Application No. 62/741,853 filed Oct. 5, 2018, and is a continuation of U.S. patent application Ser. No. 16/586,747 filed Sep. 27, 2019, the contents of each of which are incorporated herein by reference in their entirety.

FIELD OF THE INVENTION

The present invention pertains to the field of network communication and in particular to a method and apparatus for notifying Quality of Service (QoS) information to User Equipment (UE), Users, and Application server (AS).

BACKGROUND

Applications operating on or involving user equipment (UE) utilizing a wireless communication network often require a certain QoS. According to the 3GPP Technical Specification 23.101, entitled "General Universal Mobile Telecommunications System (UMTS) architecture," the "user equipment is the equipment used by the user to access UMTS services. User equipment has a radio interface to the infrastructure. The infrastructure consists of the physical nodes which perform the various functions required to terminate the radio interface and to support the telecommunication services requirements of the users. The infrastructure is a shared resource that provides services to all authorised end users within its coverage area." In general, the UE can connect to a mobile network, such as 5G mobile network to transfer data between the application(s) running in the UE and another party, such as another UE or an application server in the data network or wireless network. A primary but non-limiting example is Vehicle-to-everything (V2X) communications, in which applications, which may operate on UEs, or in the data network, or both, can often require low-latency and/or highly reliable data transmission in order to safely operate or assist in operating motor vehicles. Vehicles may be connected to one or more Application Servers for V2X. In order to satisfy these requirements, the public land mobile network (PLMN) needs to guarantee QoS parameters during the lifetime of the PDU (Packet Data Unit) Sessions. However, the QoS parameters can be changed anytime during the lifetime of PDU Sessions for various reasons. For example, the QoS parameters may be changed when network load changes and/or the User Equipment (UE) moves to a different location in the PLMN. The PLMN may fail to provide a required QoS in some situations.

As each V2X application may have specific QoS requirements, V2X applications may have to adjust their configuration when changes to QoS occur. For some V2X applications, it is critical to be notified of a (potential) change in the delivered QoS in advance, in order to dynamically adjust its configuration in accordance with the QoS changes. Thus, in order to assist adjustment of configuration of the V2X applications in the UEs, mobile networks should provide and notify the UEs with the new QoS information that they support.

In the $3^{rd}$ Generation Partnership Project (3GPP) Technical Report (TR) 23.786 "Study on architecture enhancements for EPS and 5G System to support advanced V2X services", the issue "Enhancements to assist Application Adjustment" has been addressed in the following aspects:

what information is required as input to enable the assessment of a potential change of QoS in given areas by the 5GS;

how the 5GS may determine whether a notification about potential change in delivered QoS is necessary; and how the 5GS may communicate such information to the application in the Application Function (AF) and/or the UE.

Therefore there is a need for a method and apparatus for effectively notifying QoS information to UE, users, and application server.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for notifying Quality of Service (QoS) information to User Equipment (UE), Users, and Application server.

According to an embodiment of the present invention, there is provided a method for supporting User Equipment (UE) operation in a wireless communication network. The method includes obtaining, by a control plane function of the wireless communication network, information indicative of quality of service (QoS) for network access from a specified location and connection context information. The method includes transmitting the information or data derived from the information toward an authorized or subscribed UE. The obtaining and transmitting are performed prior to or in absence of a request by the UE for said information.

According to an embodiment of the present invention, there is provided a method supporting User Equipment (UE) operation in a wireless communication network, wherein the UE is configured for assisting driving of a vehicle. The method includes receiving, by a control plane function, a request for network QoS information from the UE, the request including a message usable for verifying that the UE, a UE application operating thereon, or both, are authorized to receive the network QoS information. The method includes, if the UE is authorized, obtaining the QoS information from a data analytics function. The method includes transmitting the QoS information or data derived from the QoS information toward the UE.

According to an embodiment of the present invention, there is provided a method for operating a UE assisting driving of a vehicle. The method includes obtaining, by the UE, long-term statistical network QoS information for locations along a vehicle route, the long-term statistical network QoS information obtained from a data analytics function. The method includes identifying a critical location along the vehicle route. The method includes requesting, by the UE, short-term network QoS information for the critical location. The UE (e.g. a software in the UE) uses the QoS information to control how the vehicle is driven.

According to an embodiment of the present invention, there is provided a method supporting User Equipment (UE) operation in a wireless communication network, wherein the UE is configured for assisting driving of a vehicle. The method includes, following establishment of a PDU session for the UE, transmitting, by an AF, an information request or a subscription request toward a data analytics function, the information request or the subscription request indicative of a request to obtain an indication of critical road segments or sub-segments, planned or predicted to be traversed by the vehicle, for which a probability of QoS levels dropping below a predetermined critical QoS threshold is higher than a predetermined probability threshold. The method includes receiving a response to the information request from the data analytics function. The method includes initiating an adjustment in operation of the UE based on the response.

According to an embodiment of the present invention, there is provided a method for supporting User Equipment (UE) operation in a wireless communication network. The method is performed by a network data analytics function (NWDAF) or another function operating in the network. The method includes obtaining travel route information for the UE, the travel route information corresponding to a planned or predicted route to be traversed by a vehicle holding the UE. The method includes obtaining QoS requirements for an application operating at least partially on the UE, the application used by the UE for said assisting driving of the vehicle. The method includes determining whether portions of the route exist for which a determined probability of failing to meet the QoS requirements is at least equal to a predetermined threshold. The method includes, when one or more of said portions of the route exist, transmitting an indication of said one or more portions of the route toward one or more of: the UE; an application in the network which cooperates with the UE for assisting driving of the vehicle; a vehicle-to-everything control function (V2XCF) operating in the network; a policy control function (PCF) operating in the network; and another function operating in the network.

According to various embodiments of the present invention, a UE provides a start point and an end point of the trip traversed by an associated vehicle and QoS requirements. The mobile network (e.g. a function operating therein) may then provide possible routes, each route has one or more road segments and associated network QoS information for each route and/or each route segment.

According to various embodiments of the present invention, a UE provides a preferred route and/or alternative routes to be traversed by an associated vehicle. The mobile network (e.g. a function operating therein) may then provide QoS information for the preferred route. The mobile network may provide alternative route and associated QoS information even if the UE does not provide alternative route(s). The mobile network may provide QoS information for alternative route if the UE provides alternative routes.

According to an embodiment of the present invention, there is provided a method for supporting User Equipment (UE) operation in a wireless communication network, the UE configured for assisting driving of a vehicle. The method is performed by a vehicle-to-everything control function (V2XCF), a policy control function (PCF) operating in the network, or another function operating in the network. The method includes obtaining and storing QoS requirements for an application operating at least partially on the UE, the application used by the UE for said assisting driving of the vehicle. The method includes determining and storing a potential QoS change notification configuration (PQCNC) indicative of network QoS information for a plurality of locations along a planned or predicted route to be traversed by the vehicle. The method includes transmitting network QoS information as defined by the PQCNC toward one or more of: the UE; an application in the network which cooperates with the UE for assisting driving of the vehicle; a network data analytics function (NWDAF) operating in the network; and another function operating in the network.

According to an embodiment of the present invention, there is provided a method supporting operation of an application interactive with a wireless communication network, wherein the application is configured for assisting driving of a vehicle. The method includes receiving, by a control plane function, a request for network QoS information from an application function operating at least part of the application. The method includes obtaining the QoS information from a NWDAF. The method includes transmitting the QoS information or data derived from the QoS information toward the application function.

According to an embodiment of the present invention, there is provided a method, including transmitting, from a UE toward a control plane function, a Quality of Service (QoS) experience report, the transmitting performed via a control plane interface and using a background data transfer service.

According to an embodiment of the present invention, there is provided a method. The method includes receiving, by a control plane function, one or more network QoS experience reports from a UE. The method includes correlating contents of the one or more network QoS experience reports with one or more of: RAN PDU Session Context comprising RAN radio transmission parameters; PDU Session context; RAN node ID; Cell ID; time of the day; and day of the week. The method includes providing, based on results of said correlating, QoS statistical data for a corresponding time, location, road segments, (R)AN node, network cell, or a combination thereof.

According to an embodiment of the present invention, there is provided an apparatus operative with a communication network and comprising a processor operatively coupled to a memory, the apparatus is configured to perform operations according to any one or more of the above-described methods. The apparatus may be operative as or within an application function, a network function, or a UE.

Embodiments of the present invention provide for method for supporting User Equipment (UE) operation in a wireless communication network, the method comprising, by a vehicle-to-everything control function (V2XCF), a policy control function (PCF) operating in the network, or another function operating in the network: obtaining QoS requirements for an application operating at least partially on the UE; determining a potential QoS change notification configuration (PQCNC) indicative of network QoS information for a plurality of locations along a planned or predicted route to be traversed by a vehicle associated with the UE; and; transmitting network QoS information as defined by the PQCNC toward one or more of: the UE; an application in the network which cooperates with the UE for assisting driving of the vehicle; a network data analytics function (NWDAF) operating in the network; and another function operating in the network. In some embodiments, a potential QoS change notification configuration (PQCNC) directs transmission of the QoS information from the NWDAF. In some embodiments, the QoS information comprises an indication of one or more critical road segments for which a determined probability of failing to meet QoS requirements is at least equal to a predetermined threshold. In some embodiments, the QoS information further comprises an indication of corresponding times at which each of the one or more critical road segments occur. In some embodiments, the QoS requirements comprise one or more QoS levels, wherein each QoS level specifies minimum requirements for a respective operating mode for assisting driving of the vehicle in a different manner. In some embodiments, the QoS information comprises an indication of one or more critical road segments for which a determined probability of failing to meet QoS requirements is at least equal to a predetermined threshold, said indication further including an indication of corresponding times at which the determined probability is expected to be at least equal to the predetermined threshold.

Embodiments of the present invention provide a network data analytics function (NWDAF) operative with a wireless communication network, the NWDAF comprising a processor operatively coupled to memory and configured to: obtain travel route information for a User Equipment (UE) in the wireless communication network, the travel route information corresponding to a planned or predicted route to be traversed by a vehicle associated with the UE; obtain QoS requirements for an application operating at least partially on the UE; determine whether portions of the route exist for which a determined probability of failing to meet the QoS requirements is at least equal to a predetermined threshold; and when one or more of said portions of the route exist, transmit an indication of said one or more portions of the route toward one or more of: the UE; an application in the network which cooperates with the UE for assisting driving of the vehicle; a vehicle-to-everything control function (V2XCF) operating in the network; a policy control function (PCF) operating in the network; and another function operating in the network. In some embodiments, the UE is configured for assisting driving of the vehicle. In some embodiments, the QoS requirements comprise one or more QoS levels, wherein each QoS level specifies minimum requirements for a respective operating mode of the application, each operating mode assisting driving of the vehicle in a different manner. In some embodiments, the operating modes comprise one or more of: fully automated driving at a high speed; fully automated driving at a low speed; remote controlled driving; and driving the vehicle in formation with one or more other nearby vehicles. The NWDAF may be further configured to obtain PDU session information for the UE.

Embodiments of the present invention provide an apparatus operating a vehicle-to-everything control function (V2XCF) or a policy control function (PCF) in a wireless communication network, the apparatus configured to: obtain QoS requirements for an application operating at least partially on a UE operating in the wireless communication network; determine a potential QoS change notification configuration (PQCNC) indicative of network QoS information for a plurality of locations along a planned or predicted route to be traversed by a vehicle associated with the UE; and transmit network QoS information as defined by the PQCNC toward one or more of: the UE; an application in the network which cooperates with the UE for assisting driving of the vehicle; a network data analytics function (NWDAF) operating in the network; and another function operating in the network. In some embodiments, a potential QoS change notification configuration (PQCNC) directs transmission of the QoS information from the NWDAF. In some embodiments, the QoS information comprises an indication of one or more critical road segments for which a determined probability of failing to meet QoS requirements is at least equal to a predetermined threshold. In some embodiments, the QoS information further comprises an indication of corresponding times at which each of the one or more critical road segments occur. In some embodiments, the QoS requirements comprise one or more QoS levels, wherein each QoS level specifies minimum requirements for a respective operating mode for assisting driving of the vehicle in a different manner. In some embodiments, the QoS information comprises an indication of one or more critical road segments for which a determined probability of failing to meet QoS requirements is at least equal to a predetermined threshold, said indication further including an indication of corresponding times at which the determined probability is expected to be at least equal to the predetermined threshold.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
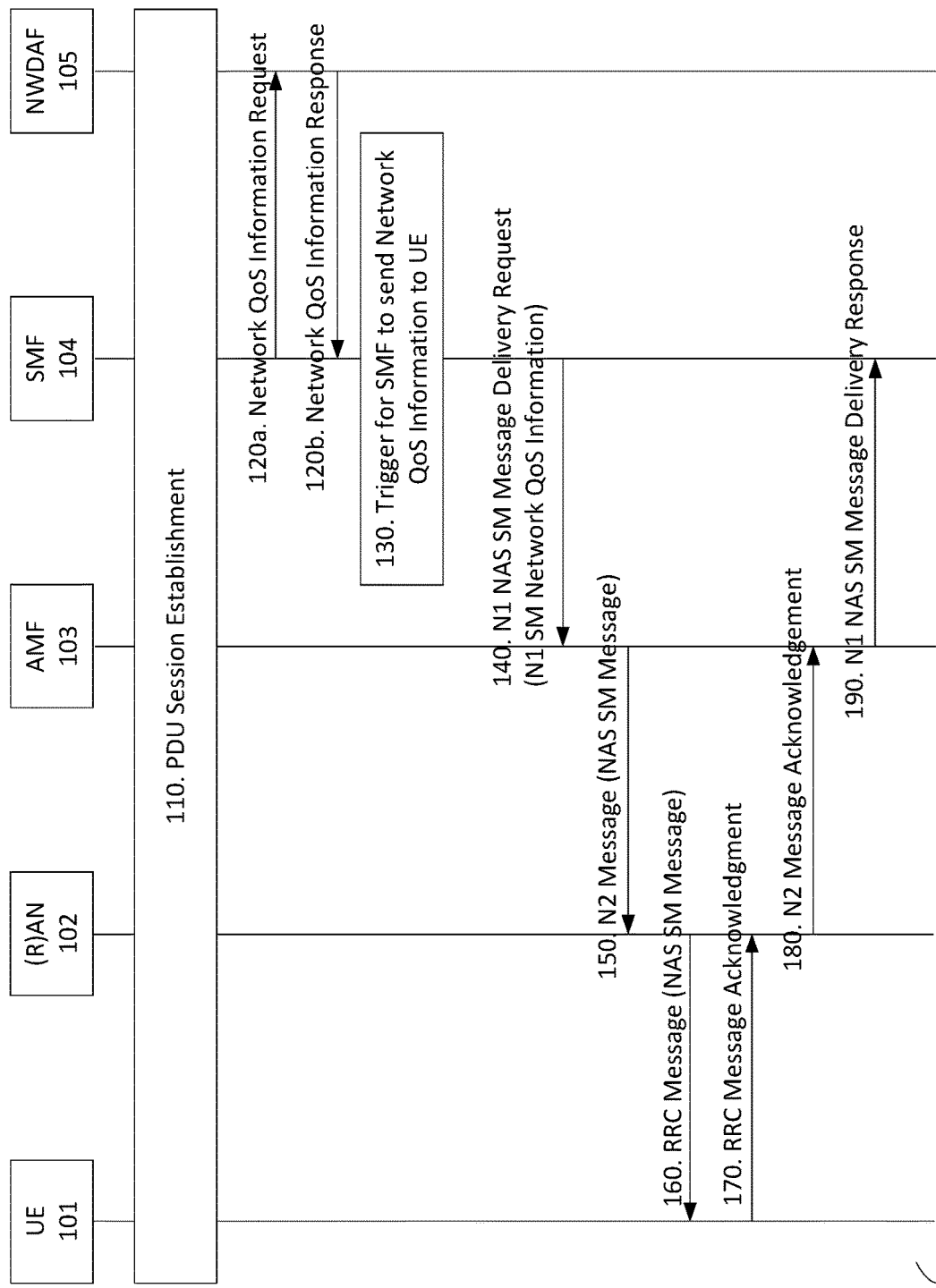
FIG. 1 illustrates, in a message flow diagram, an example of a procedure for QoS notification to User Equipments triggered by a Session Management Function, in accordance with embodiments of the present invention.

The present invention provides methods and apparatus for notifying Quality of Service (QoS) information to User Equipment (UE), Users, UE-side applications, server-side applications, Application servers, or a combination thereof. Embodiments of the present invention may analyze the network QoS and/or statistics of QoS parameters using one or more functions such as Network Data Analytics Function (NWDAF). Embodiments may also provide control plane (CP) functions which may send the QoS information to the UE depending on the UE subscription, application identifier, data network name (DNN), and/or network slice. Some, but not necessarily all embodiments, utilize a V2X Control Function (V2XCF).

Although embodiments of the present invention are primarily described in the context of a vehicle controlling or V2X scenario, it is recognized that the methods and apparatus as described herein are not necessarily limited to such applications. Indeed, embodiments of the present invention can be applied to support other applications that require certain QoS levels, such as mobile games, emergency service applications, media streaming, remote sensing or control of critical devices, industrial control, etc.

Many V2X applications require certain levels of one or more QoS parameters such as maximum flow bit rate (MFBR), guaranteed flow bit rate (GFBR), packet delay budget (PDB), packet error rate (PER). These QoS parameters may be related to specifying the V2X applications' needs with respect to their operation and ensuring that required QoS is provided. However, the QoS parameters often change during the lifetime of PDU Sessions for various reasons such as network load changes or location changes of mobile UE. In order for V2X applications to meet service requirements, the network may need to inform the UE and/or Application Server potential QoS changes in the future so that the applications (e.g. V2X applications) can reconfigure communication parameters or application operation corresponding to the network QoS changes. The applications can be multi-modal, in that they can switch to a different operating mode with lower QoS requirements when an operating mode with higher QoS requirements is not supported.

In some embodiments, the UE, or an associated application in the UE or network, obtains QoS information along a planned or predicted route, and adjusts its operation based on the QoS information, which is indicative of available quality of network service at one or more locations, at one or more geographical areas, or one or more road segments. The UE or application can then adjust its operating mode. In the case of vehicle control, the operating modes can include fully automated driving, driving by a remote operator, and training or flocking, in which multiple nearby vehicles drive in formation. As different operating modes require different QoS levels, an appropriate operating mode can be selected that is expected to be supported by current QoS with sufficiently high probability. Critical locations, such as critical road segments, can be identified and communicated toward the UE or application, indicative that a required QoS level is not available with sufficiently high probability. The probability level can depend on requirements such as safety.

An aspect of the present invention relates to providing functions in the PLMN, such as NWDAF, and analyzing predicted network QoS parameters or statistics of QoS parameters in various circumstances. For example, analysis of network QoS parameters or statistics of QoS parameters may be provided for different locations, different time periods, different applications, network slices, and/or RAT (radio access technology) types. According to embodiments, some CP functions, such as core network (CN) functions, Policy Control Function (PCF), Application Function (AF), Access and Mobility management Function (AMF), Session Management Function (SMF), V2X Control Plane functions (V2XCF), may subscribe or request for the statistical QoS information and send to the authorized UEs. Statistical QoS information may be generated based on a long-term observed history of QoS parameter variation.

In various embodiments, the authorized UEs have one or more indications, in the user subscription database stored in a storage function (e.g. Unified Data Repository (UDR) function), managed by a CP function such as Unified Data Management (UDM) function, that they are authorized to receive the network QoS information. These indications may be provided directly from the UE to CP functions (e.g. AMF, SMF, PCF, or V2XCF) or via (Radio) Access Node ((R)AN). CP functions may use these indications to determine whether the UE is authorized to receive network QoS information when the UE accesses certain mobile network services. In some circumstances, CP functions may use additional information, which may be provided by the UE or (R)AN in order to determine whether the UE is authorized to receive network QoS information. According to embodiments, whether the UE is authorized to receive network QoS information may be indicated by one or more of the following parameters: network slice information (e.g. Slice/Service type(s) (SST), Slice Differentiator(s) (SD), Single-Network Slice Selection Assistance information (S-NSSAI)), data network information (e.g. Data Network Name (DNN)), Application Identifier, UE group information (e.g. Internal Group identifier, External Group identifier), and radio access information (e.g. RAT types). The UE may be provided with a secured certificate by the AF or by the mobile network operator. If provided by the mobile network operator, the secure certificate may be pre-configured in a software in the UE that controls the communication protocol with the mobile network, or stored in the (subscriber identity module (SIM) card, or variants of SIM card such as universal subscriber identity module (USIM), Universal integrated circuit card (UICC). The UE may send the secured certificate to the CN. For example the UE may send the secured certificate as part of registration procedure as described in 3GPP Technical Specification (TS) 23.502, "Procedures for the 5G System (5GS)," clause 4.2.2.2.2, in particular step 1, or in step 6, or in step 9 or a new step. Alternatively, the UE may send the secured certificate as part of PDU Session Establishment request described in TS 23.502, clause 4.3.2, or as part of a PDU Session Modification request as described in TS 23.502, clause 4.3.3. The UE may send the secured certificate in another message when requested by a CP network function, such as AMF, SMF, PCF, V2XCF, UDM, AUSF. A function in the CN such as AUSF (Authentication Server Function), PCF, V2XCF, UDM, AMF, SMF may receive the secured certificate and provide authorization for the UE to receive network QoS information.

According to embodiments, the network QoS information may be information carried by QoS parameters. Some examples of the information carried by QoS parameters are:
value(s) of QoS parameter(s) that the mobile network or RAN may currently support;
value(s) of QoS parameter(s) that the mobile network or RAN may support in a next predetermined (or alternatively indefinite) time duration (e.g. next 10 seconds);
statistical value(s) of QoS parameter(s) such as minimum value, maximum value, average value and/or median value;
function(s) regarding distribution of QoS parameter(s) such as probability distribution function(s) and/or cumulative distribution function(s);
value(s) (statistical or otherwise) of QoS parameter(s) for one or more particular times (e.g. times of day, days of week), one or more particular locations, or both.
value(s) of QoS parameter(s) supported by the mobile network (or a radio node or a cell) with a pre-determined probability threshold (e.g. the guaranteed flow bit rate (GFBR) that the network can support delay critical QoS flows with 80% of probability); and potential for (e.g. probability of) changes in QoS parameter values to a value which is the same or different from a QoS threshold or the current QoS level(s) (e.g. At a certain area, for example an area covered by the RAN node ID 123 that covers the travel route of the UE, GFBR is currently 10 Mbps, the QoS threshold and the current QoS level may be same as the current GFBR value which is 10 Mbps, but for the time period of 7:30-8:00 pm (e.g. a few hours from now), the probability that the GFBR value may drop to 8 Mbps, which is lower than the QoS threshold or the current QoS level is 80% and the probability that the GFBR value may drop to 9 Mbps, which is also lower than the QoS threshold or the current QoS level is 90%.).

An application may require specific values of QoS parameters for communication with other entities. Some examples of QoS parameters that the application may require specific values for are MFBR, GFBR, PER, PDB, Session Aggregated Maximum Bit Rate (Session-AMBR) and Maximum Data Burst Volume (MDBV). The specific values may be specific threshold levels. According to embodiments, one or more QoS parameter values required by an application may vary depending on (the type of) operation carried by the application. In one case, an application may require a set of QoS parameter values representing high performance, for example 10 Mbps of GFBR and 10 ms of PDB, for functions such as remote driving where a person in a remote control office controls a vehicle while viewing the video signal sent from cameras mounted on the vehicle. In another case, the application may require a set of QoS parameter values representing low or medium performance, for example 1 Mbps of GFBR and 100 ms of PDB. Such set of QoS parameter values may be suitable when the application performs autonomous driving at low speed (e.g. 30 km/h) or when the mobile network does not support for high quality video bit rates which is often required by remote driving.

According to embodiments, a UE, AF and/or Application Server (AS) may request or subscribe for Network QoS Information. For that, the UE and/or AF may provide one or more of the following information to the CN: information describing the future location of the UE, mobility speed between two locations and current and/or future values of QoS parameters required by the application (e.g. MFBR, GFBR, PDB, MDBV, Session-AMBR (Aggregate Maximum Bit Rate)).

According to some embodiments, a UE, AF and/or AS may request Network QoS information for one or more travel routes. A UE, AF, or AS may request Network QoS information for one preferred travel route and alternative route(s). If the UE, AF or AS requests Network QoS Information for one travel route, the mobile network can identify alternative travel routes. The UE or AF, or AS may consider the travel distance, speed, and/or Network QoS Information for each travel route and determine which travel route to take. The UE and/or AF or AS may decide which travel to take and may inform the mobile network the selected travel route. The mobile network may reserve network resources according to the travel route of the UE.

Having regard to the information describing the planned or predicted future locations of the UE, the future locations may be provided as an ordered list. In some embodiments, the UE and/or AF may provide the moving speed between two locations and the duration (e.g. in seconds) when the UE has traveled from one location to another location. According to embodiments, information for location of the UE may be provided in various ways. For example, a location may be specified by a two-dimensional geographical point or a three-dimensional geographical point. A location may be specified by the name of the road, street or highway. A location may be specified as a road junction. In some cases, a location may be specified as a radio node ID or a cell ID of (radio) access network ((R)AN). According to some embodiments, the location information may be provided in a data container readable by a CP function of the mobile network.

According to embodiments, a CP function X (CP-X) in the CN, such as AMF, SMF, PCF, or V2XCF, may receive request for the network QoS information from a UE or AF. The CP-X function may request or subscribe for statistical QoS values which may be obtained from the QoS values that the mobile network, UEs, or AFs have previously provided to NWDAF. The CP functions may provide one or more of following information to the NWDAF:

information provided by the UE;
RAT type;
Network slice information (e.g. S-NSSAI);
Network slice instance identifier (NSI ID);
Data Network Name (DNN);
Application ID;
type of QoS flow (e.g. GBR, delay critical GBR, non-GBR);
PDU Session type (e.g. IPv4, IPv6, Ethernet, unstructured data)
whether or not there exists packet duplication;
type of packet duplication (e.g. packet duplication transmission in RAN, packet duplication transmission in the CN over N3 interface); and
current QoS parameters use.

If the CP-X function does not have one or more of the aforementioned items of information, it may collect the missing information from other CP network elements (e.g. network entities, network functions). For example, the CP-X function may collect information regarding the type or mode of the packet duplication transmission from RAN or SMF, and collect information regarding the type of QoS flow from SMF.

According to embodiments, the NWDAF may provide various QoS information to the CP-X network based on the information provided by the CP-X. Some of the QoS information provided by NWDAF may be:

statistical QoS values (e.g. minimum value, maximum value, average value and/or median value) on each road segments at specific time(s) or time period(s) of the day or on specific day(s) of the week; and
locations or road segments at specific time or time period(s) of the day or on specific day(s) of the week that the UE may experience lower QoS than the QoS threshold with a threshold probability (or confidence level) (e.g. location of a UE when the UE may experience Guaranteed Flow Bit Rate (GFBR) lower than a pre-determined threshold of 10 Mbit/s with a probability (or confidence level) equal to or greater than 80%).

FIG. 1 illustrates, in a message flow diagram, an example of a procedure 100 for QoS notification to UEs triggered by a CP-X, which is SMF, in accordance with embodiments of the present invention. At operation 110, the PDU session may be established, for example, using procedures illustrated in the 3GPP document TS 23.502, clause 4.3.2 PDU Session establishment. According to embodiments, the UDM (not shown in FIG. 1) may have information, in the subscription data for the UE 101, indicating the QoS parameters that the UE 101 may require to be notified of. Some examples of the QoS parameters that the UE may require are MFBR, GFBR, PER, PDB, Session-AMBR, MDBV for a specific network slice types (ST), S-NSSAI, DNN, RAT type, and Application Identifier. In various embodiments, the UDM may have multiple QoS level set of requirements. Each QoS level set may meet specific QoS requirements thus suitable for a particular operation mode of application(s) in the UE 101. The QoS requirements may be defined using one or more of MFBR, Session-AMBR, GFBR, PER, PDB and MDBV. For example, one QoS level set (e.g. 10 Mbps of GFBR and 10 ms of PDB) may be suitable for remote driving where a person in a remote control office controls a vehicle while viewing the video signal sent from cameras mounted on the vehicle. Another (lower) QoS level set may be suitable for fully autonomous driving at low speed (e.g. 30 km/h) when the mobile network does not support high quality video bitrates which is often required by remote driving.

According to embodiments, during the PDU Session Establishment procedure 110, the SMF 104 may use one or more of information provided by the UE 101 such as network slice information S-NSSAI, data network name DNN, and the UE 101's subscription information from UDM. The SMF 104 may use such information to decide whether the UE 101 would need network QoS information notification for PDU Session support.

Alternatively, during the PDU Session Establishment procedure 110, the PCF (not shown in FIG. 1) may use one or more of information provided by the UE 101 such as network slice information S-NSSAI, data network name DNN, and/or UE subscription information from UDM. The PCF may use such information to decide whether the UE needs network QoS Information to support PDU Session. Then, the PCF may send an indication to the SMF 104 as part of policy and charging control (PCC) rules to instruct the SMF 104 to provide network QoS information notification and indicating the statistical parameters (e.g. mean value, median value, maximum value, minimum value) of QoS parameters to be sent to the UE 101. The PCF may provide one or more QoS levels to the SMF 104. The SMF automatically handles provision of QoS information to the UE, without requiring an explicit request from the UE. It is noted that, in FIG. 1, some or all operations of the SMF can alternatively be performed by another function, such as AMF, PCF or NWDAF.

When the PDU session is established, the SMF 104, at operation 120a, may send a request for network QoS information to the NWDAF 105. The SMF 104 may include one or more of mobility pattern of UEs, location information of the UE 101, time information, Application ID, slice type, slice ID, S-NSSAI, DNN and RAT type. According to embodiments, the mobility pattern of UEs may be a list or ordered list of (R)AN node IDs and/or Cell IDs of each RAN node. The mobility pattern may be associated with a single cell ID, one or more tracking areas, one or more registration areas, and/or one or more (R)AN tracking area. The mobility pattern may be a list of road segments. According to embodiments, location information of UE 101 may be a list or ordered list of (R)AN node IDs and/or Cell IDs of each RAN node. The location information may be a single cell ID. The location information may be related to one or more tracking areas, one or more registration areas, and/or one or more (R)AN tracking areas. The location information may be one or more geographical locations in one or more road segments. According to embodiments, time information may be one or more time periods (e.g. 9:00:00-9:10:30 am). Each time period may be associated with one (R)AN node ID and/or Cell IDs, and/or road segment(s), and/or mobility pattern.

Upon receipt of the network QoS information request, the NWDAF 105, at operation 120b may provide the SMF 104 with Network QoS information according to the information provided by the SMF 104 in operation 120a.

According to embodiments, if the SMF 104 has already subscribed for network QoS information, operations 120a and 120b may be skipped. If the SMF 104 has not subscribed yet, the SMF 104 may subscribe network QoS information by sending a subscription request to the NWDAF 105 before, during, or after the PDU Session Establishment procedure (e.g. operation 101). The SMF 104 may include one or more information described in operation 120a when sending a request to the NWDAF 105 for network QoS information. When the NWDAF 105 has new network QoS information, the NWDAF 105 may send a network QoS information notification message to the SMF 104, which carries the network QoS information subscribed by the SMF 104. In some embodiments, operations 120a and 120b may be performed during the PDU Session Establishment procedure, the operation 110.

According to embodiments, during the lifetime of PDU session, there may be, at operation 130, some events that trigger the SMF 104 to send network QoS information to the UE 101.

According to embodiments, sending network QoS information to the UE 101 by the SMF 104 may be triggered when the SMF 104 receives QoS Notification Control from the (R)AN 102. The QoS Notification Control message is not shown in FIG. 1. The QoS Notification Control is described in the 3GPP document TS 23.501, "System architecture for the 5G System (5GS)," clause 5.7.2.4 Notification control. An example of notification control message sent by the (R)AN is described in the 3GPP document TS 23.502, version 15.2.0, clause 4.3.3.2 "UE or network requested PDU Session Modification (non-roaming and roaming with local breakout)". The following example is provided in the document.

(AN initiated notification control) In case notification control is configured for a GBR Flow, (R)AN sends a N2 message (PDU Session ID, N2 SM information) to SMF when the (R)AN decides the QoS targets of the QoS Flow cannot be fulfilled or can be fulfilled again, respectively. The N2 SM information includes the QFI and an indication that the QoS targets for that QoS Flow cannot be fulfilled or can be fulfilled again, respectively.

In various embodiments, some additional information may be added to the (R)AN notification control message. For example, some of QoS information may be included in the QoS Notification Control message from the (R)AN 102. The QoS notification control message may indicate that the target QoS parameters in the QoS level(s) could not be supported. The QoS notification control message may also indicate new value(s) of supported QoS parameter(s). The SMF 104 may use the information in the QoS Notification Control message or statistical value or prediction of QoS information from the NWDAF 105 to notify UE 101 of the supported value of QoS parameters and/or statistical values or predicted values of QoS parameters.

According to embodiments, the SMF 104 may send the QoS information received from NWDAF 105 to the UE 101 when the SMF 104 receives path switch request from a new serving (R)AN 102 of UE 101. The SMF 104 may receive path switch request during handover procedure. The new serving (R)AN may be also called target-(R)AN. According to embodiments, the (new) target (R)AN may send a path switch request, together with the QoS notification control message, if the (new) target-(R)AN cannot support one or more QoS flows of one or more PDU Sessions.

According to embodiments, the SMF 104 may send the network QoS information to the UE 101 when the SMF 104 receives network QoS information from the NWDAF 105 and receives an indication from the UDM and/or the PCF that requests the SMF 104 to transmit the network QoS information to the UE 101 during the PDU Session establishment procedure.

According to embodiments, when the SMF 104 receives an indication from the AF, the SMF 104 is triggered to send the network QoS information to one or more UEs or to UE Group (represented by Internal-Group ID and/or External Group ID, or TMGI, or IMGI). The SMF 104 may receive the indication from the AF via NEF and/or PCF.

Through operations 140 to 160, the SMF 104 may send the network QoS information towards UE 101 via the AMF 103. At operation 104, the SMF 104 may use an N1 Non-access stratum (NAS) session management (SM) message to carry the network QoS information notification. The SMF 104 may use a service of AMF 103 to request the AMF 103 to transfer the N1 NAS SM message towards the UE 101.

At operation 150, the AMF 103 may forward the N1 NAS SM message to the (R)AN in a N2 message.

At operation 160, the (R)AN 102 may forward the N1 NAS SM message to the UE 101 in an Radio Resource Control (RRC) message.

At operation 170, the UE 101 may acknowledge the reception of N1 NAS SM message in the RRC message received at operation 106.

At operation 180, the (R)AN 102 may forward the N1 NAS SM acknowledgement message received at operation 107 to the AMF 103.

At operation 190, the AMF 103 may forward the N1 NAS SM message received from the (R)AN 102 to the SMF 104.

According to embodiments where the SMF send the QoS notification to the UE, group context regarding network access may be created in CP functions.

Figure 2:
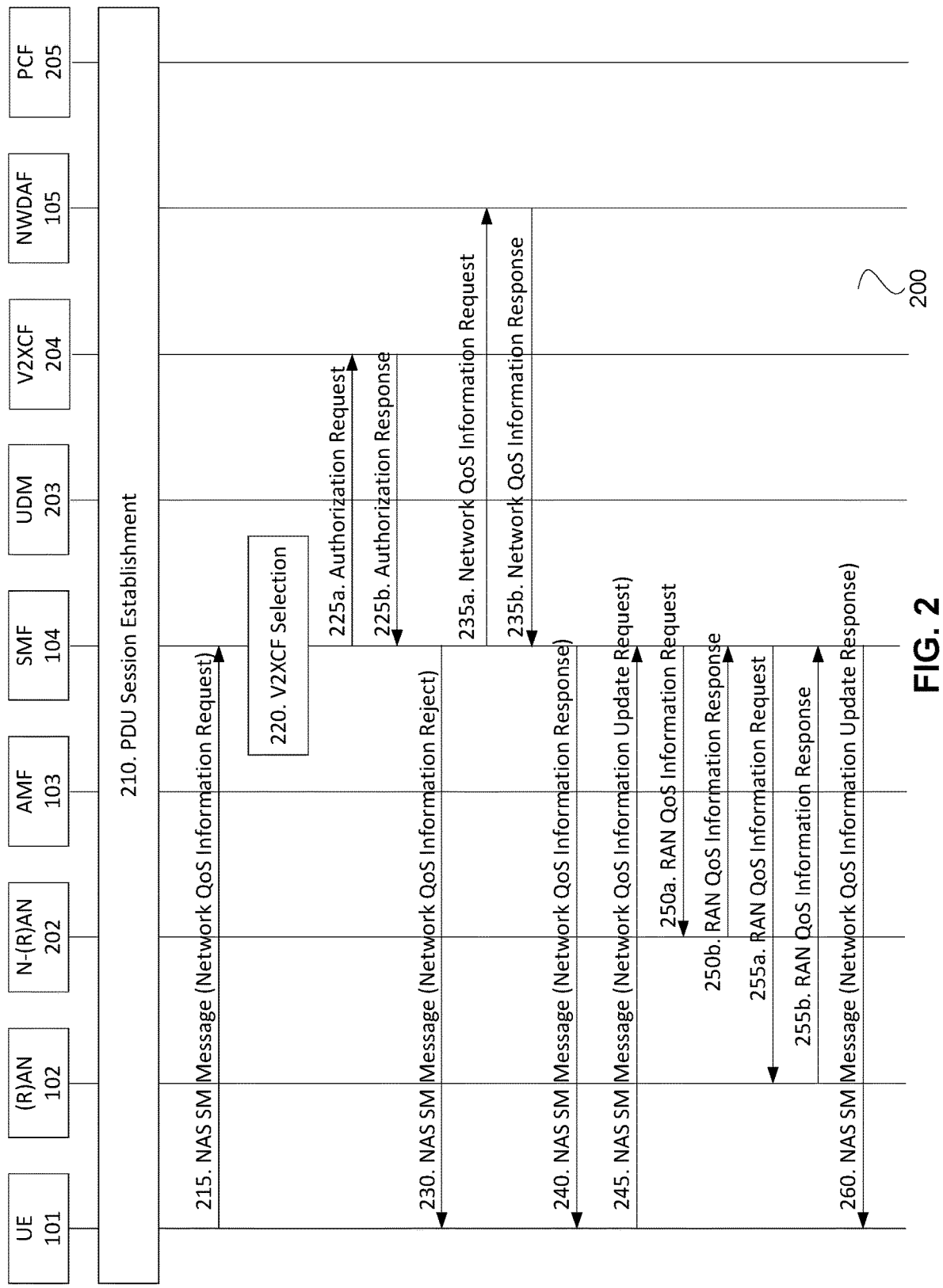
FIG. 2 illustrates, in a message flow diagram, an example of a procedure to provide statistical network QoS information and short-term QoS information to a User Equipment, in accordance with embodiments of the present invention.

FIG. 2 illustrates, in a message flow diagram, an example of a procedure 200 to provide statistical network QoS information and short-term QoS information to UE 101, in accordance with embodiments of the present invention. According to embodiments, the SMF 104 may handle the network QoS information request. The UE 101 may request for network QoS information, which may include long-term statistical QoS information and/or short-term QoS information. The short-term QoS information may be QoS information for a predetermined limited period of time (e.g. the next 10 seconds or 1 minute) from the time that the UE sends a request for short-term network QoS information, for example. Alternatively, rather than the SMF handling the information request, the AMF may perform this function. However, in this case, the AMF may be required to obtain UE information and PDU session context information from some other network functions such as SMF, (R)AN, PCF, UDM; such information may be one or more of following information: PDU Session type, duplication transmission mode in the (R)AN and core network, current QoS parameters of the PDU session and/or the UE (such as 5G QoS Identifier (5QI), UE aggregate maximum bit rate (UE-AMBR), session aggregate maximum bit rate (Session-AMBR), GFBR, MFBR, MDBV, PDB, PER), QoS levels of the application(s), and one or more information as described in step 235a.

At operation 210, the UE 101 may request PDU Session Establishment according to the procedure for example as described in the 3GPP document TS 23.502, clause 4.3.2 PDU Session Establishment. During this operation, additional information may be exchanged between network entities.

In some embodiments, the UE 101 may include in the PDU Session Request message an indication to request or subscribe for the network QoS information notification. The indication could be included in the N1 SM container. The indication could indicate the type of network QoS information that the UE 101 wants to receive, such as statistical network QoS information and/or short-term network QoS information (e.g. the predicted values of QoS parameters in a period in the future). The UE 101 may include a message that is to be sent to the V2XCF 204.

In some embodiments, the UDM 203 or PCF 205 may send an indication to the SMF 104 that the UE 101 is authorized to receive one or more of network QoS information. The UDM 203 may determine whether the UE 101 is authorized to receive one or more of network QoS information using subscription data of the UE 101. The subscription indicates whether or not the UE 101 is authorized to receive one or more network QoS information. The UDM 203 may use other information to determine whether the UE 101 is authorized to receive one or more of network QoS information. Such information may be provided by the SMF 104.

In some embodiments, the SMF 104 may use one or more information items provided by the UE 101 and AMF 103 (e.g. S-NSSAI and DNN) and the message from the UE 101 to decide whether the SMF 104 needs to request another CP function, for example the UDM 203, or AUSF (not shown in FIG. 2) or V2XCF 204, to authorize the UE 101 to receive the network QoS information. The message from the UE 101 may have an indication indicating that this message or some information elements of the message are to be sent to a function that provides authorization services, such as the V2XCF 204, for authorization purpose.

In some embodiments, the SMF 104 may send an authorization request to the V2XCF 204 (or in other embodiments, the UDM 203 or AUSF) to check whether the UE 101 is authorized to receive the network QoS information. The SMF 104 may send the message received from the UE 101. The message from the UE 101 may be intended to be sent to the V2XCF 204. Upon receiving the authorization request from the SMF 104, the V2XCF 204 may send the Authorization Response message to the SMF 104 confirming whether or not the UE 101 is authorized to receive the network QoS information.

Based on the decision made by the SMF 104 or V2XCF 204, the SMF 104 may send a message to the UE 101 to confirm whether the UE 101 is authorized to receive network QoS information.

After the PDU session establishment procedure is finished, the UE 101, at operation 215, may send a request for the network QoS information to the CN CP function. The request may be included in the NAS SM message. The CN CP function may be the SMF 104. According to embodiments, the UE 101 may include one or more of following information in the NAS SM the message.

One or more indications for the type of network QoS information—Each indication may indicate which type of network QoS information (e.g. statistical network QoS information, short-term network QoS information (e.g. predicted values of QoS parameters), or both, or one or more specific QoS parameters (i.e. a specific combination of QoS parameters, such as standardized 5QI) such as average Session-AMBR, average UE-AMBR, average GFBR, average MFBR, and average MDBV).

The UE may include a message (such as a secured certificate) that is for authorization purpose and/or to be sent to the V2XCF (e.g. V2XCF 204); PDU Session ID;

V2X Application Identifier that identifies the V2X Application used by the UE (e.g. UE 101) during this PDU Session;

V2X message to be sent to the V2XCF (e.g. V2XCF 204)— This message may carry V2X application information, such as V2X Application Identifier in the UE, so that the V2XCF can identify application type in the UE; Current UE location;

Route information which may contain the future travel route information of the UE (e.g. UE 101)—The travel route may contain road segments, moving speed of the UE in each road segment. Each road segment may be represented by the starting and end geographical locations, and name of the road (e.g. Highway Number 417). Each road segment may not consist of junctions to make sure that there is only one way to travel from the starting location to the end location.

According to embodiments, the message may be sent from the UE 101 to the SMF 104 via the current serving (R)AN (e.g. (R)AN 102) and the AMF 103.

According to embodiments, if the UE 101 was already authorized to receive the network QoS information, operations 220 to 230 can be skipped. Otherwise, the SMF 104, at operation 220, may perform a CP function selection, such as V2XCF selection operation, to select a suitable CP function for authorization, such as selecting a V2XCF instance for UE authorization. When selecting a V2XCF instance (e.g. the V2XCF 204), the SMF 104 may use the one or more of PDU Session Context information such as S-NSSAI, DNN, NSI ID, PDU Session Type, RAT type, Application ID, V2X Application ID and/or PDU Session ID. The SMF 104 may interact with Network Repository Function (NRF), by providing UE and PDU Session information to the NRF, such as one or more of following information S-NSSAI, DNN, NSI ID, PDU Session Type, RAT type, Application ID, V2X Application ID and/or PDU Session ID, so that the NEF can select the V2XCF 204, or another CP function like UDM or AUSF for UE authorization to receive network QoS information.

Once the authorization selection, such as V2XCF selection, process is completed, the SMF 104, at operation 225*a*, may send an Authorization Request message to the selected function, for example V2XCF (e.g. VCXCF 204) in this embodiment, to check whether the UE 101 is authorized to receive the network QoS information. The SMF 104 may include one or more of information in the message received from other CP functions and the UE 101, such as UE ID (e.g. SUPI (Subscription Permanent Identifier), GPSI (Generic Public Subscription Identifier)), Internal Group ID, External Group ID, PDU Session ID, IP Address of UE, Ethernet address of the UE, V2X Application ID, Application ID, S-NSSAI, DNN and RAT Type.

The V2XCF 204, at operation 225*b*, may send an Authorization Response to the SMF 104 to indicate whether or not the UE 101 is authorized to receive the network QoS information. The response sent by the V2XCF 204 may include one or more of following information:

type of network QoS information the UE (e.g. UE 101) may receive such as statistical network QoS information, short-term network QoS information (e.g. prediction of QoS parameters in a period in the future), or both;

QoS parameter(s) that the UE (e.g. UE 101) can use for its application (e.g. GFBR, MFBR, PDB, PER, MDBV);

threshold for QoS value to be notified to the UE (e.g. UE 101) with or without probability threshold for short-term network QoS information request (e.g. the GFBR threshold is 5 Mbps if the UE currently use 5 Mbps GBR QoS flow, the probability of 80% that the mobile network can support 5 Mbps GFBR); and for statistical QoS parameter(s) request, probability of potential QoS change where the QoS parameter may drop below the currently supported QoS level or another threshold value. (e.g. Currently supported GFBR is 5 Mbps and the probability of potential QoS change that the GFBR falls below 5 Mbps is 50%; currently supported PDB is 20 ms and the probability that the packet delay could be more than the threshold (20 ms) is 60%.)

If the V2XCF 204 (or another function that provides authorization functionality for network QoS information notification) indicates that UE 101 is not authorized to receive network QoS information from the V2XCF 204 in operation 225*b*, the SMF 104, at operation 230, may send a NAS SM message to the UE 101 via the AMF 103 and (R)AN 102 in order to reject the network QoS information request in operation 215.

If the request for network QoS information is accepted, at operation 235*a*, the SMF 104 may select a NWDAF 105 instance. To select a NWDAF, the SMF 104 may use local configuration in the SMF, or communicate with the NRF by providing NRF one or more of the following items of information: UE ID, S-NSSAI, NSI ID, UE location, Application ID. The NRF may send to the SMF 104 the address and/or ID of the NWDAF, such as NWDAF 105. The SMF 104 may send a Network QoS Information Request message to the selected NWDAF 105 to request for statistical or predicted network QoS information. The message may include one or more items of information in the PDU Session Context available in the SMF 104, and/or one or more items of information received in operations 215 and 225*b*. The information received in operations 215 and 225*b* may include some or all of: UE ID (e.g. SUPI, GPSI, SUCI (Subscription Concealed Identifier)), S-NSSAI, NSI ID, DNN, PDU Session type, UE Location Information, QoS parameters, current QoS parameters, QoS threshold for each QoS parameter, potential QoS change probability for QoS threshold and/or packet duplication transmission method. The message sent from the SMF 104 to the NWDAF 105 may also include the SMF 104's service area or service area identifier. The service area may include the list of RAN IDs that the SMF 104 may have connection to.

In response to the SMF 104's Network QoS Information Request message, the NWDAF 105, at operation 235*b*, may provide Network QoS Information Response to the SMF 104. The Network QoS Information Response may include one or more of the following information:

a list of (R)AN node address(es) or (R)AN node identifier(s) or cell identifier(s) (cell ID) the UE may be served along the travelling route;

a list of (R)AN node address(es) or (R)AN node identifier(s) or cell identifier(s) (cell ID) for each road segment;

a duration the UE may be served in each RAN node;
a duration the UE may travel in each road segment;
a duration the UE may travel in each (R)AN node or cell;
time information (e.g. time(s) or period(s) of the day for each road segment the UE 101 may travel);
the statistics or prediction of network QoS information in each road segment corresponding to the time information, which may be one or more of the following statistical value of each required QoS parameter—average value, minimum value, maximum value, median value, probability of potential QoS change for each required QoS parameter compared with the current value;
the statistics or prediction of network QoS information of each RAN node, or cell IDs, or group of RAN nodes, or group of cell IDs, corresponding to the time information, which may be one or more of the following statistical value of each required QoS parameter—average value, minimum value, maximum value, median value, probability of potential QoS change for each required QoS parameter compared with the current value;
time duration(s)/period(s) and specific locations along the travelling route of UE 101 associated with one or more QoS parameters that may drop below its (or their) corresponding predetermined threshold QoS values with its (or their) corresponding probability larger than or equal to probability threshold(s) (e.g. for the time period of 7:30-8:00 am, on a given road segment, the GFBR may drop below a GFBR threshold of 5 Mbps with 90% probability, and/or below a GFBR threshold of 7 Mbps with 95% probability);
time duration(s)/period(s) and specific RAN node address(es) or RAN node ID(s) and/or together with cell(s) IDs, along the travelling route of UE 101 associated with one or more QoS parameters that may drop below its (or their) corresponding predetermined threshold QoS values with corresponding probability(ies) larger than probability threshold(s) (e.g. for the time period of 7:30-8:00 am, at the area covered by the RAN node ID 123 that covers the travel route of the UE, the GFBR may drop below a GFBR threshold of 5 Mbps with 90% of probability, and/or drop below a GFBR threshold of 7 Mbps with 95% of probability); and a data container carrying one or more of the above mentioned information to be sent to the UE (e.g. UE 101).

After receiving network statistical or predicted information from the NWDAF 105, the SMF 104, at operation 240, may send one or more of network QoS information received from the NWDAF 105 to the UE 101. In some embodiments, upon receipt of the data container to be sent to UE 101 from the NWDAF 105, the SMF 104 may send this data container to the UE 101 in a NAS SM message via the AMF 103 and (R)AN 102. In some embodiments, the SMF 104 may send the UE 101 one or more network QoS information received from the NWDAF 105, and may be based on one or more of following information: the time and/or the UE's current location, future location, current road segment(s), future road segment(s), current critical road segment, future critical road segment(s). For example, if the UE 101 moves to a new RAN node or a new cell of RAN node, the SMF 104 may send the statistical or predicted network information to the UE 101 that contains statistical or predicted QoS information of this RAN node (or cell) and may be one or more other RAN nodes (or cells) that may serve the UE. According to embodiments, upon receiving the network QoS information, the application(s) in the UE 101 may adjust its operation in accordance with the received network QoS information.

Based on the statistical or predicted network QoS information received from the SMF 104, the UE 101, at operation 245, may send the SMF 104 a request for the Network QoS Information Update. The network QoS information to be updated may be short-term QoS information (e.g. prediction of QoS parameters) at a specific network location where the QoS parameters may drop below a QoS threshold with probability higher than a probability threshold. For example, if the UE 101 is approaching a specific location within the next 10 seconds and the GFBR may fall below 5 Mbps with 95% of probability, the UE 101 may send a request to the CN function(s), such as SMF 104, for short-term QoS information to be updated. Short-term QoS information may be based on actual present network conditions rather than historical statistics. When a location of potentially low QoS is identified based on historical statistical data, the UE or associated application may therefore obtain more accurate and timely QoS information. According to embodiments, the UE 101 may include one or more of following information in the request message:
current UE location which can be indicated by one or more of RAN ID, cell ID and geographical location (e.g. two-dimensional location), and road segment;
next UE location, which can be indicated by one or more of RAN ID, cell ID and geographical location(s) (e.g. two-dimensional location(s)), and road segment, for which the UE may want to know the QoS condition; and
time information including the duration for which the network QoS information may be applicable. In some embodiments, the time information may include the start time and the end time. In this case, the duration can be calculated using the start time and end time. In some embodiments, the time information may include the start time and the duration. For example, time information may be informed as "10 seconds from the current time for a period of 20 seconds".

According to embodiments, based on the route information received from the NWDAF 105 in operation 235b and/or the information provided by the UE, the SMF 104 may identify the current serving (R)AN node and/or cell ID(s) of the serving RAN node. Based on the route information, the SMF 104 may also identify the neighbor/next (R)AN (denoted N-(R)AN 202) that is anticipated to next serve the UE 101 in the future. Then, at operation 250a, the SMF 104 may send a request for the QoS information to the N-(R)AN 202, according to the time information specified/requested by the UE 101 in operation 245. By querying N-(R)AN, QoS information for a planned or predicted next location can be obtained in advance. According to embodiments, the SMF 104 may include one or more of the following information in the request:
the current QoS parameter(s) of QoS flows including one or more QoS parameters in the QoS profile (e.g. type of QoS flow (ex. GBR, delay critical GBR, non-GBR), value of QoS parameter(s) (ex. 10 Mbps of GFBR, 10 ms of PDB), (i.e. one specific QoS parameter or a specific combination of QoS parameters, such as 5QI)); and
time information as the UE requested in operation 245.
Request the N-(R)AN to reserve (R)AN resources to serve the UE's PDU Session(s) and/or QoS flow(s) by sending the current QoS profile(s) of QoS flow(s) and or PDU session(s) of the UE.

The N-(R)AN 202, at operation 250*b*, may send the SMF 104 a RAN QoS Information Response indicating one or more of following QoS condition:

- Value of QoS parameters (e.g. 10 Mbps of GFBR, 10 ms PDB);
- Statistical values of QoS parameters in the last period, for example the average GFBR of 5 Mbps, average packet delay of 8 ms for GBR QoS flows in the last 5 minutes; and
- probability that the QoS parameter may drop below the current value of QoS parameter(s). (e.g. 10% of probability that the GFBR falls below 10 Mbps. If there are multiple QoS levels in the QoS profile, the RAN QoS Information Response may include probabilities that the QoS may drop below each QoS level. For example, the GFBR may drop below 2 Mbps with 30% of probability, below 4 Mbps with 50% of probability, below 6 Mbps with 90% of probability.)

If the SMF 104 requested N-(R)AN 202 to reserve resources for one or more QoS flows of one or more PDU sessions, the N-(R)AN 202 may confirm whether the resources have been successfully reserved. If the N-(R)AN 202 is unable to reserve the resources to meet the QoS requirements, the N-(R)AN 202 may send a response to the SMF 102 indicating failure to reserve resource and/or supported value(s) of QoS parameter(s) at the current time and/or at the time the UE is expected to be served by the N-(R)AN 202.

If the SMF 104 identifies that the UE 101 is anticipated to be served by the current serving (R)AN for the time duration/period indicated in the time information at operation 245, the SMF 104, at operation 255*a*, may send a RAN QoS Information Request to the (R)AN 102. The content of the RAN QoS Information Request is the same as that in operation 250*a*. In response, the (R)AN, at operation 255*b*, may send the SMF 104 a RAN QoS information Response carrying the same information as those in operation 250*b*.

In some embodiments, depending on the time information and current UE location, and/or future UE location, the SMF 104 may perform both operations 250*a* and 255*a*. In some embodiments, depending on the time information and current UE location, the SMF 104 may perform either one of operations 250*a* and 255*a*.

Upon receiving the RAN QoS Information Response, the SMF 104, at operation 260, may send the UE 101 a NAS SM message carrying the Network QoS Information Update Response. According to embodiments, the message may contain the QoS information received from the (R)AN 101, the N-(R)AN 102, or both.

Upon receiving the network QoS information, the application in the UE 101 may adjust its operation according to the received network QoS information.

It is understood that the messages sent between the SMF 104 and (R)AN nodes 102 or 202 are transferred via the AMF 103 by using some services of the AMF 103 as shown for example in FIG. 1. Similarly, the messages sent between the SMF 104 and the UE 101 are transferred via the AMF 103 and the (R)AN 102, by using some services of the AMF 103 and signaling messages of (R)AN 102, accordingly, as shown in FIG. 1 for example.

Figure 3:
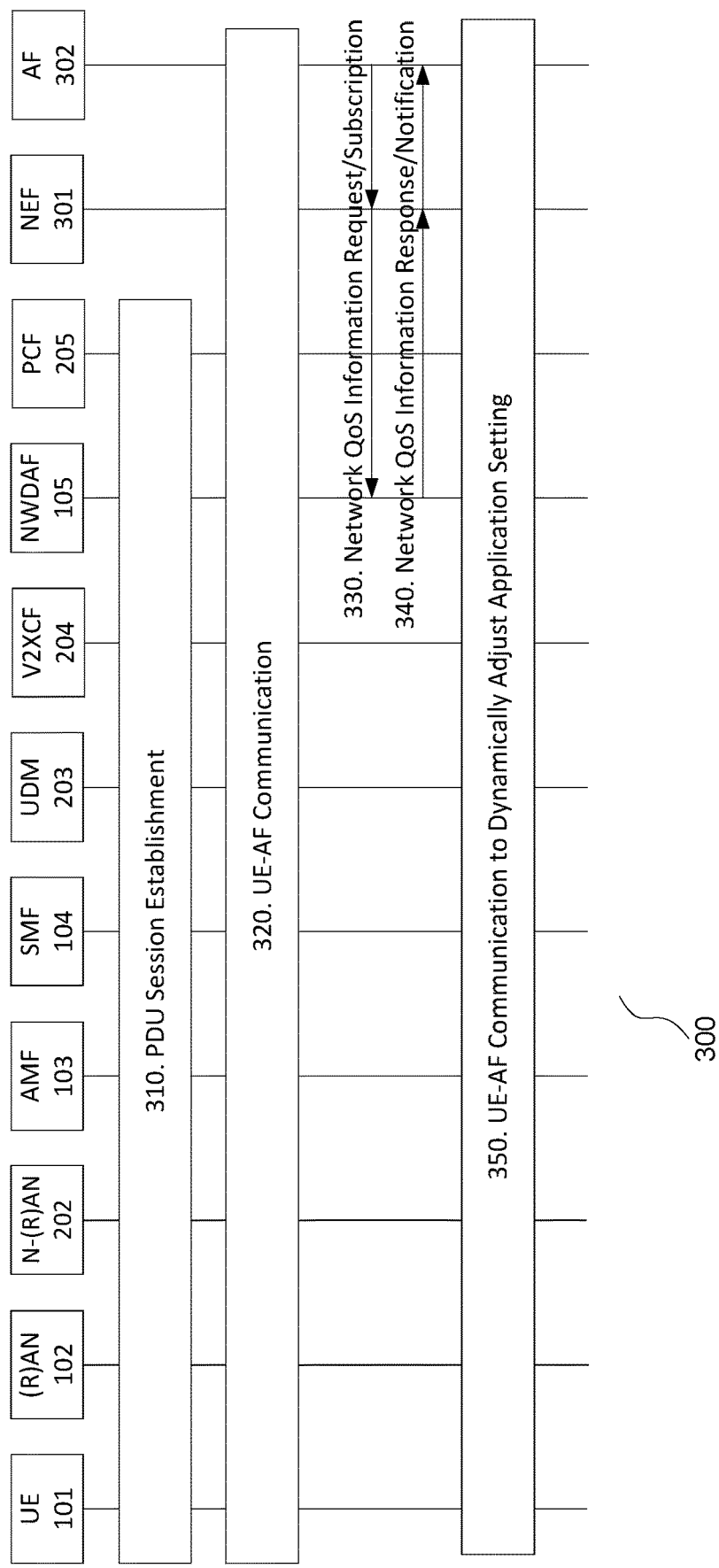
FIG. 3 illustrates, in a message flow diagram, an example of a procedure to provide network QoS to an Application Function, in accordance with embodiments of the present invention.

FIG. 3 illustrates, in a message flow diagram, an example of a procedure 300 to provide network QoS information to the AF 302, in accordance with embodiments of the present invention.

At operation 310, the UE 101 may request PDU Session Establishment for example according to the procedure for example as described in the 3GPP document TS 23.502, clause 4.3.2 PDU Session Establishment. At operation 320, the UE 100 and the AF 302 may communicate with each other using an application layer channel.

At operation 330, the AF 302 may send towards the NWDAF 105 a message for Network QoS Information Request or Subscription either directly or via the NEF 301. The message may include one or more of following information to identify the UE and/or PDU Session of the UE: S-NSSAI; DNN; UE ID (e.g. External UE ID, GPSI), External Group ID, the packet filter information (e.g. IP address(es) of the UE and/or application server, UDP/TCP ports of the UE and/or application server), QoS level for the current application; QoS levels for other applications; current geographical UE location and/or road segment; future UE location(s) and/or road segment(s); and the estimated start time and end time that the UE 101 may spend on each of the location(s) and/or road segment(s). The AF 302 may include an indication to request NWDAF to provide critical road sub-segments, where the QoS condition may fall below the lowest threshold value of QoS parameters in an application QoS level with a specified probability (e.g. 80%). The QoS levels for current and/or other applications may contain a set of QoS parameters and their values that can be supported by the mobile network according to the service level agreement (SLA) between the mobile network operator (MNO) and application service provider (ASP). If the AF 302 sends the message 330 via the NEF 301, the NEF 301 may convert the some information from the AF 302 into internal parameters that are used in the CN. For example, the AF 302 may convert the External UE ID into an internal UE ID, such as SUCI, GPSI. The AF 302 may send to the NWDAF 105 the information received from the AF 301 and/or with converted parameters.

Upon receiving the Network QoS Information Request/Subscription, the NWDAF 105, at operation 340, may perform data analytics using the input information provided by the AF 302. The NWDAF 105 may send a Network QoS Information Response to the AF 302 via the NEF 301. The response message may include the following information. For each QoS level, the NWDAF 105 may provide a probability that the QoS parameter may fall below predetermined critical QoS value in the QoS level. For each QoS level, the NWDAF 105 may provide a probability that the QoS level (it means all the QoS parameters) may not be supported. For each road segments, the NWDAF 105 may provide an indication of one or more road sub-segments for which probability(ies) that QoS parameter(s) (i.e. one or combination of QoS parameters, such as 5QI) in the QoS level dropping below the critical QoS value(s) is equal or higher than the probability threshold. In various embodiments, the probability threshold may be pre-determined by the AF 302.

The AF 302 and UE 101, at operation 350, may communicate with each other via an application layer control channel to adjust application operation, in accordance with the QoS information in the Network QoS Information Response or Notification message.

Figure 4:
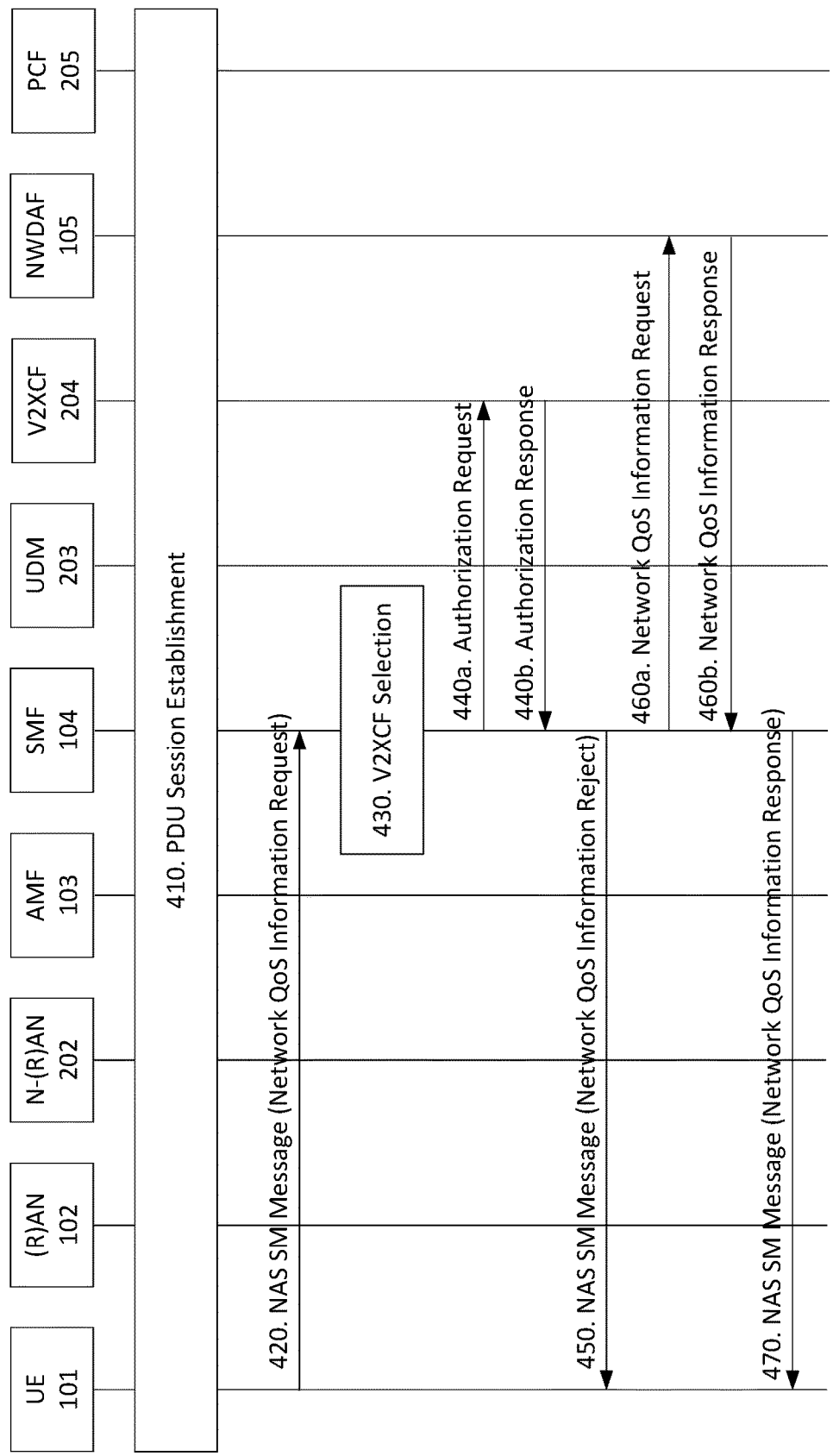
FIG. 4 illustrates, in a message flow diagram, an example of a procedure for a User Equipment to request network QoS information, in accordance with embodiments of the present invention.
Figure 5:
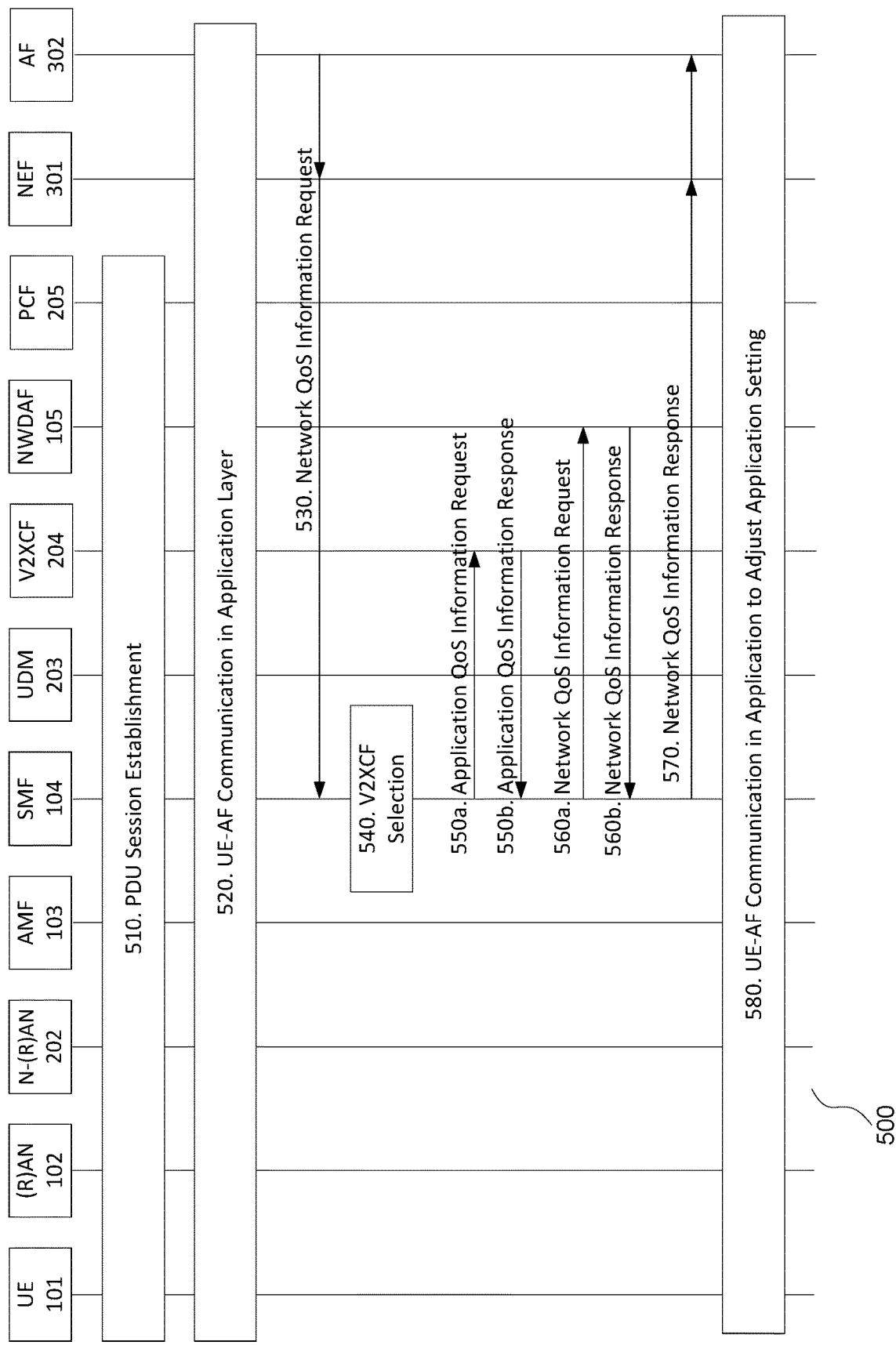
FIG. 5 illustrates, in a message flow diagram, an example of a procedure for an Application Function to request network QoS information, in accordance with embodiments of the present invention.

FIGS. 4 and 5 illustrate, in message flow diagrams, examples of the procedures for QoS information notification to UE and AF, respectively, in accordance with embodiments of the present invention.

According to embodiments, when a UE, such as the UE having V2X application running, requests a PDU Session, the mobile network may provide an initial preferred QoS level in accordance with the UE subscription and network policy. However, during the lifetime of the PDU Session, the initial QoS level may not be supported, for example due to high network load at specific times and locations. The NWDAF may perform data analysis to provide statistical and/or predicted network QoS information to the UE and/or the associated AF according to the current and future locations of the UE (in other words, the prediction of QoS parameters in the future locations). The NWDAF may need one or more of the following information in order to perform data analysis:

- the travel route information of the UE including one or multiple ordered road segments, where each road segment is described by one or more of the geographical start point and end point, the name of the road, and the estimated start time and end time (or the duration) that the UE is located on the road segment. Each road segment may or may not have any junctions there between;
- application QoS level(s), where each Application QoS level is a set of QoS requirements for an operation mode of the (V2X) application in the UE and/or the AF; and
- additional input information of the current PDU Session from the SMF, including one or more of PDU Session type (e.g. IPv4, IPv6, Ethernet), network slicing information (e.g. S-NSSAI), RAT type, DNN, Application ID, current UE location, Current QoS setting in RAN (e.g. from RAN QoS Profile for UL and DL), and whether the packet redundant transmission in the (R)AN and/or the CN is used or not.

The location of the UE may be a geographical location (for example a two-dimension (latitude/longitude) or three-dimension (latitude/longitude/altitude) coordinate) with or without an indication of an associated road segment, a RAN node ID, a cell ID, or a combination thereof.

The QoS requirements may include (or consist of) values or ranges of QoS parameters. For example, for remote driving, the QoS requirements may include that GFBR is at least 20 Mbit/s, the MFBR is 25 Mbit/s, or the GFBR is within 20-30 Mbit/s in the UL and/or in the DL. The QoS requirements may include that the PDB is 10 ms. The QoS requirements may include that the PER for a QoS flow that carries control information is 0.0001, or not higher than 0.0001, the PER for a QoS flow that carries video data is 0.01 or not higher than 0.01. The QoS requirements may include requirements for set of QoS parameters, such as the set of QoS parameters in the standardized 5QI parameters.

According to embodiments, the application in the UE and/or the AF may need to know, in advance, potential QoS changes for locations corresponding to each of the road segments at a specific time period so that the application in the UE and/or the AF can adjust its operation to accord with the network QoS condition. The network QoS information stored in a Potential QoS Change Notification Configuration (PQCNC) in a CP function, such as UDM, UDR, PCF or the V2XCF, or in the AF may be useful for applications, such as V2X applications, in the UE and/or AF. The network QoS information that may be useful for the V2X applications may be one or more of the followings:

- important QoS parameters (i.e. one or combination of QoS parameters, such as standardized 5QI parameters) such as GBR QoS Flow (e.g. GFBR, MFBR, PDB), Delay critical QoS flows (e.g. GFBR, MFBR, MDBV, PDB), Non-GBR (e.g. Average Bit Rate (ABR), session aggregate maximum bit rate (Session-AMBR));
- current value of important QoS parameters that the mobile network can support, with or without probability(ies) that the mobile network can support current value(s) of each or all important QoS parameter(s) of an Application QoS level;
- statistic(s) or prediction of the important QoS parameters (e.g. average value, median value, minimum value, maximum value, or a specific range);
- probability for which all important QoS parameters of an Application QoS level can be supported;
- probability for which the average value of each of the important QoS parameters can be supported, or not supported;
- probability for which the current value(s) of the important QoS parameters can be supported; and
- information to identify critical road sub-segment in a road segment such as critical threshold(s) of QoS parameter(s) and pre-determined probability threshold, where the critical road sub-segment is a sub-segment of a road segment for which at least one of the important QoS parameters may drop below the critical threshold of this QoS parameter with probability greater than or equal to the pre-determined probability threshold.

According to embodiments, a CP function, such as the UDM, the PCF or the V2XCF, may store Application QoS level(s) and PQCNC. Depending on the application logic, the important QoS parameters may be:

- for GBR or delay critical GBR QoS flows, one or more parameters of GFBR, MFBR, MDBV, PDB and PER; and
- for non-GBR QoS flows, one or more of the average bit rate (ABR), Session-AMBR, and PER, PDB.

According to embodiments, the UE may request for the network QoS information after PDU Session establishment. The UE may indicate which PDU Session may need to be established in order to receive network QoS information and UE travel information. A CP function, for example the PCF, AMF or the SMF serving the PDU Session, may receive and handle the UE's request for network QoS information.

According to embodiments, the CP function CP-A that receives the UE request for network QoS information, such as PCF, V2XCF, AMF, or SMF, may have the V2XCF ID, for example via local configuration. For example, the AMF may notify the SMF of the V2XCF ID during PDU Session establishment procedure. If the SMF handles the UE request of QoS network information, the SMF may communicate with the a CP function, such as UDM, AUSF, or V2XCF, in order to check whether the UE is authorized to receive the network QoS information notification and obtain V2X application information (e.g. Application QoS level(s) and PQCNC). The CP-A function, such as the SMF, may obtain and send one or more of the UE information, PDU Session information, UE travel information, Application QoS Level(s) and PQCNC to the NWDAF for data analytics. The UE travel information may include environmental information such as temperature, snow condition, rain condition, for each road segment or the whole travel route.

According to embodiments, when the NWDAF identifies one or more critical road sub-segments, the NWDAF may provide details of the critical road sub-segments, including geographic information (e.g. start and end points of road sub-segment(s) on each road segment) and time information (e.g. the start and end times (or the start time and duration) for which at least one of the important QoS parameters may drop below the critical threshold of this QoS parameter with probability greater than or equal to the pre-determined probability threshold).

According to embodiments, when the PQCNC requires the NWDAF to provide other statistical network QoS information, the NWDAF may provide this QoS information according to the PQCNC.

According to embodiments, the NWDAF may provide relevant statistical or predicted network QoS information to the CP-A function, such as SMF. Upon receiving the QoS information, the CP-A function, such as SMF, may send QoS notification to the UE, for example using a NAS SM message if the SMF handles the UE request for network QoS information.

According to embodiments, the UE may send one network QoS information request for the whole travel routes. The UE may also send one or more network QoS information requests for one or more road segments in the travel route related to a specific period time in the near future. For example, the UE may request for information about one or more road segments for a time period of 20 seconds starting 10 seconds from the current time. The UE may request network QoS information based on the actual travel speed, road condition (congestions, road maintenance, and weather condition).

According to embodiments, the AF may request network QoS information, described by the PQCNC. The AF may provide one or more of the following information: UE information (e.g. External UE ID, UE Address (IP address or Ethernet address), PDU Session ID if available); UE travel information (e.g. current location, future road segments, speed or time that the UE travels on each road segment); and Network slice information (e.g. S-NSSAI, DNN, AF-Service-Identifier). In some embodiments, the AF may optionally provide one or more of Application QoS Level(s) and PQCNC. The Application QoS Level(s) can include those corresponding to the requested bit rate. The AF may provide weather condition (e.g., rain, snow, temperature) for each road segment.

According to embodiments, the AF may send the network QoS information request to the NEF or PCF. The NEF or PCF may transmit the information included in the AF request to a CP function CP-A, for example AMF that serves the UE, or serving SMF of PDU Session. The PCF or NEF may be CP-A function. The CP-A function, such as the serving SMF, may interact with another CP function, such as the PCF, and/or the V2XCF, and/or UDM, to obtain PQCNC, if the AF does not provide the one. The CP-A function, such as the SMF, may use NWDAF services to get network QoS information and may send the network QoS information to the AF.

FIG. 4 illustrates, in a message flow diagram, an example of a procedure 400 for the UE 101 to request network QoS information, in accordance with embodiments of the present invention. According to embodiments, during the lifetime of PDU Session, the UE may send a Network QoS Information request to the CP-A function, which is the SMF in this embodiment, when the UE approaches to a new road segment.

At operation 410, the UE 101 may request a PDU Session establishment to communicate with AS and/or AF. For V2X applications, based on the information provided by the UE 101, such as S-NSSAI and/or DNN, the AMF 103 may establish an association with a V2XCF instance (e.g. V2XCF 204) if the AMF 103 has not done so. The AMF 103 may send the V2XCF ID of the selected V2XCF 204 to the SMF 104.

At operation 420, the UE 101 may request the network QoS information in a NAS SM message transmitted towards the SMF 104. In case of V2X applications, the NAS SM message may include a further message to be transmitted to the V2XCF 204 (or another CP function such as PCF or AUSF) for the purpose of authorization. The further message may be included as data within the NAS SM message, for example. The NAS SM message may also include the UE travel information including the current geographic location of the UE 101, road segments, the estimated start time and end time (or the start time and duration) that the UE 101 is planned or anticipated to travel on each road segment. The road segment may be represented, for example, by geographic the start point, the end point, and the name of the road in the map. The road segment may or may not have junction(s).

According to embodiments, if the UE 101 is already authorized to receive network QoS information, operations 430 to 450 can be skipped.

According to another embodiment, if the UE 101 is already authorized to receive network QoS information, operations 450 may be skipped.

Otherwise, operations 430 to 450 may be performed as described below.

If the V2XCF ID is not available to the SMF 104, the SMF 104, at operation 430, may perform V2XCF selection based on local configuration or information in the PDU Session Context such as S-NSSAI, DNN, Internal Group ID, UE ID (such as SUPI, GPSI, SUCI) and/or Application ID. The SMF 104 may select a suitable V2XCF instance (e.g. V2XCF 204) by interacting with the NRF or AMF (e.g. AMF 103).

At operation 440a, the SMF 104 may send an Authorization Request to the V2XCF 204. The message may include UE ID (such as SUCI, GPSI) and/or the (V2X) application message received from the UE 101. Upon receiving the Authorization Request, the V2XCF 204, at operation 440b, may send the Authorization Response to the SMF 104. The Authorization Response may indicate whether the UE 101 is authorized to receive network QoS information. If the UE 101 is authorized, the V2XCF 204 may also transmit, in the Authorization Response, Application QoS Level(s) and PQCNC of the V2X application associated with the PDU Session.

If the UE 101 is not authorized to receive the network QoS information, the SMF 104, at operation 450, may send Network QoS Information Reject message to the UE 101.

If the UE 101 is authorized to receive the network QoS information, the SMF 104, at operation 460a, may send a Network QoS Information request message to the NWDAF 105. The request message may include one or more of PDU Session information, Application QoS Level(s), PQCNC, and UE Travel Information. The PDU Session Information may include one or more of UE ID, S-NSSAI, DNN, RAT Type (e.g. 4G (e.g. LTE eNB), 5G (R)AN node (NR gNB)) Access Type (e.g. 3GPP, non-3GPP), PDU Session Type (e.g. IPv4, IPv6, Ethernet, unstructured PDU session), current QoS setting in RAN (e.g. from RAN QoS Profiles, 5QI, of PDU Session for UL and DL), and mode of redundant packet transmission in the (R)AN (the UE is connected to two (R)AN nodes simultaneously for packet duplication transmission), and/or CN UP path duplication (there are two separate UP paths over N3/N9 interfaces between the UPF(s) and (R)AN node(s)) and/or UE duplication (e.g. two UEs in one mobile device to support data transmission for 1 application).

Upon receiving the Network QoS Information request, the NWDAF 105, at operation 460b, may send the Network QoS Information response message to the SMF 104 according to the PQCNC. The Network QoS Information response message may include one or more of the followings:
- critical sub-segment(s) of the road segment, where one important QoS parameter may drop below a critical threshold where the associated probability is equal or higher than the pre-determined probability threshold;
- critical sub-segment(s) of the road segment, where the probability of the current QoS level (or default or preferred QoS level) not being supported is greater or equal to a critical probability threshold. In some embodiments, a QoS level is deemed to not be supported if one or more QoS parameters (i.e. a combination of QoS parameters, such as 5QI) may drop below their critical threshold values with a probability higher or equal a critical value associated with this QoS parameter. For example there may be two QoS parameters in the QoS level 5: GFBR=20 Mbit/s, PER=0.1%. The critical thresholds of GFBR is 15 Mbit/s, and PER=0.15%. The critical probability that the GFBR may drop below 15 MBbit/s is 30%, the critical probability that the PER may drop below 0.15% is 40%. The probability that at least GFBR drop below 15 Mbit/s or PER drop below 0.15% is 50%;
- the time period(s) that the critical road sub-segment(s) may happen according to the UE Travel Information. For example, a critical road segment between locations A and B may occur between 8:00-9:00 am, on Monday to Friday; and
- other statistical network QoS information if configured in the PQCNC.

Upon receiving the Network QoS Information response from the NWDAF 105, the SMF 104, at operation 470, may send the Network QoS Information response to the UE 101, carrying the network QoS information received from the NWDAF 105. The network QoS information may be included in a NAS SM message.

FIG. 5 illustrates, in a message flow diagram, an example of a procedure 500 for the AF 302 to request network QoS information, in accordance with embodiments of the present invention.

At operation 510, the UE 101 may request a PDU Session establishment to communicate with AS and/or AF 302. For V2X applications, based on the information provided by the UE 101, such as S-NSSAI and/or DNN, the AMF 103 may establish an association with a V2XCF instance (e.g. V2XCF 204) if the AMF 103 has not done so. The AMF 103 may send the V2XCF ID of the selected V2XCF 204 to the SMF 104.

At operation 520, the UE 101 and AF 302 may communicate with each other in an application layer.

At operation 530, the AF 302 may send a Network QoS Information request to the CN functions such as PCF 205 or NEF 301. The Network QoS Information request may include one or more of the following information: UE information (e.g. External UE ID, UE Address (IP address or Ethernet address), PDU Session ID if available); Network information (e.g. S-NSSAI, DNN, AF-Service-Identifier); AF Transaction ID, and UE Travel Information. The Network QoS Information request may optionally include one or more of Application QoS Level(s) and PQCNC.

According to embodiments, if the AF 302 sends the Network QoS Information request to the NEF 301, the NEF 301 may discover SMF 104 by using services of UDM 203. The NEF 301 may convert some information provided by the AF 302 into parameters that are used in the mobile network. For example, the NEF 301 may convert External UE ID into a UE ID, such as GPSI, SUPI, SUCI.

If the AF 302 sends the Network QoS Information request directly to the PCF 205, the PCF 205 may already have SMF ID. Once the SMF ID is identified, the NEF 301 or PCF 205 may transfer the Network QoS Information Request to the SMF 104.

The SMF 104, at operation 540, may perform V2XCF selection, especially if the V2XCF ID is not available to the SMF 104. The SMF 104 may select a suitable V2XCF instance (e.g. V2XCF 204) based on local configuration or information in the PDU Session Context such as S-NSSAI, DNN and/or Application ID, PDU Session Type. The SMF 104 may select a suitable V2XCF instance (e.g. V2XCF 204) by interacting with the NRF (not shown in FIG. 5) or AMF (e.g. AMF 103).

At operation 550a, the SMF 104 may send an Application QoS Information Request to the V2XCF 204. The message may include UE ID (such as SUPI, GPSI, SUCI) and/or the (V2X) application message received from the UE 101. Upon receiving the Application QoS Information Request, the V2XCF 204, at operation 550b, may send the Application QoS Information Response to the SMF 104. The Application QoS Information Response may include Application QoS Level(s), and PQCNC of the V2X application associated with the PDU Session.

The SMF 104, at operation 560a, may send a Network QoS Information request (or subscription) message to the NWDAF 105. The request message may include one or more of PDU Session information, Application QoS Level(s), PQCNC, and UE Travel Information. The PDU Session Information may include one or more of S-NSSAI, DNN, RAT Type, PDU Session Type, current QoS setting in RAN (from RAN QoS Profiles of QoS flows of PDU Session for UL and DL), and mode of redundant packet transmission in the (R)AN and/or CN.

Upon receiving the Network QoS Information request (or subscription), the NWDAF 105, at operation 560b, may send the Network QoS Information response (or notification) message to the SMF 104 according to the PQCNC. The Network QoS Information response message may include one or more of the followings:
- critical sub-segment(s) of the road segment according to the criteria to identify critical road segment (or sub-segment) in the PQCNC;
- the time period(s) that the critical road sub-segment(s) may be or may be not traversed (or may be in their critical, i.e. low QoS status) according to the UE Travel Information, depending on the PQCNC; and
- other statistical network QoS information if configured in the PQCNC.

Upon receiving the Network QoS Information response (or notification) from the NWDAF 105, the SMF 104, at operation 570, may send the Network QoS Information response towards the AF 302 directly, or indirectly via the NEF 301, or indirectly via the PCF 205 and then NEF 301. If the SMF 104 sends the Network QoS Information to the AF 302 via the NEF 301, the SMF 104 may include the AF Transaction ID, UE ID (such as SUPI, SUCI, GPSI) and Network QoS Information. The NEF 301 may convert some network parameters into parameters that the AF 302 can readily process. For example, the NEF 301 may convert the UE ID (SUPI) into GPSI or External UE ID.

At operation 580, the AF 302 and UE 101 may communicate with each other to adjust application setting, in accordance with the received Network QoS Information.

According to embodiments, the procedures illustrated above in FIGS. 4 and 5 have several impacts on existing network entities and interfaces such as UE, AF, SMF, V2XCF and NEF. In various embodiments, the procedures illustrated above in FIG. 4 and have impacts on UE. The UE can request network QoS information; provide UE Travel Information in a data container; and/or utilize network QoS information for application operation. The V2X UE can provide V2X message for V2X network QoS information authorization.

In various embodiments, the procedures illustrated above in FIGS. 4 and 5 have impacts on AF. The AF can request and utilize network QoS information. The V2X AF can provide UE Travel Information in a data container.

In various embodiments, the procedures illustrated above in FIGS. 4 and 5 have impacts on SMF. The SMF can handle network QoS information requests from the UE and AF; select a V2XCF and request authorization for network QoS information from V2XCF for V2X applications. The SMF can request network QoS information from the NWDAF.

In various embodiments, the procedures illustrated above in FIGS. 4 and 5 have impacts on V2XCF. The V2XCF may provide authorization for V2X UEs to receive network QoS information, Application QoS Levels of V2X applications, PQCNC including types of useful information useable by V2X applications, or a combination thereof.

In various embodiments, the procedures illustrated above in FIGS. 4 and 5 have impacts on NEF. The NEF may provide SBA service for the AF to request network QoS information, discover serving SMF of PDU Session, transfer AF information to the SMF, or a combination thereof.

Figure 6:
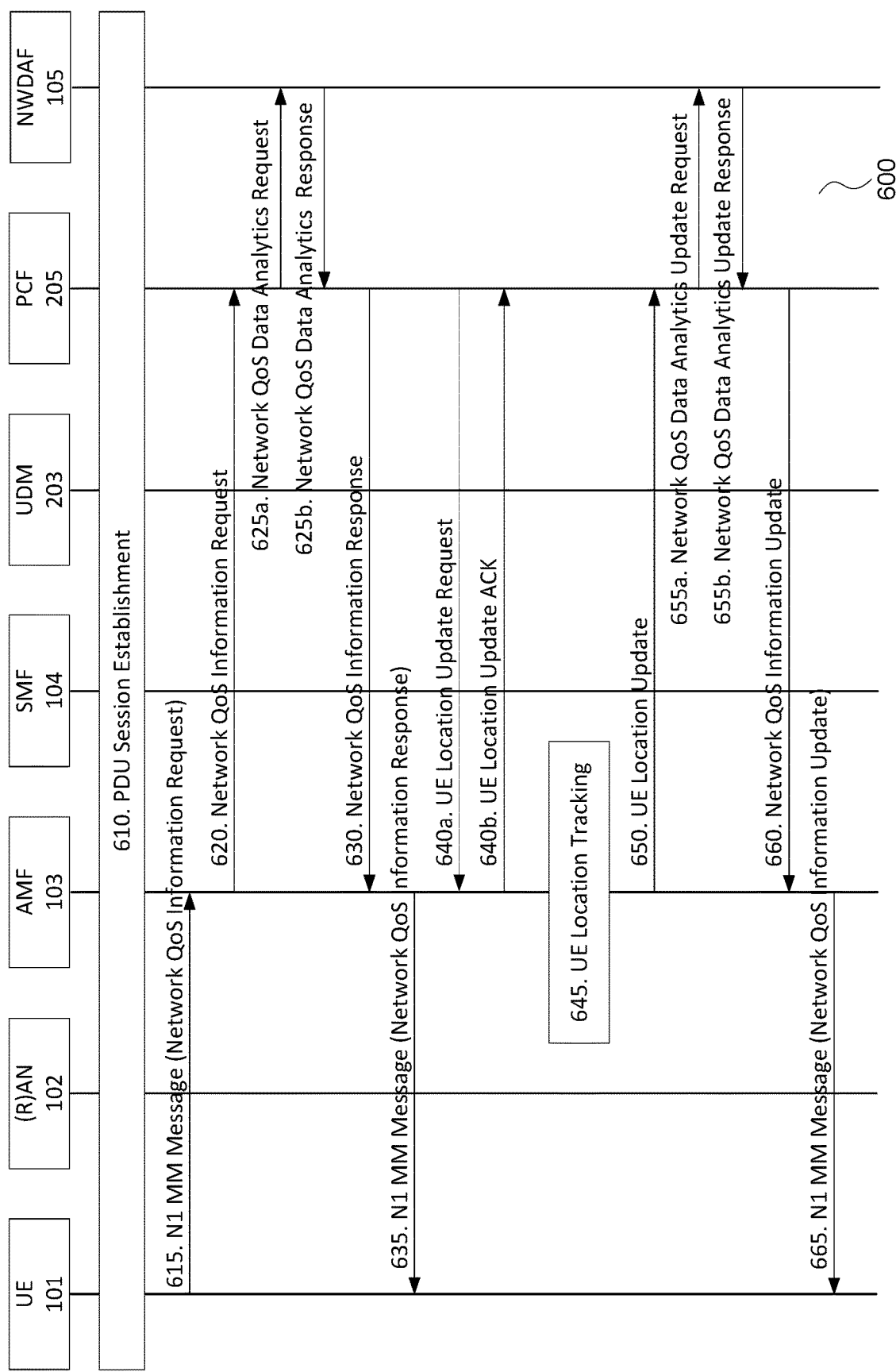
FIG. 6 illustrates, in a message flow diagram, an example of a procedure for a User Equipment to request network QoS information, in accordance with embodiments of the present invention.
Figure 7:
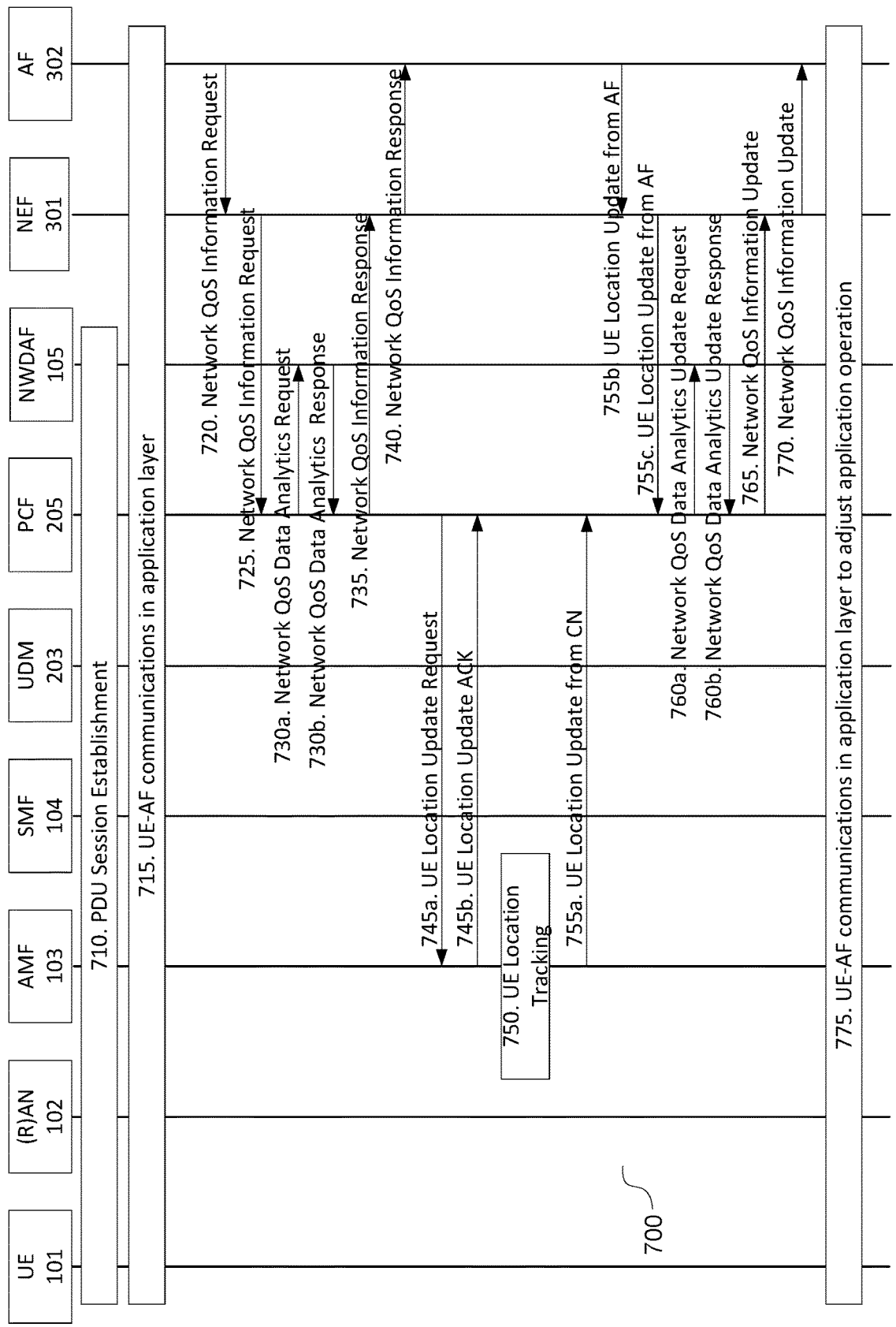
FIG. 7 illustrates, in a message flow diagram, an example of a procedure for an Application Function to request network QoS information, in accordance with embodiments of the present invention.

FIGS. 6 and 7 illustrate, in message flow diagrams, other examples of the procedures for QoS information notification to UEs and AF, respectively, in accordance with embodiments of the present invention. Notably, these embodiments do not necessarily involve a V2XCF, and so may be particularly applicable to network scenarios which omit same. Instead, the functionalities formerly performed by the V2XCF may instead be performed by one or more other functions in the core network, such as the PCF, UDM, and AUSF. For example, the application authorization functionality, such as for V2X application authorization to receive Network QoS Information, may be embedded in functions such as the UDM.

According to embodiments, when a (V2X) UE requests a PDU Session, the mobile network may provide an initial preferred QoS level according to the UE subscription and network policy. However, during the lifetime of PDU Session, the initial QoS level may be not supported due to high network load at specific times and locations. The NWDAF may perform data analytics to provide statistical network QoS information to the UE and/or associated AF according to the current and future geographical locations of the UE. The NWDAF may need one or more of the following information in order to perform data analysis:

the travel route information of the UE including one or multiple ordered road segments, where each road segment is described by one or more of the geographical start point and end point with or without any junctions therebetween, the name of the road, and the estimated start time and end time (or the start time and duration) that the UE is located on the road segment;

application QoS level(s), where each Application QoS level is a set of QoS requirements for an operation mode of the (V2X) application in the UE and/or the AF; and additional input information of the current PDU Session from the SMF, including one or more of PDU Session type (e.g. IPv4, IPv6, Ethernet), network slicing information (e.g. S-NSSAI), RAT type, DNN, Application ID, current UE location, Current QoS setting in RAN (e.g. from RAN QoS Profile for UL and DL), and whether the packet redundant transmission is used or not.

According to embodiments, the mobile network may provide Network QoS Information for the travel route of the UE. The mobile network may provide Network QoS Information for one or more possible alternative travel route(s) the UE may take. Such alternative travel route(s) may offer the same, or different, or better QoS (for example the same or higher average GFBR), and/or offer the same, or different, or more reliable QoS (for example the probability that the GFBR may drop below a critical threshold is the same or smaller). Such alternative travel route(s) may have more, or have less or no critical road segment(s) compared to the travel route that UE provided.

According to some embodiments, the UE or AF may provide one or more alternative travel routes between the start and end points of the UE trip. The mobile network may provide Network QoS Information for all the alternative routes and the UE and/or the AF may decide which route the UE will travel. The UE or AF may notify the mobile network which route the UE shall take.

According to some embodiments, the UE or AF may provide start location (start point) and end location (end point) of the trip without detailed road segments between the start location and end location. The UE or AF may request the mobile network to provide one or more routes between the start location and end location, and Network QoS Information for each route. The UE may indicate a maximum number of alternative routes the mobile network need to identify. The mobile network may provide Network QoS Information for one or more alternative routes between the start location and end location. Each route may have one or more road segments. The mobile network may provide Network QoS Information for each route and/or Network QoS Information for each road segment of each route. The UE or the AF may decide which route the UE will travel. The UE or the AF may notify the mobile network which road segments the UE may travel.

According to some embodiments, the UE or AF may provide one or more alternative road segments between a start point and an end point of the UE trip. The mobile network may provide Network QoS Information for all the alternative road segments. The UE or the AF may decide which route the UE will travel. The UE or the AF may notify the mobile network which road segments the UE may travel.

According to embodiments, the application in the UE and/or the AF may need to know, in advance, potential QoS changes in each of the road segments at specific times so that the application in the UE and/or the AF can adjust its operation to accord with the network QoS condition (e.g. by implementing a lower-demand mode). The network QoS information stored in a Potential QoS Change Notification Configuration (PQCNC) in the V2XCF may be useful for V2X applications in the UE and/or AF. The network QoS information that may be useful for the V2X applications may be one or more of the followings:

important QoS parameters such as GBR QoS Flow (e.g. GFBR, PDB), Delay critical QoS flows (e.g. GFBR, MDBV, PDB), Non-GBR (e.g. Average Bit Rate (ABR));

statistic(s) of the important QoS parameters (e.g. average value, median value); probability for which all important QoS parameters of an Application QoS level can be supported;

probability for which the average value of each of the important QoS parameters can be supported, or not supported;

probability for which the current value(s) of the important QoS parameters can be supported; and information to identify critical road sub-segment in a road segment such as critical thresholds of QoS parameters and pre-determined probability threshold, where the critical road sub-segment is a sub-segment of a road segment for which at least one of the important QoS parameters (or a combination of QoS parameters, such as standardized 5QI parameter) may drop below the critical threshold of this QoS parameter with probability greater than or equal to the pre-determined probability threshold.

According to embodiments, the PCF may store Application QoS level(s) and PQCNC. Depending on the application logic, the important QoS parameters may be:

for GBR or delay critical GBR QoS flows, one or more of GFBR, MFBR, MDBV, PDB and PER, and a combination of QoS parameters, such as 5QI; and for non-GBR QoS flows, one or more of the average bit rate (ABR) and PER, and a combination of QoS parameters, such as 5QI.

According to embodiments, the UE may request for the network QoS information after PDU Session establishment. The UE may indicate which PDU Session may need to be established in order to receive network QoS information and UE travel information. The PCF may receive and handle the UE's request for network QoS information.

According to embodiments, the UE may be implicitly authorized to receive the network QoS information based on UE subscription information in the UDM. The UE may also be implicitly authorized to receive the network QoS information for a specific PDU Session after the PDU Session is established. The PCF may send the network QoS information to the UE during the lifetime of PDU Session.

According to embodiments, the PCF may store additional information in the PQCNC. The additional information stored by the PCF may be one or more of the followings:

one or more indications whether the UE can request for network QoS information (e.g. When in pull mode: The CN may send network QoS information to UE when the UE route information is available in the CN functions (e.g. PCF, AMF));

one or more indications as to whether the network can automatically send the network QoS information to the UE (e.g. when in push mode, the CN may send network QoS information to UE when the UE sends request for network QoS information and provide UE route information);

the frequency that the UE may receive the network QoS information (e.g. every X seconds);

events that the UE may send request for network QoS information or may want to receive the network QoS information—some examples of such events may be:

after handover, when the AMF (or SMF) sends the new location of the UE to the PCF, when the UE is located near critical road sub-segments, and when the UE is moving towards critical road sub-segments; and UE travel route information which may be updated when UE or AF provides route information.

Whether the UE may take an alternative travel route, or alternative road segment that may avoid critical road segment(s), or to avoid critical road sub-segment(s), and/or have more, and/or have less critical road segments and/or sub-segments.

According to embodiments, the PCF may collect PDU Session information from the SMF. The PCF may send the PDU Session information, UE route information, Application QoS Level(s), PQCNC to the NWDAF. According to embodiments, the PCF may send network QoS information to the UE based on PQCNC.

According to embodiments, when the NWDAF identifies one or more critical road sub-segments, the NWDAF may provide details of the critical road sub-segments, including geographic information (e.g. start and end points of road sub-segment(s) on each road segment) and time information (e.g. the start and end times for which at least one of the important QoS parameters may drop below the critical threshold of this QoS parameter with probability greater than or equal to the pre-determined probability threshold). The NWDAF may provide alternative travel route(s) or alternative road segment(s) that offer different (better or worse), or the same or better QoS, and/or offer the same, or different, or more reliable QoS, and/or have the same, or different (more, or less), or no critical road segment(s) or sub-segment(s).

According to embodiments, when the PQCNC requires the NWDAF to provide other statistical network QoS information, the NWDAF may provide this network QoS information to the PCF.

According to embodiments, the NWDAF may provide relevant statistical and/or predicted network QoS information to the PCF. Upon receiving the QoS information, the PCF may send the network QoS notification to the UE using a control plane message.

According to embodiments, the UE may send one network QoS information request for the entire travel route. The UE may also send one or more network QoS information requests for one or more road segments in the travel route related to a specific period time in the near future. For example, the UE may request for information about one or more road segments for a time period of 20 seconds starting 10 seconds from the current time. As such, the UE may schedule acquisition of one or a plurality of short-term and up-to-date QoS reports which arrive on an as-needed basis. The UE may transmit an indication to request the mobile network to find alternative route(s) or road segment(s) that have the same or better QoS, and/or have the same, or different, or more reliable QoS, and/or have the same, or different, or fewer or no critical road segment(s) or sub-segment(s). In this way, the UE or the application in the UE may select the best travel route, considering the travel distance, travel time, weather condition, and network communication support.

According to embodiments, the AF may request network QoS information, described by the PQCNC. The AF may provide one or more of the following information: UE information (e.g. External UE ID, UE Address (IP address or Ethernet address), PDU Session ID if available); UE travel information (e.g. one or more of following information: start location and end location, time the UE start travelling, current location, future road segments, speed or time duration that the UE may travel on each road segment (or start and end times, or start time and duration the UE may travel on each road segment)); and Network slice information (e.g. S-NSSAI, DNN, AF-Service-Identifier). In some embodiments, the AF may optionally provide one or more of Application QoS Level(s) and PQCNC. The AF may indicate the mobile network could find alternative route(s) or road segments that have better QoS, and/or the same or more reliable QoS, and/or having the same, or different, or fewer or no critical road segment(s) or sub-segment(s) (e.g. with sufficient QoS or greater than a threshold probability of having sufficient QoS). In this way, the AF and/or the UE or the application in the UE may select the best (or sufficiently good) travel route, considering the travel distance, travel time, environmental (weather) conditions, travel cost, and network communication support.

According to embodiments, the AF may send the network QoS information request to the PCF either directly or via NEF. The PCF may obtain network QoS information using NWDAF services and send the network QoS information to the AF.

FIG. 6 illustrates, in a message flow diagram, an example of a procedure 600 for the UE 101 to request network QoS information, in accordance with embodiments of the present invention. During the lifetime of PDU Session, from time to time, when the UE approaches a new road segment, the UE may send a Network QoS Information request to the CN.

At operation 610, the UE 101 may request a PDU Session Establishment to communicate with the AS/AF. The subscription data of the UE 101 in the UDM 203 may indicate whether the UE 101 is authorized to request network QoS information for some certain application(s) (e.g. indicated by Application ID), for some UE ID(s) and/or Internal Group ID(s), for one or more DNNs. The AMF 103 may receive authorization for the UE 101 to request network QoS information. The AMF 103 may receive the authorization during UE Registration procedure or during the operation 610.

According to embodiments, if the UE 101 is authorized to receive network QoS information, the AMF 103 may send the PCF ID to the SMF 104. Upon receiving the PCF ID, the SMF 104 may select the PCF 205 with PCF ID provided by the AMF 103 as specified for example in the 3GPP document TS 23.501, clause 6.3.7.1. In this way, the same PCF (e.g. PCF 205) may be selected by the AMF 103 and SMF 104 to simplify the information exchanges in CP functions.

According to embodiments, if the UE 101 is authorized to receive the network QoS information for the PDU Session, the SMF 104 may send PDU Session Context to the PCF 205 when the SMF 104 performs SM Policy Association Establishment procedure as defined for example in the 3GPP document TS 23.502, clause 4.16.4. In various embodiments, the PDU Session Context may include information as currently specified in the 3GPP document TS 23.502, clause 4.16.4. Some example of the information to include may be SUPI, PDU Session id, PDU Session Type, DNN, Access Type, AMF instance identifier (if available), the IPv4 address and/or IPv6 network prefix, PEI, User Location Information, UE Time Zone, Serving Network, RAT type, Charging Characteristics, Session AMBR, default QoS information (UL and DL), and Internal Group Identifier (as specified for example in the 3GPP document TS 23.501 [2], clause 5.9.7). In various embodiments, the PDU Session Context may further include one or more of additional information such as mode of redundant packet transmission and GPSI.

Upon the PDU session establishment, the UE 101, at operation 615, may transmit a NAS message (such as N1 mobility management (MM) message) including a network QoS information request to the AMF 103. The N1 MM message may include UE Route Information, which may include one or more of following information: current geographic location of the UE 101, the start point and end point of the trip without detailed road segments, the start point and end point of the trip with detailed road segments between the start point and end point, time the UE start travelling, road segments, estimated start time and end time (or start time and duration) that the UE 101 is planned or anticipated to travel on each road segment. In some embodiments, each road segment may be represented by geographic start point and end point, by the name of road in the map, (R)AN node ID, cell ID, or a combination thereof. In some embodiments, the UE may send one preferred route and alternative routes. In some embodiments, the UE may send one travel route and an indication to request the mobile network to identify one or more alternative routes in which the mobile network may provide the same, or different, or better QoS, and/or the same, or different, or more reliable QoS, and/or have the same, or different, or less or no critical road segments or road sub-segments.

According to embodiments, in case that the UE 101 is not authorized to receive the network QoS information, the AMF 103 may send a reject message to the UE 101. In such cases, the remaining operations in the procedure 600 can be skipped.

According to embodiments, in case that the UE 101 is authorized to receive the network QoS information, the AMF 103, at operation 620, may forward the request of the UE 101 to the PCF 205.

The PCF 205, at operation 625a, may send a request to the NWDAF 105 for Network QoS Data Analytics information. The request sent by the PCF 205 may include one or more of Data Analytics Request ID, UE Route Information, indication to request the network to find alternative route, Application QoS Level(s), PDU Session Context information, and PQCNC.

In response to the request for network QoS Data Analytics information, the NWDAF 105, at operation 625b, may send the PCF 205 a response including Network QoS Data Analytics information. If the NWDAF 105 identify any critical road sub-segment of the road segment(s), the NWDAF 105's response may include critical road sub-segment(s) of the road segment and associated probability for which at least one of the important QoS parameters may drop below the critical threshold of this QoS parameter with probability greater than or equal to the pre-determined probability threshold. The response may also include time period(s) that one or more important QoS parameters are anticipated to drop below the critical threshold of this QoS parameter at the critical road sub-segment(s) with probability greater than or equal to the pre-determined probability threshold, according to the UE travel information. The response may also include one or more statistical network QoS information if configured in the PQCNC. The NWDAF 105 may provide one or more routes between start location and end location, or alternative road segments. For each alternative route or road segment, the NWDAF 105 may include Network QoS Information as requested in the PQCNC. The alternative route or road segment may have the same, or different, or better network QoS support, for example better QoS (e.g. higher GFBR), more reliable QoS (higher probability to support a value of important QoS parameter or QoS level), or less or no critical road segments. In some scenarios, the NWDAF 105 may include alternative route(s) that have poorer QoS support (e.g. lower average GFBR and/or with higher probability that the average GFBR may be not supported). The alternative routes could be shorter to reduce the total travel time.

Upon receiving the network QoS Data Analytics information response, the PCF 205, based on PQCNC, may decide whether to send network QoS information towards the UE 101 and which network QoS information to send to the UE 101. If the PQCNC requires the network to notify critical road sub-segment and associated statistical information, the PCF 205 may, at operation 630, send the critical road sub-segment(s) information towards the UE 101. If no critical road sub-segment is identified, the PCF 205 may, at operation 630, send the UE 101 an indication that no critical road sub-segment is identified. If the PQCNC requires other statistical QoS information, the PCF 205 may, at operation 630, transmit the statistical QoS information towards the UE 101. Some examples of the statistical QoS information are:
probability that the current Application QoS Level and/or probabilities that other Application QoS Levels can be supported at each road segment;
average GFBR of GBR QoS Flow; and
probability that the average GFBR can be supported at each road segment.

If the UE 101 requested or the PQCNC indicated that the mobile network provide alternative travel route(s) and/or alternative road segment(s), the PCF 205 sends the alternative route(s) and/or alternative road segment(s) to the UE 101 and associated Network QoS Information according to the PQCNC for each alternative travel route and/or alternative road segment.

Upon receiving the network QoS information response from the PCF 205, the AMF 103, at operation 635, may send the network QoS information to the UE 101 using an N1 MM message. According to embodiments, when the PQCNC allows the UE 101 to receive network QoS information only in Pull Mode, the UE 101 may request for network QoS information from time to time, for example when the location of the UE 101 does not correspond to the planned or anticipated location of the UE 101 specified in the Route Information of the UE 101. In such cases, the remaining operations of the procedure 600 can be skipped.

On the other hand, if the PQCNC allows the UE 101 to receive the network QoS information update in Push Mode, depending on UE location and time, the PCF 205, at operation 640*a*, may send the AMF 103 a subscription for the AMF 103's UE Location service (e.g. Namf_Location service). The subscription may indicate the UE locations that the PCF 205 wants to receive the notifications (e.g. UE location notifications) from the AMF 103. In some embodiments, the AMF 103 may obtain the UE Route Information at operation 615. If not, the PCF 205 may send the UE Route Information to the AMF 103. This may facilitate location tracking, for example if a UE route change occurs. The PCF 205 can then obtain updated network information from the NWDAF 105. The NWDAF 105 may provide alternative road segments to the PCF 205, depending on the current UE location and time.

The AMF 103, at operation 640*b*, may send the UE Location Update Acknowledgment to the PCF 205.

The AMF 103, at operation 645, may track the location of the UE 101. The UE location can be tracked by using procedures specified in 3GPP TS 23.273, entitled "5G Systems (5GS) Location Services (LCS); Stage 2," clause 6 for example.

When the AMF 103 finds that UE 101 is served by a new RAN node, the UE 101 is in the locations subscribed by the PCF 205, or the AMF 103 identifies that the location of the UE 101 does not correspond to the planned or anticipated location of the UE 101 specified in the Route Information of the UE 101, the AMF 103, at operation 650, may notify the PCF 205 of the location of the UE 101.

The PCF 205 may compare the location of the UE 101 with the planned or anticipated location of the UE 101 specified in the Route Information. If the current location of the UE 101 matches the planned or anticipated location of the UE 101 in the UE Route Information, remaining operations 655*a* to 665 can be skipped. If the PCF 205 finds that the notified current location of the UE 101 does not match the planned or anticipated location of the UE 101, the PCF 205, at operation 655*a*, may send a request for Network QoS Data Analytics Update to the NWDAF 105. The request may include the current location of the UE and the Data Analytics Request ID provided at operation 625*a*.

In response to the request for Network QoS Data Analytics Update, the NWDAF 105, at operation 655*b*, may send the Network QoS Data Analytics Update Response to PCF 205. The Network QoS Data Analytics Update contains the Network QoS Information as required by PQCNC.

Upon receiving the Network QoS Data Analytics Update Response, the PCF 205 may send the Network QoS Information Update to the UE 101 via AMF 103. At operation 660, the Network QoS Information Update may be transmitted to the AMF 103.

The AMF 103, at operation 665, may transfer the Network QoS Information Update to the UE 101 using the N1 MM message.

FIG. 7 illustrates, in a message flow diagram, an example of a procedure 700 for the AF 302 to request network QoS information, in accordance with embodiments of the present invention.

At operation 710, the UE 101 may request a PDU Session Establishment to communicate with the AS/AF. The SMF 104 may also send PDU session context information to the PCF in this operation. The subscription data of the UE 101 in the UDM 203 or UDR may indicate whether the UE 101 is authorized to request and/or to receive network QoS information and/or Application ID, UE ID and/or Internal Group ID for one or more DNNs. The AMF 103 may receive authorization for the UE 101 to request and/or to receive network QoS information. The AMF 103 may receive the authorization for the UE to request and/or to receive network QoS information during UE Registration procedure or during the operation 710.

According to embodiments, if the UE 101 is authorized to receive network QoS information, the AMF 103 may send the PCF ID to the SMF 104. Upon receiving the PCF ID, the SMF 104 may select the PCF 205 with PCF ID provided by the AMF 103 as specified for example in the 3GPP document TS 23.501, clause 6.3.7.1.

According to embodiments, if the UE 101 is authorized to receive the network QoS information for the PDU Session, the SMF 104 may send PDU Session Context to the PCF 205 when the SMF 104 performs SM Policy Association Establishment procedure as defined example in the 3GPP document TS 23.502, clause 4.16.4. In various embodiments, the PDU Session Context may include information as currently specified example in the 3GPP document TS 23.502, clause 4.16.4. Some example of the information to include may be SUPI, PDU Session ID, PDU Session Type, DNN, Access Type, AMF instance identifier (if available), the IPv4 address and/or IPv6 network prefix, PEI, User Location Information, UE Time Zone, Serving Network, RAT type, Charging Characteristics, Session AMBR, default QoS information (UL and DL), and Internal Group Identifier (as specified in the 3GPP document TS 23.501 [2], clause 5.9.7). In various embodiments, the PDU Session Context may further include one or more of additional information such as mode of redundant packet transmission and GPSI.

According to embodiments, the UE 101 and AF 302, at operation 715, may communicate with each other in an application layer.

At operations 720 and 725, the AF 302 may send a Network QoS Information request to the CN functions, for example the PCF 205, directly or via the NEF 301. The Network QoS Information request may include one or more of the following information: UE information (e.g. External UE ID, UE Address (IP address or Ethernet address)); AF information (e.g. AF-Service-Identifier); and UE Route Information. The Network QoS Information request may optionally include one or more of Application QoS Level(s) and PQCNC. The UE Route Information may include one or more of following information: start location and end location of the route without detailed road segments between the start location and end location, the time the UE start travelling, one or more travel routes with detailed road segments between the start location and the end location, one preferred travel route and alternative route(s). The AF may include one travel route and a request to the network to identify one or more routes between the start location and end location, or to identify alternative routes or road segments. In some embodiments, the PQCNC indicate that the AF may provide one travel route and the mobile network may provide one or more alternative travel route(s), and Network QoS Information for the travel route and alternative travel route(s). In various embodiments, if the AF 302 sends the Network QoS Information request to the NEF 301, the NEF 301 may discover PCF 205 by using Nbsf_management_Discovery.

The PCF 205, at operation 730*a*, may send a request to the NWDAF 105 for Network QoS Data Analytics information. The request sent by the PCF 205 may include one or more of Data Analytics Request ID, UE Route Information, Application QoS Level(s), PDU Session Context information, and PQCNC.

In response to the request for network QoS Data Analytics information, the NWDAF 105, at operation 730*b*, may send the PCF 205 a response including Network QoS Data Analytics information. Depending on the PQCNC, the NWDAF 105 may include one or more routes between the start location and end location. Each route may consists of one or more road segments. The NWDAF 105 may provide Network QoS Information as required by PQCNC for each route and/or road segment. If the NWDAF 105 identify any critical road sub-segment of the road segment(s), the NWDAF 105's response may include critical road sub-segment(s) of the road segment and associated probability for which at least one of the important QoS parameters may drop below the critical threshold of this QoS parameter with probability greater than or equal to the pre-determined probability threshold. The response may also include time period(s) that one or more important QoS parameters are anticipated to drop below the critical threshold of this QoS parameter at the critical road sub-segment(s) with probability greater than or equal to the pre-determined probability threshold, according to the UE travel information. The response may also include one or more statistical network QoS information if configured in the PQCNC.

Upon receiving the Network QoS Data Analytics information response, the PCF 205 may send a Network QoS Information Response to the AF 302. According to embodiments, the Network QoS Information response may include one or more of the following information:

- critical road sub-segment(s) information, if the PQCNC requires the network to notify critical road sub-segment and associated statistical information;
- indication that no critical road sub-segment is identified, if no critical road sub-segment is identified; and
- statistical QoS information (e.g. probability that the current QoS Level of each Application can be supported at each road segment, average GFBR of GBR QoS Flow, probability that the average GFBR can be supported at each road segment).

If the AF 302, at operation 725, has sent the Network QoS Information request to the PCF 205 via the NEF 301, then the PCF 205 may send the Network QoS Information Response to the NEF 301. In this case, the NEF 301, at operation 740, may transfer the Network QoS Information response received from the PCF 205 to the AF 302. The Network QoS Information may include alternative travel route(s) or alternative road segment(s) according to the AF request in operation 720, or according to the PQCNC. The AF and/or UE may select a travel route from the preferred travel route or alternative routes.

If the PQCNC allows the UE 101 to receive the network QoS information update in Push Mode, depending on UE location and time, the PCF 205, at operation 745*a*, may send the AMF 103 a subscription for the AMF 103's UE Location service (e.g. Namf_Location service). The subscription may indicate the UE locations, which could be represented by (R)AN node ID(s), cell ID(s), registration area IDs, tracking area ID(s), UE planned travel route, geographic locations, geodetic locations, and any combination thereof, that the PCF 205 wants to receive the notifications (e.g. UE location notifications) from the AMF 103. In some embodiments, the AMF 103 may obtain the UE Route Information at operation 615. If not, the PCF 205 may send the UE Route Information to the AMF 103.

The AMF 103, at operation 745*b*, may send the UE Location Update Acknowledgment to the PCF 205.

The AMF 103, at operation 750, may track the location of the UE 101, for example using procedures specified in TS 23.273.

When the AMF 103 finds that UE 101 is served by a new RAN node, or the UE 101 is in the locations that subscribed by the PCF 205, or the AMF 103 identifies that the location of the UE 101 does not correspond to the planned or anticipated location of the UE 101 specified in the Route Information of the UE 101, the AMF 103, at operation 755*a*, may notify the PCF 205 of the location of the UE 101.

According to some embodiments, as alternatives to operations 745*a* to 755*a*, the AF 302 may provide UE Location Update at operation 755*b* and 755*c*.

The AF 302, at operations 755*b* and 755*c*, may provide UE Location Update to PCF 205. According to embodiments, the AF 302 may provide UE Location Update if the location the UE 101 does not match the planned or anticipated location of the UE 101 in the initial UE Route Information. The AF 302 may provide updated UE Route Information to the PCF 205 through the operations 755*b* and 755*c*. If the AF 302 provides updated UE Route Information via NEF 301, the NEF 301, at operation 755*c*, may transfer the updated UE Route Information to the PCF 205.

The PCF 205 may compare the location of the UE 101 with the planned or anticipated location of the UE 101 specified in the Route Information. If the current location of the UE 101 matches the planned or anticipated location of the UE 101 in the UE Route Information, remaining operations 760*a* to 770 can be skipped. If the PCF 205 finds that the notified current location of the UE 101 does not match the planned or anticipated location of the UE 101, the PCF 205, at operation 760*a*, may send a request for Network QoS Data Analytics Update to the NWDAF 105. The request may include the current location of the UE 101 and the Data Analytics Request ID provided at operation 730*a*.

In response to the request for Network QoS Data Analytics Update, the NWDAF 105, at operation 760*b*, may send the Network QoS Data Analytics Update Response to PCF 205.

At operations 765 and 770, the PCF 205 may send Network QoS Information update to the AF 302 directly or via NEF 301. In case of the latter, the NEF 301 may transfer the Network QoS Information to the AF 302.

At operation 775, the AF 302 and UE 01 may communicate with each other to adjust application setting in accordance with the QoS information in the Network QoS Information Response message.

According to embodiments, the procedures illustrated above in FIGS. 6 and 7 have several impacts on existing network entities and interfaces such as UE, AF, PCF, UDM, NEF, AMF and NWDAF. In various embodiments, the procedures illustrated above in FIGS. 6 and 7 have impacts on UE. The UE can request network QoS information; provide UE Route Information in a data container; and/or provide network QoS information to an application layer.

In various embodiments, the procedures illustrated above in FIGS. 6 and 7 have impacts on AF. The AF can request and utilize network QoS information; and/or provide the network QoS information to the application layer. The V2X AF can provide UE Route Information in a data container.

In various embodiments, the procedures illustrated above in FIGS. 6 and 7 have impacts on PCF. The PCF can handle network QoS information request from the UE and AF; store Application QoS Level(s) and Potential QoS Change Notification Control (PQCNC); and/or use network data analytics services of NWDAF to obtain statistical QoS information.

In various embodiments, the procedures illustrated above in FIGS. 6 and 7 have impacts on UDM. The UDM may store authorization for UE to receive Network QoS Information for specific UEs, Internal Group ID, DNNs and Application IDs.

In various embodiments, the procedures illustrated above in FIGS. 6 and 7 have impacts on NEF. The NEF may provide SBA service for the AF to request network QoS information.

In various embodiments, the procedures illustrated above in FIGS. 6 and 7 have impacts on AMF. The AMF can handle the UE request for network QoS information, transfer the network QoS information request from the UE to the NWDAF; transfer the network QoS information from the PCF to the UE; and/or track the UE location based on UE Route Information.

In various embodiments, the procedures illustrated above in FIGS. 6 and 7 have impacts on NWDAF. The NWDAF can provide network QoS data analytics based on one or more of the UE Route Information, Application QoS Level, Potential QoS Change Notification Configuration, PDU Session Context. The SMF may provide PDU Session Context to the NWDAF. The NWDAF can provide alternative travel route(s) or road segments, and corresponding Network QoS Information for each alternative route or road segment. The alternative route(s) could provide the same, different, or better QoS support, the same, different, or higher QoS reliability, the same or different or fewer or no critical road segments, fewer or no critical road sub-segments, or a combination thereof. Among several alternative routes, a route can be selected according to predetermined criteria, such as a combination of QoS criteria and physical criteria such as expected travel time and distance, and environmental conditions (e.g. weather condition).

According to embodiments for the procedures in FIGS. 1 to 7, the NWDAF can provide network QoS data analytic information to other network functions such as AMF, SMF, PCF, AF and NRF. In comparison to U.S. patent application Ser. No. 15/898,444, which is hereby incorporated by reference, embodiments of the present invention support UE application(s) with specific QoS requirements is introduced in the instant application.

Figure 8:
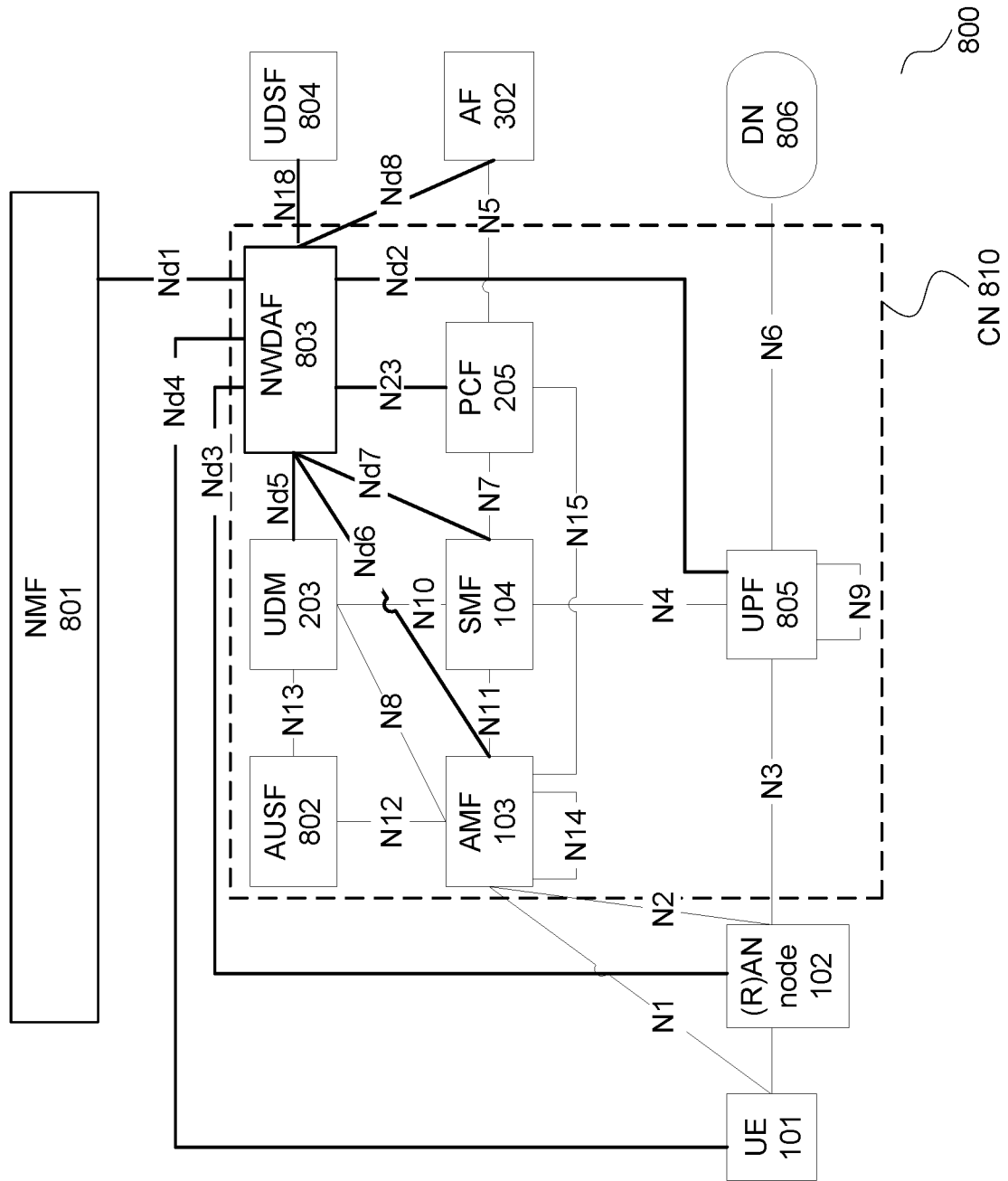
FIG. 8 illustrates, in a component diagram, an example of a communication network architecture, in accordance with embodiments of the present invention.

FIG. 8 illustrates, in a component diagram, an example of a communication network architecture 800, in accordance with embodiments of the present invention. The communication network architecture 800 is a next generation (such as fifth generation (5G) wireless networks) network architecture that includes a function in CN 810 that supports data analytics. The CN 810 connects to a (R)AN node 102 (within the (R)AN 102) which in turn provides access services to the UE 101. The communication network architecture 800 may include an Application Function (AF) 302 that is external to the CN 810 (and in some instances may be in DN 806). The communication network architecture 800 may also include an Unstructured Data Storage Function (UDSF) 804, and a Network Management Function (NMF) 801 that may be external to the CN 810. The NMF 804 may perform operation, administration, and management (OAM) functionalities. In some embodiments, the UDSF 804 and the NMF 801 may be internal to the CN 810. The CN 810 comprises a User Plane Function (UPF) 805 and CP functions. The CP functions shown in this illustrative embodiment include an AUthentication Server Function (AUSF) 802, a Unified Data Management (UDM) Function 203, an Access and Mobility management Function (AMF) 103, a Session Management Function (SMF) 104, a Policy Control Function (PCF) 205, and a NetWork Data Analytics (NWDA) function 803. It is noted that the term NWDA function is also referred to as a NWDAF.

The UPF 805 is representative of any of a number of different user plane functions. Different UPFs can be used to provide functions such as mapping IP packets to QoS flows, forwarding packets, traffic measurement and preparing and sending reports. The (R)AN node 102 provides an air interface connection for the UE 101, and forwards packets between the UE 101 and functions within the CN 810. Those skilled in the art will appreciate that as illustrated, the (R)AN node 102 can use the N3 interface to forward packets to (and receive packets from) the UPF 805, and also use the N2 interface to connect to the AMF 103. The AUSF 802 provides security functions, such as authenticating the UEs 101, and generating security or encryption keys for distribution to connected UEs 101 and at least one other node. In some embodiments, nodes in the (R)AN 102 and CN 810 will be provided different keys associated with a UE 101, and the UE 101 will be provided both keys. It should also be understood that security keys may be generated for communications over interfaces between other network nodes (e.g., for communications between the UPF 805 and a node in the DN 806 over the N6 interface). The UDM 203 provides storage management for network information and user information, and may also provide data that may be used to assist with (provides data to support) security measures to protect the data. The AMF 103 manages the termination of signalling interfaces N1 and N2, the forwarding of signalling messages (in some embodiments these may be one or both of CP and UP signalling messages) from the UE 101 and the (R)AN node 102 to the SMF 104, and the management of mobility and security procedures for the UE 101. The SMF 104 manages establishing the UP connection between the UE 101 and a node or network function (e.g. a DN gateway function) connected to the DN 806. The PCF 205 provides policies to network functions for the handling of a UE's session. Such policies include QoS, mobility management, session management and charging policies. The NWDAF 803 function provides data analytics functions that can provide information that can be used in setting policies such as traffic steering and QoS policies. The data analytics functions provided by the NWDAF 803 can also provide information that can be used in optimization processes used to generate different policies. The NWDAF 803 may also collect statistics from other network components and store the statistics in the UDSF 804.

The AF 302 may be instantiated or installed upon any application server outside the CN 810. In some embodiments of proposed next generation core networks, an AF 302 can be provided an interface to CP functions within the CN 810. This may allow control information to be exchanged between an external application and nodes (such as the PCF 205) within the CN 810. For example, an Internet Protocol (IP) Multimedia Subsystem (IMS) server may be an AF 302. The UDSF 804 allows for storage of data in a variety of different data formats. Different network functions can use the UDSF 804 for storing data, and each network function that interacts with the UDSF 804 can be provided the ability to define its own data format. The NWDAF 803 may collect network measurement reports and store them in the UDSF 804. The NMF 801 may be instantiated or installed upon a server outside the CN 810 (and in some embodiments within the CN 810) and used to configure the operation of the NWDAF 803.

The network functions resident within the CN 810 may be implemented as virtual entities on one or more servers. The virtual entities may be created by the execution of stored software instructions on a pool of computing resources. Each network function may be viewed within the network as a distinct entity with logical connections to other entities which may be instantiated on the same or other computing resources. FIG. 8 illustrates one example of possible logical connections (e.g. reference points) between some of the network functions. Table 1 lists reference points used between some of the network elements in FIG. 8.

TABLE 1

Interfaces and reference points used between some network elements of network architecture 800

| Component | Interface or Reference Point | Component |
|---|---|---|
| UE 101 | N1 | AMF 103 |
| (R)AN 102 | N2 | AMF 103 |
| (R)AN 102 | N3 | UPF 805 |
| UPF 805 | N4 | SMF 104 |
| PCF 205 | N5 | AF 302 |
| UPF 805 | N6 | DN 806 |
| SMF 104 | N7 | PCF 205 |
| AMF 103 | N8 | UDM 203 |
| UDM 203 | N10 | SMF 104 |
| AMF 103 | N11 | SMF 104 |
| AUSF 802 | N12 | AMF 103 |
| AUSF 802 | N13 | UDM 203 |
| AMF 103 | N14 | AMF 103 |
| AMF 103 | N15 | PCF 205 |
| NWDA 803 | N18 | UDSF 804 |
| NWDA 803 | N23 | PCF 205 |
| NWDA 803 | Nd1 | NMF 801 |
| NWDA 803 | Nd2 | UPF 805 |
| NWDA 803 | Nd3 | (R)AN 102 |
| NWDA 803 | Nd4 | UE 101 |
| NWDA 803 | Nd5 | UDM 203 |

TABLE 1-continued

Interfaces and reference points used between some network elements of network architecture 800

| Component | Interface or Reference Point | Component |
|---|---|---|
| NWDA 803 | Nd6 | AMF 103 |
| NWDA 803 | Nd7 | SMF 104 |
| NWDA 803 | Nd8 | AF 302 |

The reference points, Nd1 to Nd8, may be implemented as logical links to the NWDAF 803. The logical links may represent real links, or portions of real links, or they may be virtual connections that are made up of segments between other network functions. For example, UPF 805 may communicate with the NWDAF 803 directly via the Nd2 reference point. In other embodiments, the NWDAF 803 may communicate directly with a smaller set of functions, and rely upon the ability of these functions to forward the messages and instructions to other functions. In one such embodiment, the UPF 805 may communicate over the N4 interface with the SMF 104 that would process information in the communication. Once processed, the SMF 104 would communicate the information (either as originally received or as modified with the process) over the N7 interface to the PCF 205. The PCF 205 may then also process the information and send a communication (having the original or modified information) to the NWDAF 803 over the N23 interface. Alternatively, the UPF 805 may also communicate over the N4 interface to the SMF 104 that in turn (after processing the received communication) communicates over the Nd7 reference point with the NWDAF 803. Yet alternatively, the connection between the NWDAF 803 and the UPF 805 could be routed through a plurality of different data centers in which other functions are instantiated. Similarly, in some other embodiments, the UE 101 may communicate with the NWDAF 803 directly via the Nd4 reference point. Alternatively, the UE 101 may also communicate over the N1 reference point with the AMF 103 that in turn communicates over the Nd6 reference point with the NWDAF 803. Yet alternatively, the connection between the NWDAF 803 and the UE 101 may be routed through the N1 reference point, N11 reference point and Nd7 reference point. It is understood that the logical connection labels may be renamed by standards bodies, such as the 3GPP. For example, reference points Nd1 to Nd8 may be renamed with a label of the format "Nx", where "x" is an integer.

The reference points, Nd1 to Nd8, are point-to-point logical reference points, which can be used to describe messages exchanged between two network entities. In 5G wireless networks, service-based interfaces are used to send messages between two functions, such as functions in CP. For example, a CP function, such as NWDAF 803, can provide services to other functions, such as SMF 104, PCF 205, and AMF 103. Therefore, the same service that the NWDAF 803 may provide to a CP function, such as PCF 205, may also be provided to some other CP functions, such as SMF 104.

The NMF 801 may send, over the Nd1 reference point, instructions to instantiate and to configure the operation of the NWDAF 803 function. The NMF 801 may also send (R)AN 102 and CN 810 configuration data to the NWDAF 803. The (R)AN 102 configuration data may include (R)AN nodes 102 configuration data and (R)AN 102 topology data. (R)AN nodes 102 configuration data may include (R)AN node address information (e.g., IP address and at least one of topological and geographical location), spectral resources including the allocated spectrum allotment, carrier frequencies, antenna configuration (e.g. number of transmit and receive antennas) to be used, beamforming technologies (e.g., massive MIMO, single user beamforming, multi-user beamforming) that can be implemented, and processing capacity (e.g., number of GBR voice users, number of GBR video users). (R)AN connection topology information may include information about the links between (R)AN nodes 102, and the capacity and characteristics of physical links (e.g., optical cables, microwave links, millimeter wave (mmWave) links, etc.) used for backhaul or fronthaul connections and networks.

The NMF 801 may also send configuration information associated with core network user plane functions and their topology (e.g., UPF 805 configuration and CN 810 topology) to the NWDAF 803 over the Nd1 reference point. UPF 805 configuration information may include UPF address information (e.g., IP address and geographical location), processing capacity (e.g. a number of PDU sessions that can be supported) of input and output ports, and the maximum supported total throughput (bit/second) of input and output ports. CN 810 topology information may include any or all of: the UPFs that have been or will be instantiated, the logical connections among UPFs 805, the capacity of the logical connections (bit/second), transmission technologies of physical layer supporting logical connections (e.g., optical cables, microwave, etc.), and characteristics of logical links (e.g., packet delay, packet loss rate).

The NMF 801 may also send (R)AN 102 and CN 810 connection topology information to the NWDAF 803 over the Nd1 reference point. Such topology information may include logical connections among the (R)AN nodes 102 and the UPF(s) 805, and their maximum throughput. The (R)AN 102 and CN 810 connection topology information may also include the physical connections to support logical connections between the (R)AN nodes 102 and the CN 810 nodes (e.g. maximum throughput (bit/second) and characteristics (optical cables, microwave, packet delay, packet loss rate)). The CN 810 connection topology may include logical and physical connections between two CP functions, between a CP function and the UPF 805, and between a CP function and the (R)AN 102.

The NMF 801 may instruct the NWDAF 803, via the Nd1 reference point, to collect network entity data. The operation data from the UPF 805, (R)AN node 102, and UE 101 may be sent to the NWDAF 803. The NWDAF 803 may store the collected data in the UDSF 804. The NMF 801 may instruct the NWDAF 803 to send data of certain UE 101, certain (R)AN nodes 102, or the UPF 805 based on certain criteria (such as geographical locations, time period, specific network entities, events, etc.). The NMF 801 may also request the NWDAF 803 to provide a QoS policy recommendation for certain criteria, including certain network slices, certain services (such as real-time video calls, real-time voice calls, video streaming services, video streaming services for certain over-the-top (OTT) content providers), certain time periods, or any combination thereof. The NMF 801 may also request the NWDAF 803 to provide a prediction of network function resource utilization (such as resource utilization percentage of (R)AN nodes and UPF nodes, and physical links of the transport layer). The NMF 801 may also request the NWDAF 803 to provide potential congestion times during the day and the length of congestion in network functions (including user plane functions (e.g., UPF 805 and (R)AN nodes 102), and control plane functions (e.g., AMF 103, SMF 104). The NWDAF 803 predicts the network function resource utilization based on reported network entity data from other network entities. Hence the prediction of network function resource utilization may include statistical information representing network function resource utilization in the measurement period and prediction of future network function resource utilization.

The network entity data is the data provided by a network entity. The operation data of a network function is the data generated during the operation of the function with respect to traffic. For example, the operation data of UPF 805 could include the number of QoS flows of a video streaming application at 2:00 PM, the number of QoS flows having measured flow bit rate within a certain range. The maintenance data is the data to track the operation of a network function, such as the resource utilization of memory (e.g. 50% of memory is used within a certain period, 60% of spectrum is used in a (R)AN node within a certain period). The reports are generated by a network function are to carry network entity data. The collected data by the NWDAF 803 include any types of network entity data, which include at least maintenance data, and operation data. Accordingly measurement data includes at least one of network entity data, operation data, and maintenance data. Measurement reports include the measurement data. Measurement data relates to data collected by network entities and provided to the NWDAF for applying data analytics analysis.

The NWDAF 803 may send to the NMF 801, over the Nd1 reference point, any operation data, maintenance data, and reports as requested by the NMF 801. Operation data collected from the CP functions (such as SMF 104, AMF 103, UDM 203), UPF 805, (R)AN nodes 102 and UE 101 may be stored in the UDSF 804. Based on the request of the NMF 801, the NWDAF 803 may obtain (either directly from one or more network components or indirectly from data stored in the UDSF 804) and send relevant data to the NMF 801. The NWDAF 803 may send its own operational data (e.g. maintenance data) to the NMF 801 about its (NWDA 803) running time to process collected data, its computing and storage resources usage, and the number of requests from PCF 205 that have been processed.

Measurement configuration data may be sent from the NWDAF 803 to the UPF 805 over the Nd2 reference point. Such measurement configuration data may include a measurement periodicity (e.g. how often a report is sent to the NWDAF 803), a report schedule (e.g. when the measurement report is sent to the NWDAF 803), events to be monitored (e.g. congestion events, packet delay events, etc.), an indication of types of reports requested (e.g. logical link usage reports to measure the percentage of utilized capacity of logical links, and duration of full capacity reports to measure the total time during a measurement period a logical link (port) is fully utilized), types of PDU sessions to be monitored (e.g. video sessions, voice sessions, social network sessions, web service sessions, etc.), a number of PDU sessions between a UPF 805 and (R)AN node 102 for each type of PDU sessions (e.g. voice, video, etc.), and the characteristics of PDU sessions (e.g. length, bit rate variations (min and max), etc.). The UPF 805 may, as instructed, send measurement reports to the NWDAF 803 over the Nd2 interface.

The Nd2 reference point may be implemented by a direct logical link between the UPF 805 and the NWDAF 803. Alternatively, the Nd2 reference point may be implemented indirectly, by using the N4 interface between the UPF 805 and the SMF 104 and the Nd7 reference point between the SMF 104 and the NWDAF 803. In some embodiments of indirect implementation, the measurement configuration data sent between NWDAF function 803 and UPF 805 are first sent to the SMF 104 and then forwarded to the UPF 805 or the NWDAF 803. Yet alternatively, the measurement configuration data from the UPF 805 may be sent to the NWDAF 803 via the SMF 104 and the PCF 205.

In an alternate embodiment, if UPF 805, or any other function, has access to the UDSF 804, the NWDAF 803 may request, using an instruction, that the UPF 805 send report data to the UDSF 804. This instruction may include a specification of how the report data is to be formatted or structured. This instruction can include an indication as to when (and possibly how often) the report data is to be sent. The NWDAF 803 can then obtain the report data (in some embodiments at fixed intervals) from the USDF 804. This instruction to interact directly with the UDSF 804 can be implemented with any of the network functions (NF) that the NWDS 803 interacts with, so long as the NF has the ability to communicate with the UDSF 804.

Measurement configuration data may be sent by the NWDAF 803 to (R)AN nodes 102. Such measurement configuration data may include a measurement periodicity (e.g. how often the report is sent from the (R)AN node 102 to the NWDAF 803), a report schedule (e.g. when the measurement report is sent by the (R)AN node 102 to NWDAF 803), events to be monitored (e.g. congestion events, packet delay events, etc.), a radio resource link usage report that measures the statistics of spectrum utilization (e.g., the average and cumulative distribution function (CDF) of the spectrum usage), statistics of total throughput in bit/second (e.g. the sum of throughput of all UEs 101) of (R)AN nodes 102 (such as average throughput, variance and CDF of throughput), types of PDU sessions to be monitored (e.g., video sessions, voice sessions, social network sessions, web service sessions, etc.), a number of PDU sessions for each type of monitored PDU sessions (e.g., voice, video, etc.), characteristics of PDU sessions (e.g. length, bit rate variations (min and max), etc.), and UE-based monitoring data (e.g. per-UE network resource usage and PDU sessions). The (R)AN node 102 may, as instructed, send measurement reports to the NWDAF 803 over the Nd3 reference point.

The Nd3 reference point may be implemented by a direct logical link between the R(AN) node 102 and the NWDAF 803, or by indirect interfaces, for example via the AMF 103. In some embodiments of indirect implementation, the measurement configuration data sent from (R)AN 102 to the NWDAF 803 are first sent to the AMF 103, then the AMF 103 may forward the messages to the SMF 104, then the SMF 104 may forward the messages to NWDAF 803.

The NWDAF 803 may collect Network QoS Experience from the UE 101. The UE 101 or application software in the UE may collect the Network QoS Experience of one or more PDU Sessions that are running in the UE. The UE 101 or software in the UE may directly send the Network QoS Experience reports to the NWDAF 803 in the CP or in the UP. The Network QoS Experience is a log of network QoS events during the time the UE 101 registers to the network and uses some network services for data connection. A Network QoS Experience report can be created for each PDU Session and/or one QoS Flow of a PDU Session, in which all the QoS events may be logged and reported. The UE 101 may collect one or more of the following information: time information, the UE location information, PDU Session information, RAN radio transmission parameters, Application Information, and Application Quality of Experience (QoE) information. The time information may include time zone and timestamp of event. The timestamp may be the local time where the measurement is taken. The UE location information may include one or more of the following information: geographic location (e.g. two-dimensional coordinate location, three-dimensional coordinate location, which may be obtained by a navigation system in the UE, such as Global Positioning System (GPS)), street or road name, RAN node ID, and cell ID of RAN node. The PDU Session information may include one or more of the following information: Access type (e.g. 3GPP, non-3GPP WiFi), RAT type (e.g. 4G RAT, 5G RAT), QoS Flow type (e.g. GBR, delay critical GBR, non-GBR), Traffic Type (e.g. IPv4, IPv6, Ethernet, unstructured data), UE Address (e.g. IP address or Ethernet address), PDU Session ID, QoS Rule, QFI, packet duplication transmission mode in the (R)AN and/or in the CN (e.g. no duplication transmission or single cell transmission, duplication transmission from two radio nodes or two cells, duplication transmission from two carriers, duplication transmission with two UE receivers, duplication transmission with two separate PDU Session of the same UE, duplication transmission in the CN by using two separate N3 interfaces for one PDU Session), and timestamp of PDU Session which may indicate the start and end times of PDU Session. The RAN radio transmission parameters may include carrier frequency (e.g. 2.8 GHz), bandwidth (e.g. 20 MHz bandwidth), and/or physical bit rate. The Application Information may include one or more of the following information: Application Identifier(s) provided by one or more of the mobile network, Application in the UE, and the AF/AS; measured bit rate of PDU Session; measured bit rate of QoS flows; and other measured QoS information. The Application Quality of Experience (QoE) information may include QoE parameters that experienced by the Application in the UE. The QoE information may include one or more of following parameters: frequency (e.g. how many times) that the network cannot support the required Application QoS Level; frequency (e.g. how many times) that the Application QoS Level changes from one level to another level; duration (e.g. how long) that an Application QoS Level is supported (e.g. 15 minutes and 35 seconds); one or more values representing the QoS experience for one or more road segments; or the whole travel route. The value(s) for the QoS experience for road segment(s) may be represented in various ways, for example a real number (e.g. integer number from 1, 2, 3, 4, 5), or alphabet letters (e.g. A, B, C, D, E)). Each application in the UE 101 may map the QoS information to the QoE information.

The QoS events that can be recorded based on a QoS event recording configuration (QERC). The QERC may indicate which QoS parameters are to be monitored (e.g. GFBR, PDB, PER, 5QI), how often the QoS events are recorded (e.g. every 10 second), which location the QoS events are recorded (e.g. for road segment, cell ID, RAN node ID, geographical areas, registration area ID, tracking are ID, building names), type of QoS events (such as when the new QoS parameter(s) is/are modified by the CN, when the measured/monitored QoS parameters are changed (better and/or dropped), and when the application in the UE changes its operation mode because one or more QoS parameters change or radio channel conditions change.

The NWDAF 803 may collect QoS performance reports from the RAN node 102, for example via SMF 104. The QoS performance reports may include one or more of the QoS Monitoring events report, PDU Session Context information and the RAN Context. When the QoS Monitoring event is triggered, the RAN 102 may initiate QoS Monitoring events report via the QoS Notification Control procedure. One or more of the following information may be contained in the N2 SM Information message: Timestamp of event, Name of event, measured value of QoS parameter, PDU Session ID, QFI, RAN PDU Session Context in a data container, PDU Session Context information, and UE Location. The PDU Session Context information may include one or more of PDU Session ID, QFI, QoS parameters from QoS level, UE Address (IP or Ethernet address), RAT type, Access type, S-NSSAI, DNN, and PDU Session Type. The RAN Context may be included for data analytics by NWDAFF. The RAN Context may include Cell ID(s), UE geographical location if available, carrier frequency, packet duplication transmission mode.

The NWDAF 803 may collect the Network QoS information reports from one or more of the UE 101, AF 302 and/or RAN report, and/or CP functions (such as SMF 104), and NMF 801. The NWDAF 803 may collect the reports in order to analyze the network performance using some methods such as deep learning, neural network. The NWDAF 803 may integrate the Network QoS Experience reported by the UE 101, RAN PDU Session Context (with RAN radio transmission parameters), and PDU Session context (from SMF 104, AMF 103). Through the integration, the NWDAF 803 may obtain more detailed and/or more accurate collection of statistical QoS values (e.g. minimum value, maximum value, average value and/or median value) at specific geographical location, RAN node ID, Cell ID, time of the day, and/or day of the week. Other information provided by one or more third parties such as whether condition, vehicular or pedestrian traffic on the roads/streets may be collaboratively used with the QoS information provided by the network QoS information reports.

In various embodiments, the NWDAF 803 may provide statistical Network QoS information or estimated QoS performance as described in FIGS. 1 to 7.

The UE 101 may send the Network QoS Experience reports to the NWDAF 803 via a CP interface. For example, the UE 101 may send the AMF 103, SMF 104, or PCF 205 a NAS message carrying the Network QoS Experience report. Upon receiving the NAS message, the AMF 103, SMF 104, or PCF 205 may transfer the UE Network QoS Experience report the NWDAF 803.

The UE 101 or a software in the UE may send the Network QoS Experience reports to the NMF 801, such as OAM (Operation, Administration and Management) system via another interface in the CP or UP. For example, in the CP, the UE 101 may send Network QoS Experience reports using some minimized driving test (MDT) messages to the (R)AN 102, then the (R)AN 102 may send the received MDT messages to the NMF 801. The NMF 801 may send the Network QoS Experience reports to the NWDAF 803. In the UP, the UE 101 may send the Network QoS Experience reports to the AF 302 in the UP as part of background data transfer between the UE 101 and the AF 302; the AF 302 then may send the Network QoS Experience reports to the NMF 801 and/or to the NWDAF 803. The NMF 801 may send the Network QoS Experience reports to the NWDAF 803.

The UE 101 may send QoS and/or QoE reports to the NWDAF 803 over the Nd4 reference point. The QoS and/or QoE reports may include the geographical location of the UE 101. The QoS parameters may include packet loss rate, packet delay, and other parameters measured at the UE 101. The QoE parameters may be defined by specific applications. For example, video streaming services may define an initial video buffering time, a total interruption time (total buffering time), a number of interruptions, video bit rates, and bit rate changes during the streaming sessions. The UE 101 may convert the QoE parameters into a single scalar QoE level (for example, from 1 to 5) and send that value to the NWDAF 803. The QoS level may be referred as Mean Opinion Score (MOS) as defined by International Telecommunications Union (ITU), or by some proprietary MOS model of the network providers or by a third party service provider. The reports from the UE 101 may include an identifier of the UE, such as UE identifiers defined example in the 3GPP document TS 23.501 (SUPI, GPSI), the information of PDU session such as PDU session type (IP PDU Session, Ethernet PDU Session, or Unstructured PDU Session), packet flow description, DNN, start and end time of PDU session, information of QoS flows (such as packet filters of a packet filter sets of QoS flows).

In the QoS and/or QoE reports of the UE 101, the geographical location of the UE 101 may be represented by one or combinations of the following information: the GPS location provided by the GPS device of the UE, the road segment of a road with road name, the (R)AN address (e.g. (R)AN Node Identifier) that served the UE. Note that the (R)AN node may include any radio nodes of different radio access technologies (RAT) such as 5G, 4G, 3G, 2G, WiFi.

Similarly, the Nd4 reference point may be implemented by a direct logical link between the UE 101 and the NWDAF 803, or by indirect interfaces, for example via the (R)AN 102 and the AMF 103. In some embodiments of an indirect implementation, the QoS and/or QoE reports sent from the UE 101 to the NWDAF function 803 are first sent to the (R)AN 102, which is carried by a radio control channel of the (R)AN 102. The (R)AN 102 may forward the QoS and/or QoE reports to the AMF 103 via the N2 interface, then the AMF 103 may forward the QoS and/or QoE to the SMF 104 via the N11 interface and the SMF 104 may further forward the QoS and/or QoE reports to the NWDAF 803 via the Nd7 reference point. Alternatively, the AMF 103 may forward the QoS and/or QoE reports to the NWDAF function 803 over the Nd6 reference point.

Vice versa, in some embodiments, the NWDAF 803 may send QoS and/or QoE reports to the AMF 103 via the Nd6 reference point. The AMF 103 may forward the QoS and/or QoE reports to the (R)AN 102 over the N2 interface. Then the (R)AN 102 may forward the QoS and/or QoE reports to the UE 101 by using a radio control channel of the air interface. Alternatively, the NWDAF function 803 may send QoS and/or QoE reports to the SMF 104 over the Nd7 reference point. The SMF 104 may forward the QoS and/or QoE reports to the AMF over the N11 interface, and then the AMF 103 may forward the QoS and/or QoE reports to the UE 101 over the N1 interface.

Measurement configuration data may be sent from the NWDAF 803 to the UE 101. Such measurement configuration data may include a measurement periodicity (e.g. how often the report is sent from the UE 101 to the NWDAF 803), a report schedule (e.g. when the measurement report is sent from the UE 101 to the NWDAF 803), events to be monitored (e.g. a successful handover, a handover failure, congestion events, packet delay events, poor radio coverage (e.g. the geographical locations where a downlink control signal was below a threshold), and data rate coverage (e.g. the downlink and/or uplink data rate at geographical locations)), radio coverage measurements (e.g. ability to receive a downlink control signal at geographical location), types of PDU sessions to be monitored (e.g. video sessions, voice sessions, social network sessions, web service sessions, etc.), a number of PDU sessions for each type of monitored PDU sessions (e.g. voice, video, etc.), characteristics of PDU sessions (e.g. length, bit rate variations (min and max), etc.), report QoS parameters (e.g. packet delay, packet loss rate, etc.), and report QoE parameters (e.g. which type of PDU sessions (video, voice, etc.). For example, the QoE parameters may include an initial buffering time for a PDU session, an average data rate for that PDU session, a number of video interruptions during that PDU session, and a total time of video interruptions (e.g. buffering time)). The UE 101 may, as instructed, send measurement reports to the NWDAF 803 via the Nd4 reference point.

The NWDAF 803 may request subscriber statistics from the UDM 203 over the Nd5 reference point. For example, the NWDAF 803 may request the number of UEs 101 using certain services (e.g. voice, video, data, etc.), or having certain SLAs. The UDM 203 may send subscriber statistics responses to the NWDAF 803 over the Nd5 reference point.

The NWDAF 803 may send measurement configuration data to the AMF 103. Such measurement configuration data may include a measurement periodicity (e.g. how often the report is sent from the AMF 103 to the NWDAF 803), and report scheduling (e.g. when the measurement report is sent by the AMF 103 to the NWDAF 803). Monitoring parameters may include a number of handovers, statistics of UE 101 active periods (e.g. the duration a UE 101 stays in a connected state of a connection management (CM) state (e.g. a CM-CONNECTED state), a number of registration requests, a number of service requests, a number of service requests rejected, etc.). UE 101 statistics may include UE distributions (e.g. a number of UEs 101 in specific (R)AN nodes 102, geographical areas, or tracking areas), a number of active UEs 101 (in the CM-CONNECTED state), and a number of idle UEs 101 (in an idle state of a CM state (e.g. a CM-IDLE state)). The AMF 103 may, as requested, send reports to the NWDAF 803 over the Nd6 interface. The Nd6 reference point may be used to send measurement requests from the NWDAF 803 to the UE 101. In some embodiments, the NWDAF 803 may send one common measurement request, which can be distributed by the AMF 103 to many UEs that have performed registration procedure with the system through the AMF 103. When the AMF 103 receives the measurement request from the NWDAF 803, the AMF 103 may generate many Non-Access-Stratum NAS messages, each for one UE. Alternatively, the AMF 103 may send multiple messages over the N2 reference point (referred to hereinafter as N2 messages), each containing a measurement request for each (R)AN node 102 serving a number of UEs. The (R)AN node 102 may use a multicast or broadcast channel to send the measurement message to each of the UEs.

The NWDAF 803 may send measurement configuration data to the SMF 104 over the Nd7 reference point. Such measurement configuration data may include a measurement periodicity (e.g. how often the report is sent from the SMF 104 to the NWDAF 803), and a report schedule (e.g. when the measurement report is sent by the SMF 104 to the NWDAF 803). Monitoring parameters may include UE 101 statistics and PDU session statistics. UE 101 statistics may include statistics of UE and PDU sessions handled by the SMF 104, including a number of served UEs 101 (in the CM-CONNECTED state), and the duration the UE 101 is served by the SMF 104. PDU session statistics may include a session duration, a session active time (e.g. having data activity and the session in an active session state (e.g. a Session-ACTIVE state), a session idle time (e.g. no data activity and the session in an idle session state (e.g. a Session-IDLE state)), a number of PDU sessions requests for each DN 806, a number of PDU sessions for a service (e.g. voice, video, etc.), and a number of QoS changes/ modifications. The SMF 104 may, as requested, send reports to the NWDAF 803 over the Nd7 reference point.

Messaging between the NWDAF function 803 and the UE 101 may be sent through the SMF 104 and the AMF 103. For example, in some embodiments, when the NWDAF function 803 wants to send a measurement request to many UEs, the NWDAF 803 may send one measurement request message to the SMF 104. The SMF 104 may generate a message containing the one measurement request message and send the generated message to the AMF 103 over the N11 reference point. The AMF 103 may generate a NAS message carrying the one measurement request message and send to multiple (R)AN nodes 102 via the N2 reference point. Each of the (R)AN nodes 102 may send the NAS message using a multicast or broadcast channel to a number of UEs. Alternatively, the AMF 103 may send multiple NAS messages, to each UE currently registered with the network, via the N1 reference point and/or via the (R)AN node 102.

The UE 101 may send the Network QoS Experience reports to the AF 302 or Application Server (AS) in the UP. The UE may be configured to collect the information to be included in the Network QoS Experience report. Upon receiving the Network QoS Experience reports, the AS or AF 302 may transfer the Network QoS Experience reports to the NWDAF 803, either directly or indirectly. If transferring the reports indirectly to the NWDAF 803, the AS or AF 302 may transfer the reports to the NWDAF 803 via NEF 301 and/or PCF 205. The UE 101 may use background data transfer service of the mobile network to transfer data to the AS or AF 302 according to the background data transfer policy (BDTP) provided by the mobile network function(s), such as PCF 205. In this case, the UE 101 may send the Network QoS Experience reports at a specific time (for example at 1:00-3:00 am) according to the time duration(s) and/or at a specific location according to the BDTP (such as RAN node ID or geographical area). The AF 302 and/or AS may collect the UE Network QoS Experience reports and then transfer to the NWDAF 803.

The UE 101 may send QoS and/or QoE reports to the AF 302 through signaling messages of the AF 302 application layer sent over the user plane or control plane. The QoS and/or QoE reports may include the geographical location of the UE 101. The QoS parameters may include packet loss rate, packet delay, and other parameters. The QoE parameters may be defined by specific applications. For example, video streaming services may define an initial video buffering time, a total interruption time (total buffering time), and a total number of interruptions. The AF 302 may convert the QoE parameters into a single scalar QoE level (for example, from 1 to 5).

The AF 302 may send reports for QoS and/or QoE to the NWDAF 803 via the Nd8 reference point. The requests may be for certain services (for example, video streaming, real-time video and voice conferencing), user information (e.g. described by a user identifier), time periods, geographical areas, and combinations thereof.

Alternatively, another implementation of the Nd4 reference point can use a combination of UP functions and CP functions. For example, the UE 101 may send the messages for example the QoS and/or QoE reports to an application server in the DN 806 by using a data radio bearer of the (R)AN 102, N3 and possibly N9 reference point, and N6 reference point. The application server in the DN 806 may store the reported information from the UE 101. The AF 302 may access the reported information and forward the reported information to the NWDAF function 803 by using the Nd8 reference point. In some embodiments, the Nd8 reference point could be implemented by a direct logical link between the AF 302 and the NWDAF function 803, for example by using a service based interface. Alternatively, the Nd8 reference point may be implemented by using an intermediate function NEF (Network Exposure Function), which is part of 5G core network (CN) and not shown in FIG. 8. The messages sent between the NWDAF function 803 and the AF 302 may be sent via the NEF.

The NWDAF 803 may collect network measurement reports and store them in the UDSF 804. The NWDAF 803 may request stored data from the UDSF 804 using search criteria (e.g., a time of day, geographical locations and areas, (R)AN node(s) 102, UPF 805, AMF 103, SMF 104) via the N18 interface. The UDSF 804 may provide responses to NWDAF 803 requests via the N18 interface.

The UDSF 804 may be used to store data provided by other entities. Other network storage functions, such as a Unified Data Repository (UDR) may be used to store network reported data. The NWDAF function 803 may access the UDR function directly or indirectly via the UDM function 203.

The NWDAF 803 may send a recommendation for QoS parameters to the PCF 205 via the N23 interface. The QoS parameters may include a GBR rate, a MBR rate, an AMBR rate, different geographical locations, the (R)AN node 102, a time of the day, and a type of PDU flow (e.g. real-time video, real-time voice, video streaming, web browsing, etc.). The NWDAF 803 may also send a recommendation regarding traffic splitting policy for types of PDU sessions served by a specific (R)AN node 102 and UPF 805 (e.g. a policy that sets out which type of data flows go to which type of radio access networks).

The PCF 205, based on the recommendation for QoS parameters received from the NWDAF 803, may provide some network information, to other network entities such as some UEs 101. The network information may include QoS information, and/or traffic load information. For example, the QoS information may include the MBR at different times of the day, or at different locations surrounding the current UE location. The traffic load may indicate how busy the (R)AN 102 is. For example, the average percentage of occupied radio resources. Some application software in the UE 101, such as web browser, video player, social network, may use the QoS information to schedule their activities. For example, video player software may download (pre-fetch) more video segments, a web browser may download (pre-fetch) more web pages in advance, a social network application may download (pre-fetch) social network data. A person skilled in the art should understand that the PCF 205 may send the network information to the UE 101 via the AMF 103, where the N1 interface for NAS signaling is terminated. The AMF 103 then forwards the network information received from the PCF 205 to the UE 101. Alternatively, the NWDAF function 803 may send the network load information to the AMF 103 via the Nd6 reference point, and then the AMF may forward the network information to some selected UE 101 via the N1 reference point. Yet alternatively, the NWDAF function 803 may send the network load information to the SMF 104 via the Nd7 reference point, the SMF 104 may then send the network information to some selected UE 101 via the N11 reference point, the AMF 103, and the N1 reference point.

The NWDAF function 803 may send a recommendation regarding traffic splitting policy types of PDU sessions served by a specific (R)AN node 102 and UPF 805 to the PCF 205 via the N23 interface. After the PCF 205 receives the recommendation via the N23 reference point, the PCF 205 may produce traffic routing policies for the UE 101 and send these policies to the UE 101. Alternatively, the NWDAF function 803 may send a recommendation regarding traffic splitting policy types of PDU sessions served by a specific (R)AN node 102 and UPF 805 to the SMF 104 via the Nd7 reference point. After receiving the recommendation, the SMF 104 may subsequently use traffic splitting policy recommendation to select a UPF 805 to serve as PDU session anchor UPF, or as uplink classifier, or as branching point. The traffic splitting recommendation could be, e.g. the QoS flows for a specific video streaming service to be routed to some UPFs during at specific times of the day (e.g. 10:00 to 11:30 AM), at specific days of the week (e.g. Monday, Friday).

The PCF 205 may send requests to the NWDAF 803 via the N23 interface. One type of request may be to provide recommended QoS parameters, including a GBR rate, a MBR rate, an AMBR rate, for a PDU session type (e.g., real-time video conferencing, streaming video, real-time voice communications, etc.). This type of request may typically relate to the (R)AN node 102, but may also apply to other network components. Another type of request may be to provide recommended mobility management parameters (e.g. a discontinuous reception (DRX) cycle, a paging area, a tracking area, and a timer to deactivate a PDU session having no data activity). This type of request may typically relate to the UE 101, but may also apply to other network components. Another type of request may be to provide a UPF 805 selection policy recommendation. This type of request may typically relate to the UPF 805, but may also apply to other network components. Another type of request may be to provide traffic splitting (also known as offloading). For example, the request may be to provide which flows (e.g. video, voice, content providers, etc.) are to be served by which RATs (e.g., 5G RAN or WiFi access points) at certain times of the day, and in certain geographical areas.

The NWDAF 803 may provide the recommended QoS or mobility management parameters using service-based interface commands. The PCF 205 may send a request to the NWDAF 803 to provide recommended QoS or mobility management parameters. In some embodiments, the PCF 205 may send a request to subscribe to a notification service of the NWDAF function 803. The NWDAF function 803 is configured to analyze the information received from other network entities, compute a new value of a QoS or mobility management parameter, and send the new value of the QoS or mobility management parameter to a CN function that subscribes to get the notification.

It is understood that the service-based interfaces are used in the 5G wireless networks. Therefore, the services provided by the NWDAF function 803 to the PCF 205 may also be provided to other network functions such as the SMF 104 or the AMF 103. For example, the SMF 104 may request the NWDAF function 803 to provide UPF selection policy recommendations for individual services, such as video service, video streaming, and social data networks. The UPF selection policy recommendation may have different formats, such as in the format of ordered list of UPF 805, where the more suitable UPFs are places in the higher position of the ordered list. The UPF selection policy recommendation may be in a format of a cost vector or weight vector, where the more likely selected UPF has lower connection cost. The cost vector may include the cost to use the UPF, the cost of connection links between the UPF and (R)AN nodes, between the UPF and other UPFs, between the UPF and Data Network Access Identifiers (DNAIs), between the UPF and DNs, for both UP and DL directions. In another example, the AMF 103 may request the NWDAF 803 to provide the mobility information of UEs 101 via service based interfaces through reference point Nd6. Such mobility information may include mobility pattern of UEs.

There could be multiple logical links between two network functions. For example a (R)AN node could be connected to a UPF by two logical links, the first logical link is provided by a millimetre wave radio network, the second logical link is provided by an optical fibre network. The UPF selection recommendation may include the ordered list, or the cost vector, or weight vector of logical connections at different times of the days, different days of the week, for different applications (e.g. video streaming, URLLC applications, V2X applications, which could be represented by Application ID).

Figure 9:
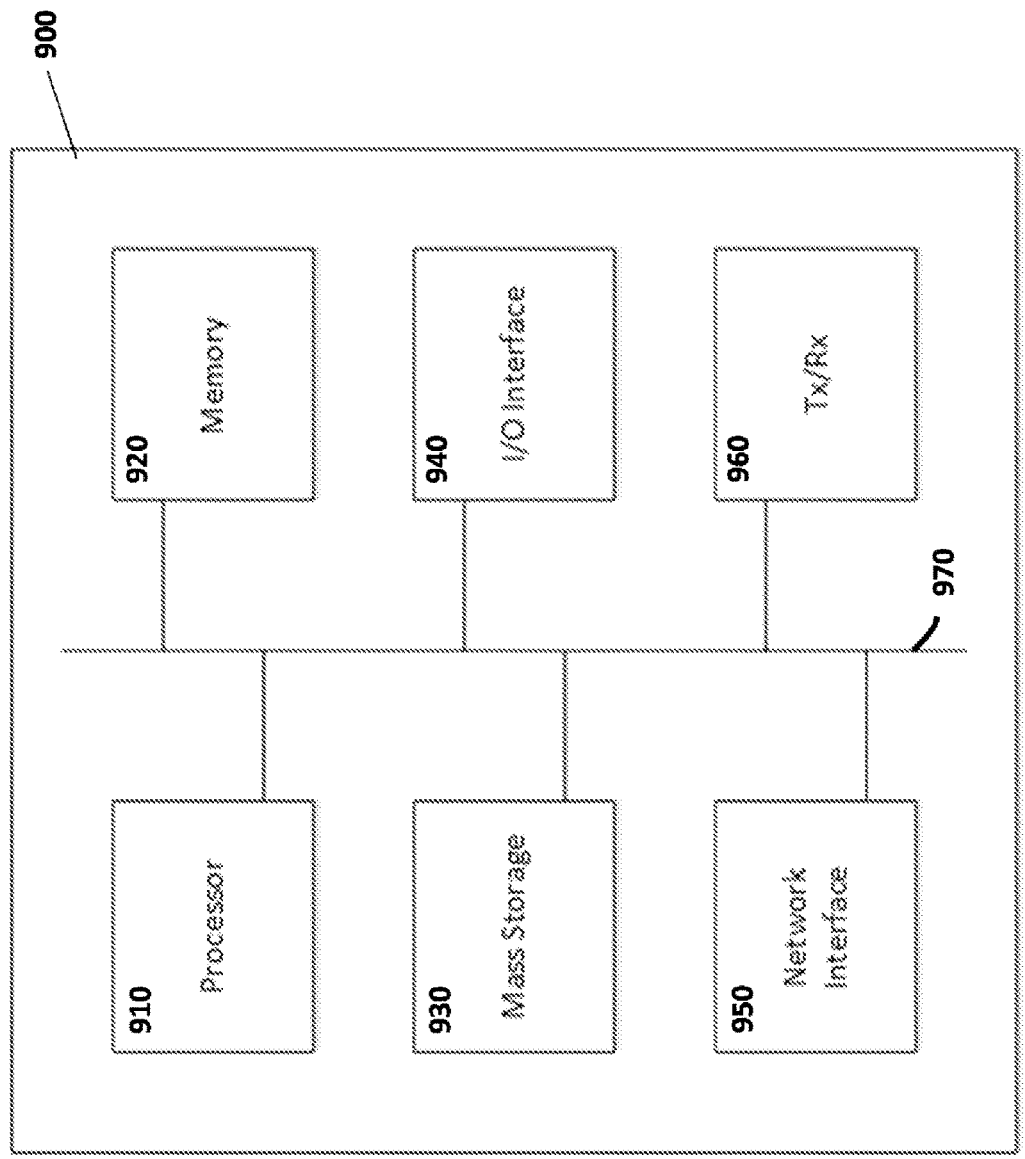
FIG. 9 illustrates, in a schematic diagram, an electronic device in accordance with embodiments of the present invention.

FIG. 9 is a schematic diagram of an electronic device 900 that may perform any or all of operations of the above methods and features explicitly or implicitly described herein, according to different embodiments of the present invention. For example, a UE may be configured as electronic device 900. Further, a network element hosting any of the network functions described herein (e.g., AMF, SMF, NWDAF) may be configured as the electronic device 900.

As shown, the device includes a processor 910, memory 920, non-transitory mass storage 930, I/O interface 940, network interface 950, and a transceiver 960, all of which are communicatively coupled via bi-directional bus 1370. According to certain embodiments, any or all of the depicted elements may be utilized, or only a subset of the elements. Further, the device 900 may contain multiple instances of certain elements, such as multiple processors, memories, or transceivers. Also, elements of the hardware device may be directly coupled to other elements without the bi-directional bus.

The memory 920 may include any type of non-transitory memory such as static random access memory (SRAM), dynamic random access memory (DRAM), synchronous DRAM (SDRAM), read-only memory (ROM), any combination of such, or the like. The mass storage element 930 may include any type of non-transitory storage device, such as a solid state drive, hard disk drive, a magnetic disk drive, an optical disk drive, USB drive, or any computer program product configured to store data and machine executable program code. According to certain embodiments, the memory 920 or mass storage 930 may have recorded thereon statements and instructions executable by the processor 910 for performing any of the aforementioned method operations described above.

Figure 10A:
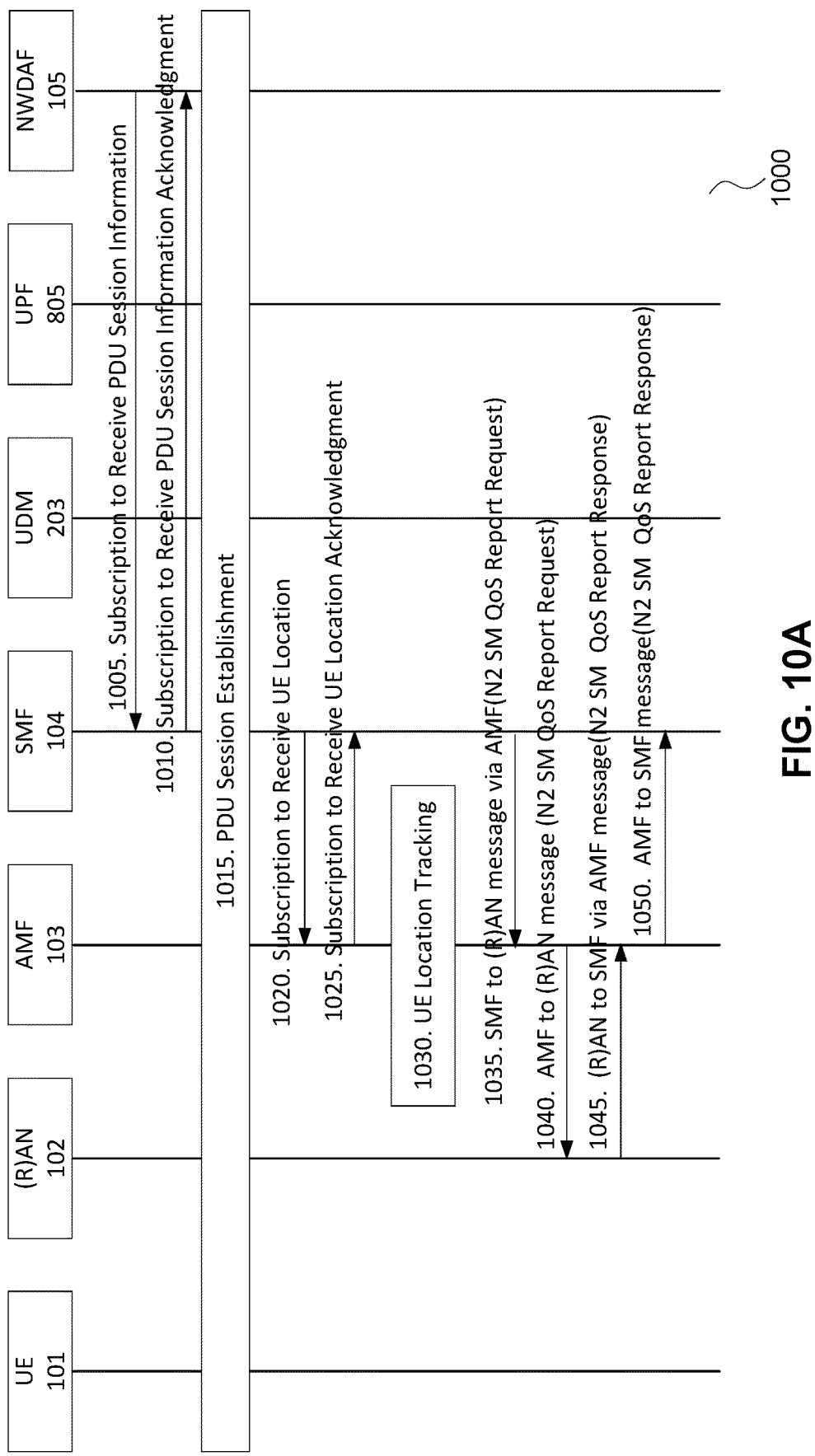
FIGS. 10A and 10B illustrate, in a message flow diagram, operations related to QoS data collection for satisfying the NWDAF, according to an embodiment of the present invention.
Figure 10B:
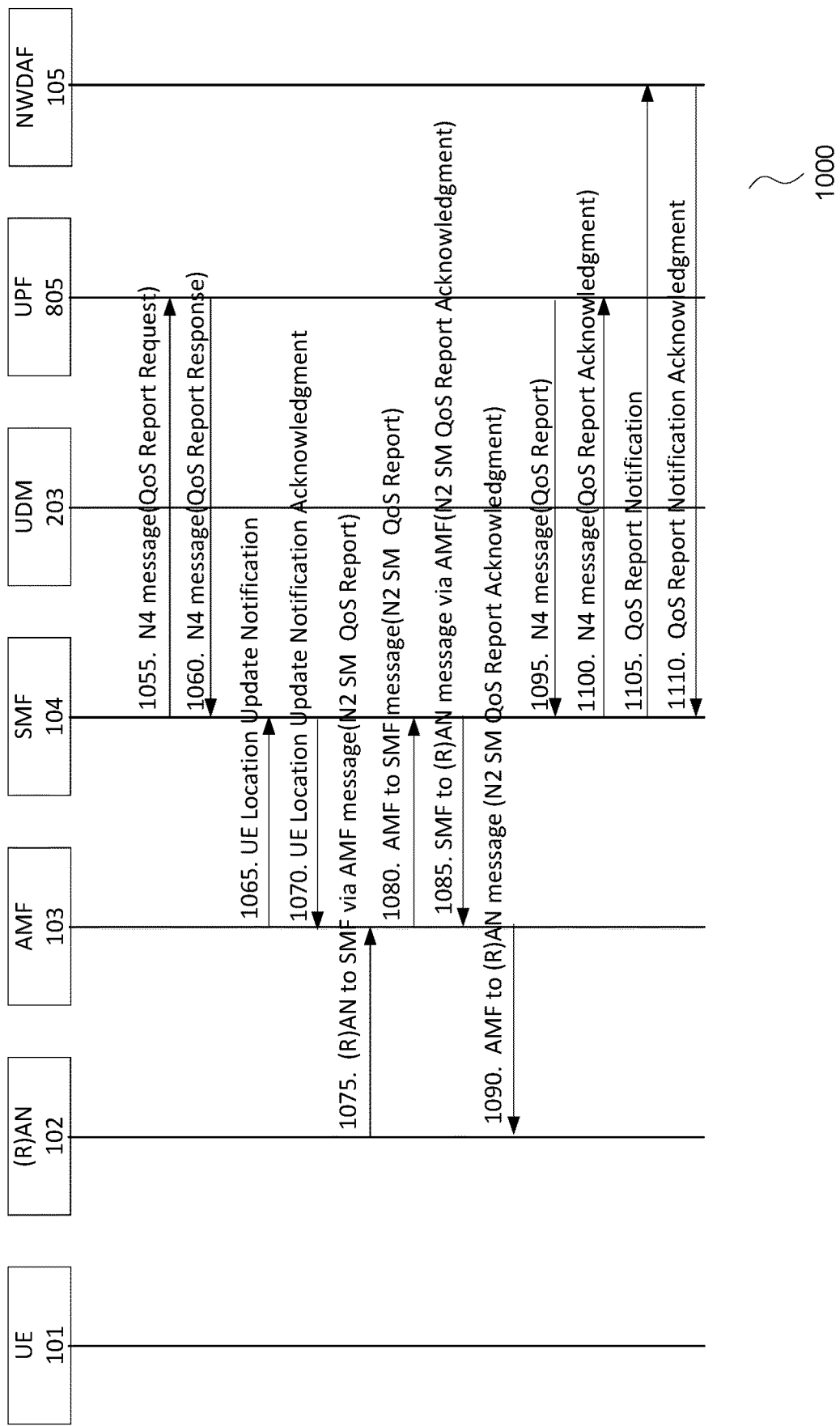

A procedure to illustrate methods disclosed above for the NWDAF to collect network data for producing QoS analytics information is shown in FIGS. 10A and 10B. It should be understood that FIG. 10B is a continuation of operations of FIG. 10A.

At operation 1005, the NWDAF 105 may send a subscription message to receive one or more of following information: the PDU Session Information, events associated with PDU Session. The requested PDU Session Information may include one or more of following information: UE ID (e.g. SUPI, GPSI, SUCI), a group of UE (e.g. represented by Internal Group ID, External Group ID), PDU Session ID, resource type of PDU session (which could be, e.g. GBR, delay critical GBR, non-GBR), IP address used for the PDU Session, packet filters of the PDU Session, Application ID, DNAI that the UPF 805 sends packets of PDU session to the DN 806, QoS information of the PDU session. The events associated with PDU Session may include one or more of following events: The QoS Notification Control reported by (R)AN 102, mobility events of UE, PDU Session status (e.g. PDU Session establishment, PDU Session modification, PDU Session release, user plane deatctivation, user plane acitivation), QoS reports from the (R)AN 102 and/or QoS reports from the UPF 805, QoS measurement reports from the (R)AN 102 and/or QoS measurement report from the UPF 805, charging information from the UPF 805. The subscription message may include the measurement configuration data which specifies the QoS parameters to be monitored and reported, and how often the QoS parameters are reported.

The subscription message in operation 1005 may include a subscription filter, which may include one or more of following parameters: application information (e.g. Application ID(s), AF Service ID(s), DNAI(s), packet filters of the application server(s)), UE information (e.g. UE ID(s) (such as SUPI, GPSI)), UE group information (e.g. Internal Group ID(s), External Group ID(s), UE ID(s)), location information (e.g. RAN ID(s), Cell ID(s), tracking area(s), registration area(s), LADN service area(s), list of road segments, geographic zone ID(s)), time information (e.g. start time and end time). For example, the subscription filter may have an Application ID. If a UE 101 requests the SMF 104 to establish a PDU Session that accesses a service in the DN having the same Application ID, the SMF 104 may provide PDU Session Notification to the NWDAF 105.

The subscription message in operation 1005 may include an expiry time, which indicates when the subscription may be considered expired or when the NWDAF 105 may evaluate whether to stop the subscription to receive PDU session information.

In operation 1010, the SMF 104 may send to the NWDAF 105 an acknowledgement for the subscription message in operation 1005. The acknowledgment message may include a subscription correlation ID that can be used later to refer to the subscription of NWDAF 105. The SMF 104 may send the first PDU Session information if the SMF has the information requested by the NWDAF 105.

In step 1015, the UE 101 may request the mobile network to establish a PDU session.

In operation 1020, if the PDU session established for the UE 101 in operation 1015, or existing PDU sessions have some parameters matched with the subscription filter described in operation 1010, the SMF 104 may send a subscription message to the AMF 103 to receive the UE location information. This message may be implemented by using, for example, Namf_Location_ProvidePositioningInfo Request or Namf_Location_ProvideLocationInfo Request to get the Geodetic Location or 5G System Location of the UE 101.

Namf_Location_ProvidePositioningInfo service operation provides UE positioning information to the consumer NF. The input parameters may include UE Identification (SUPI or PEI), External Client Type, and location update periodicity. The location update periodicity indicates how often the UE location is sent to from the AMF to the consumer NF, such as NWDAF 105. Other input parameters may include one or more of following information: Location QoS, Supported Universal Geographical Area Description (GAD) shapes. The output information may include one or more of following information: Success/Failure indication, Geodetic Location, Civic Location, Position Methods Used, and Failure Cause.

The Namf_Location_ProvideLocationInfo service operation provides Network Provided Location Information (NPLI) of a target UE to the consumer NF. The consumer NF, such as NWDAF 105 may provide one or more of following information items: UE Identification (e.g. SUPI), 5GS Location Information Request, Current Location Request, RAT type Requested, Local Time Zone Request, and location update periodicity. The AMF 103 may provide a response to the consumer NF indicating one or more of: a Success/Failure indication, 5GS Location Information (Cell Identity, Tracking Area Identity, Geographical/Geodetic Information, Current Location Retrieved, Age of Location Information, Current RAT Type), Local Time Zone, and Failure Cause. In the case of non-3GPP access, the response may indicate a UE local IP address (used to reach the N3IWF) and optionally UDP or TCP source port number (if NAT is detected).

If the NWDAF 105 sends the location update periodicity (e.g. 2 seconds) in operation 1020, the AMF 103 may send the location information of the UE 101 to the NWDAF 105 periodically according to this periodicity (e.g. every 2 seconds).

In operation 1030, the AMF 103 performs UE location tracking. The AMF 103 may use the methods described in clause 4.13.5 "Location Service procedures" of 3GPP TS 23.502.

In operation 1035, the SMF 104 may send to the (R)AN 102 via the AMF 103, an N2 SM QoS Report request. This request message may include an identifier to identify the UE 101, an identifier to identify the PDU Session of the UE 101, the RAN measurement configuration data which specifies the QoS parameters to be monitored and reported, how often the QoS parameters are reported, or a combination thereof. The RAN measurement configuration data may contain configuration parameters, which may be the same or may be derived from the measurement configuration data received from the NWDAF 105 in operation 1005. The SMF may use a service of the AMF, such as Namf_Communication_N1N2MessageTransfer service to send the N2 SM QoS Report request to the AMF 103. The N2 SM QoS Report request may contain one or more of the following parameters: UE ID (e.g. SUPI, GPSI, PEI), PDU Session ID, QFI, measurement periodicity (e.g. how often the report is sent from the (R)AN node 102 to the SMF 104), a report schedule (e.g. when the measurement report is sent by the (R)AN node 102 to SMF 104), events to be monitored (e.g. congestion events, packet delay events, etc.), QoS parameters to be monitored: measured flow bit rate of QoS flows (e.g. UL and/or DL GFBR of GBR QoS flow, UL and/or DL maximum flow bit rate (MFBR) of QoS flow), measured Aggregate Bit Rates (e.g. UL and/or DL per Session Aggregate Maximum Bit Rate (Session-AMBR), UL and DL per UE Aggregate Maximum Bit Rate (UE-AMBR), measured Packet Loss Rate, measured Data Burst Volume in the UL and/or DL, and measured average or individual packet delay of PDUs in the UL and/or DL.

In operation 1040, the AMF 103 forwards the message N2 SM QoS Report Request received from the SMF 104 to the (R)AN 102.

The (R)AN 102 receives the measurement configuration data from the SMF 102 and performs QoS monitoring and reporting.

In operation 1045, the (R)AN 102 may send to the SMF 104 via the AMF 103 an N2 SM QoS Response message to acknowledge the message received from the SMF 104 in operation 1040.

In operation 1050, the AMF 103 forwards the message received in operation 1045 to the SMF 104. The AMF 103 may use the service Nsmf_PDUSession_UpdateSMContext Request to forward the N2 SM message to the SMF 104.

In operation 1055, the SMF 104 may send an N4 message to the UPF 805. The N4 message may include QoS Report Request, which may contain measurement configuration data for the UPF 805. This request message may include an identifier to identify the UE 101, an identifier to identify the PDU Session of the UE 101 such as N4 Session ID, the UPF measurement configuration data which specifies the QoS parameters to be monitored and reported, how often the QoS parameters are reported. The UPF measurement configuration data may contain configuration parameters, which may be the same or may be derived from the measurement configuration data received from the NWDAF 105 in operation 1005. The N4 QoS Report Request may contain one or more of following parameters: N4 Session ID to identify the N4 session dedicated to the PDU session of the UE 101, UE ID (e.g. SUPI, GPSI, PEI), PDU Session ID, QFI, measurement periodicity (e.g. how often the report is sent from the (R)AN node 102 to the SMF 104), a report schedule (e.g. when the measurement report is sent by the (R)AN node 102 to SMF 104), events to be monitored (e.g. congestion events, packet delay events, etc.), QoS parameters to be monitored: measured flow bit rate of QoS flows (e.g. UL and/or DL GFBR of GBR QoS flow, UL and/or DL maximum flow bit rate (MFBR) of QoS flow), measured Aggregate Bit Rates (e.g. UL and/or DL per Session Aggregate Maximum Bit Rate (Session-AMBR), UL and DL per UE Aggregate Maximum Bit Rate (UE-AMBR), measured Packet Loss Rate, measured Data Burst Volume in the UL and/or DL, measured average or individual packet delay of PDUs in the UL and/or DL.

In operation 1060, the UPF 805 may send an N4 message to the SMF 104. The N4 message may contain a QoS Report Response to acknowledge the reception and/or confirm the measurement setting in the UPF 805 according to the measurement configuration sent in the message in operation 1055.

The SMF 104 may send the N4 message to the UPF 805 in operation 1055 before sending the N2 SM QoS Report Request to the (R)AN 102 in operation 1035.

In operation 1065, the AMF 103 may send the UE Location Update Notification to the SMF 104. This message may be implemented by using a service of AMF, for example, Namf_Location_ProvidePositioningInfo Response or Namf_Location_ProvideLocationInfo Response to get the geographical location, or Geodetic Location or 5G System Location of the UE 101. The message may include a timestamp indicating when the UE Location was received in the AMF 103.

In operation 1075, the (R)AN 102 may send to the SMF 104 via AMF 103 a message N2 SM QoS Report to report the QoS parameters and/or events as configured in the RAN measurement configuration data, including a timestamp when the measurement has been taken.

In operation 1080, the AMF 103 forwards the N2 SM message that carries QoS Report to the SMF 104. The AMF 103 may use the service Nsmf_PDUSession_UpdateSMContext Request to forward the N2 SM message to the SMF 104. The SMF 104 may store the received message and a timestamp when the SMF 104 received the N2 SM message.

In some embodiment, after receiving the message from the AMF 102 in operation 1080, the SMF 104 may also send to the AMF 103 a message to request for UE Location. This operation is not shown in FIG. 10B. For example, the SMF 104 may send to the AMF 103 a message Namf_Location_ProvidePositioningInfo Request or Namf_Location_ProvideLocationInfo Request to get the Geodetic Location or 5G System Location of the UE 101. The AMF 103 may send the UE location information to the SMF 104.

The SMF 104 may send to the NWDAF 105 one of following information: the (R)AN message received from (R)AN 102 (e.g. QoS Report), time stamp (R)AN message, UE location, and time stamp of UE location.

In operation 1085, the SMF 104 may send to the (R)AN 102 via the AMF 103 an N2 SM message that carries the QoS Report Acknowledgment. This message is to acknowledge that the SMF has received the N2 SM QoS Report from the (R)AN 102. The SMF 103 may use a service of the AMF, such as Namf_Communication_N1N2MessageTransfer service to send the N2 SM QoS Report Acknowledgment to the AMF 103. In operation 1090, the AMF 103 may forward the N2 SM QoS Report Acknowledgment message to the (R)AN 102.

In operation 1095, the UPF 805 may send an N4 message to the SMF 104 that carries QoS Report. The QoS Report may contain measured QoS parameter(s) and/or QoS event(s) according to the instruction in the UPF measurement configuration, and a timestamp indicating the time the measurement was taken. The message in operation 1095 may be implemented by an N4 Session Report message.

In some embodiment, after receiving the message from the UPF 805 in operation 1095, the SMF 104 may send to the AMF 103 a message to request for UE Location. This operation is not shown in FIG. 10B. For example, the SMF 104 may send to the AMF 103 a message Namf_Location_ProvidePositioningInfo Request or Namf_Location_ProvideLocationInfo Request to get the Geodetic Location or 5G System Location of the UE 101. The AMF 103 may send the UE location information to the SMF 104.

The SMF 104 may send to the NWDAF 105 one of following information: the UPF message received from UPF 805 (e.g. QoS Report), time stamp (R)AN message, UE location, and time stamp of UE location. In operation 1100, the SMF 104 may send to the UPF 805 a message to acknowledge the reception of message received in operation 1095. The message in operation 1100 may be implemented by an N3 Session Report ACK message.

In operation 1105, the SMF 104 may send to the NWDAF 105 the QoS Report Notification. This notification contains the measured QoS parameter(s) and/or QoS event(s) according to the subscription content in the message in operation 1005. The SMF 104 may include one or more of following information in operation 1105: The UE location information and timestamp of location that were notified by the AMF 103 in operation 1065, the measured QoS parameter(s) and/or the QoS event(s) and the timestamp(s) of measured QoS parameter(s) and/or QoS event(s) received from the (R)AN 102, the measured QoS parameter(s) and/or the QoS event(s) and the timestamp(s) of measured QoS parameter(s) and/or QoS event(s) received from the UPF 805.

In some embodiment, after receiving the message from the SMF 104 in operation 1105, the SMF 104 may also send to the AMF 103 a message to request for UE Location. This operation is not shown in FIG. 10B. For example, the NWDAF 105 may send to the AMF 103 a message Namf_Location_ProvidePositioningInfo Request or Namf_Location_ProvideLocationInfo Request to get the Geodetic Location or 5G System Location of the UE 101. The AMF 103 may send the UE location information to the NWDAF 105. The NWDAF 105 may store in a data storage function one or more of following information: the receive QoS Report, the timestamp of the QoS Report, and the UE location. The received information may be used to create QoS analytics information.

In operation 1110, the NWDAF 105 may send to the SMF 104 a QoS Report Notification Acknowledgment to acknowledge the reception of message in operation 1105.

Some of the messages in FIG. 10 may be sent together with some of the messages of existing procedures in 3GPP TS 23.502, such as PDU Session Establishment described in in clause 4.3.2, or PDU Session Modification in clause 4.3.3. One example to combine the messages in FIG. 10 and the messages performed during PDU Session Establishment operation 1015 as described in clause 4.3.2.2.1 of 3GPP TS 23.502, which is incorporated by reference.

For example, the N2 SM QoS Report Request may be sent in step 11 of PDU Session Establishment procedure, in which the QoS Report Request may be a part of the NAS message to be sent to the (R)AN 102. The SMF 104 may include in the QoS Profiles of QoS flows QoS Parameter Notification control parameter to request the (R)AN 102 to report QoS events to the SMF. If the QoS Parameter Notification control is received for a QoS flow, such as GBR QoS flow, the (R)AN 102 may send to the SMF 104 one or more of following QoS information, for example the QoS information described in clause 5.7.2.4 of 3GPP TS 23.501. The (R)AN 102 may send a notification towards SMF that the GFBR can no longer be guaranteed, and may provide values for the GFBR, the PDB and the PER parameters it can guarantee. The (R)AN 102 may indicate the reference to the Alternative QoS profile(s) together with the notification to the SMF. When the (R)AN 102 may determine that the GFBR can be guaranteed again for a QoS Flow (for which a notification that the GFBR can no longer be guaranteed has been sent), the (R)AN 102 may send a notification, informing the SMF 104 that the GFBR can be guaranteed again. In step 12, N2 PDU Session Request of clause 4.3.2.2.1 of 3GPP TS 23.502, the AMF 103 may send the NAS message to the (R)AN 102, and the NAS message may include the QoS Report Request in the format of QoS Parameter Notification control activation request. The (R)AN 102 may include the QoS Report Response as part of the N2 PDU Session Response in step 14 of clause 4.3.2.2.1 of 3GPP TS 23.502. In step 15 of clause 4.3.2.2.1 of 3GPP TS 23.502, the AMF 103 may forward the message receive in step 14 of clause 4.3.2.2.1 of 3GPP TS 23.502 to the SMF 104.

In some embodiment, the message in operation 1005 may be implemented by using a service of SMF 104. For example, the NWDAF 105 may use Nsmf_EventExposure_Subscribe service to subscribe for PDU Session events, QoS events of the PDU Session. The message in operation 1105 may be implemented by Nsmf_EventExposure_Notify service of the SMF 104. The SMF 104 may send Nsmf_EventExposure_Notify message to the NWDAF 105 to carry event information to the NWDAF 105.

In another embodiment, the NWDAF 105 may send a Subscription to the AMF 103 to receive the UE Location Notification. This message is similar to the message described in operation 1020. The SMF 104 may or may not need to perform operation 1020.

In another embodiment, the SMF 104 may include the address of NWDAF 105 in operation 1065. The SMF 104 may include the address (e.g. IP address), or FQDN (fully qualified domain name), or ID of NWDAF 105 as Notification Target address. Then when the UE location is available, the AMF 103 may notify the NWDAF 105 the UE location.

In another embodiment, the message in operation 1055 may be sent in the message of step 10a, N3 Session Establishment/Modification Request, clause 4.3.2.2.1, 3GPP TS 23.502.

In another embodiment, the message in operation 1055 may be sent in the message of step 8a, N4 Session Modification Request, of clause 4.3.3.2, 3GPP TS 23.502. The SMF 104 may provide the N4 rules containing QoS Monitoring policy. The QoS Monitoring policy may provide the list of QoS parameters (e.g. packet delay) to be monitored and reported.

In some embodiment, the message in operation 1035 may be sent together, or as part of message sent in step 3b Namf_Communication_N1N2MessageTransfer of clause 4.3.3.2, 3GPP TS 23.502. The SMF 104 may request the (R)AN 102 to perform QoS Monitoring in order to create QoS report for one or more QoS flows. For example, the SMF 104 may request the (R)AN 102 to perform packet delay measurement for UL and/or DL N3 interface between the (R)AN 102 and UPF 805, and/or to perform packet delay measurements for UL and/or DL of radio interface between the UE 101 and (R)AN 102.

In some embodiment, in operation 1095, the UPF 805 may send the QoS Report to the NWDAF 105; the UPF 805 may or may not send the QoS Report to the SMF 104.

In some embodiment, the UPF 805 may send the QoS Report to the SMF 104 by using N4 Session Level reporting procedure as described in clause 4.4.2.2 of 3GPP TS 23.502, whenever a trigger to report the events happens. The UPF 805 may include the timestamp, which may indicate the time the event happened in the QoS Report.

The NWDAF 105 may be notified of the UE location (e.g. geographic location, geodetic location, 5G system location, civic address) with the timestamp, either by the SMF 104 and/or the AMF 103. The NWDAF 105 may be notified of the measured QoS parameter(s) and/or QoS event(s) from the SMF 104, and/or (R)AN 102, and/or UPF 805. The NWDAF 105 may combine UE location information and measured QoS information and events, and analyze this information of one or many PDU Sessions, and/or QoS flows of one or many UEs to derive the potential QoS change analytics for road segments.

A first set of embodiments of the present invention provides for a method for supporting User Equipment (UE) operation in a wireless communication network, comprising: obtaining, by a control plane function of the wireless communication network, information indicative of quality of service (QoS) for network access from a specified location and connection context information; and transmitting the information or data derived from the information toward an authorized or subscribed UE, the obtaining and transmitting performed prior to or in absence of a request by the UE for said information.

In some of the first set of embodiments, the information or data derived from the information is indicative of one or more of MFBR, GFBR, PER, PDB, Session-AMBR and MDBV. In some of the first set of embodiments, the information or data derived from the information is transmitted by a (R)AN toward the UE in a QoS Notification Control message. In some of the first set of embodiments, the QoS Notification Control message indicates the current value of one or more QoS parameters may not be supported and one or more new values indicative of QoS parameters that may be supported by the (R)AN. In some of the first set of embodiments, the QoS Notification Control message is transmitted by a new RAN designated to serve the UE in association with a path switch request, the QoS Notification Control message being transmitted when the new RAN cannot support one or more QoS flows of one or more PDU sessions involving the UE. In some of the first set of embodiments, the QoS notification control message indicates that one or more target QoS parameters in the QoS level(s) could not be supported. This is true even if these target QoS parameters were previously supported. For example, the RAN may send a notification towards an entity indicating that a target parameter can no longer be guaranteed, and, in some embodiments, also indicating which value can be guaranteed for the target parameter. The QoS parameters can indicate values that the mobile network or RAN may currently support.

Some of the first set of embodiments further comprise: obtaining, by the control plane function, a plurality of predicted future locations of the UE; obtaining, by the control plane function, information for each of the plurality of predicted future locations, the information indicative of QoS, for network access by the UE; and transmitting the information for each of the plurality of predicted future locations or data derived from the information for each of the plurality of predicted future locations toward the UE. In some of the first set of embodiments, the information is for each of the plurality of predicted future locations to control how a vehicle associated with the UE is driven, and the plurality of predicted future locations correspond to road segments planned or predicted to be traversed by the vehicle. In some of the first set of embodiments, obtaining the information for each of the plurality of predicted future locations comprises transmitting an indication of the predicted future locations to a NWDAF, optionally along with timing information, and receiving the QoS information from the NWDAF.

In some of the first set of embodiments, the control plane function is a session management function (SMF), an access management function (AMF), a policy control function (PCF), or a network data analytics function (NWDAF).

Some of the first set of embodiments further comprise causing the control plane function to obtain and transmit the information toward the UE in response to one or more of: receiving a notification control message from a (R)AN serving the UE, the notification control message indicative that QoS targets for serving the UE cannot be fulfilled; receiving a path switch request from a (R)AN newly serving the UE during a handover procedure; receiving an instruction, during a PDU session establishment procedure for the UE, to transmit the QoS information toward the UE; and receiving an indication, from an AF, requesting transmission of the QoS information toward the UE or a group of UEs comprising the UE.

In some of the first set of embodiments, the information is to control how a vehicle associated with an application operating on the UE is driven.

In some of the first set of embodiments, the information is indicative of QoS at a future time, an expected future location, or a combination thereof.

In some of the first set of embodiments, the information is statistical QoS information based on historical network performance at the specified location.

In some of the first set of embodiments, the method is performed automatically by the control plane function following PDU session establishment for the UE.

In some of the first set of embodiments, one or more sets of QoS levels corresponds to one or more operating modes of the UE, and wherein the information is indicative of which of said sets of QoS levels are currently satisfied, or wherein the information is indicative of QoS values for parameters used in said sets of QoS levels.

In some of the first set of embodiments, the information is obtained from a network data analytics function (NWDAF). In some of the first set of embodiments, the control plane function subscribes to the NWDAF to obtain the information.

Some of the first set of embodiments further comprise determining whether the UE is authorized to receive the information by querying a user subscription database.

A second set of embodiments of the present invention provides for a method supporting User Equipment (UE) operation in a wireless communication network, the method comprising: receiving, by a control plane function, a request for network QoS information from the UE, the request including a message usable for verifying that the UE, a UE application operating thereon, or both, are authorized to receive the network QoS information; if the UE is authorized, obtaining the QoS information from a NWDAF; and transmitting the QoS information or data derived from the QoS information toward the UE.

Some of the second set of embodiments further comprise determining whether the UE is authorized by: selecting a vehicle-to-everything control function (V2XCF) for authorizing operations of the UE; and determining whether the UE is authorized by querying the V2XCF. In some of the second set of embodiments, selecting the V2XCF is based on PDU session context information optionally including one or more of: S-NSSAI, DNN, PDU session type, RAT type, Application ID, V2X application ID, and PDU session ID, or wherein selecting the V2XCF is based on information received from a NRF, or a combination thereof. In some of the second set of embodiments, the V2XCF is configured to provide authorization for the UE based on one or more of: the request from the UE; a V2X application ID, an application ID, S-NSSAI, DNN, and RAT type. In some of the second set of embodiments, the V2XCF is configured to indicate authorization parameters comprising one or more of: type of network QoS information the UE may receive, optionally including one or both of: statistical network QoS information based on historical network performance and short-term network QoS information based on current network conditions; one or more QoS parameters the UE can use for its application, optionally including one or more of: GFBR, MFBR, PDB, and PER; a threshold level for QoS values at which the UE is to be notified to the UE; and a probability that a QoS parameter value will drop below a currently supported QoS level.

In some of the second set of embodiments, the method is performed following PDU session establishment for the UE, said PDU session establishment comprising one or both of: authorizing the UE to receive the network QoS information; and determining whether the UE is to receive long-term QoS information based on historical network performance statistics, short-term QoS information based on current network conditions, or a combination thereof.

Some of the second set of embodiments further comprise: subsequently receiving a request for updated QoS information from the UE; obtaining further QoS information from one or both of: a (R)AN currently serving the UE; and a (R)AN anticipated to be serving the UE at a future time based on route information for the UE; and transmitting the further QoS information or data derived from the further QoS information toward the UE.

In some of the second set of embodiments, the further QoS information is short-term QoS information indicative of QoS levels for a predetermined period of time into the immediate future.

Some of the second set of embodiments further comprise establishing a PDU session with the UE prior to said receiving the request, wherein, during PDU session establishment, the UE requests authorization to receive the network QoS information and specifies one or more parameters indicative of type of the network QoS information requested, and wherein the control plane function, another control plane function, the V2XCF, or a combination thereof, subsequently use the one or more parameters for responding to the request for network QoS information.

In some of the second set of embodiments, the requested QoS information is long-term QoS information based on historical statistics for a location specified in the request, or wherein the requested QoS information is short-term QoS information based on current conditions for the location specified in the request.

In some of the second set of embodiments, the short-term QoS information is provided when a probability of QoS levels for the location dropping below a predetermined critical QoS threshold is higher than a predetermined probability threshold.

The second set of embodiments of the present invention may additionally or alternatively provide for a method of operating a UE assisting driving of a vehicle, the method comprising: obtaining, by the UE, long-term statistical network QoS information for locations along a vehicle route, the long-term statistical network QoS information obtained from a NWDAF; identifying a critical location along the vehicle route; and requesting, by the UE, short-term network QoS information for the critical location, wherein the UE uses the QoS information to control how the vehicle is driven. The short-term network QoS information may be provided by a (R)AN serving the critical location. The critical location may correspond to a location at which a probability of QoS levels dropping below a predetermined critical QoS threshold is higher than a predetermined probability threshold.

A third set of embodiments of the present invention provides for a method supporting User Equipment (UE) operation in a wireless communication network, the method comprising: following establishment of a PDU session for the UE, transmitting, by an AF, an information request or a subscription request toward an NWDAF, the information request or the subscription request indicative of a request to obtain an indication of critical road segments or sub-segments, planned or predicted to be traversed by a vehicle associated with the UE, for which a probability of QoS levels dropping below a predetermined critical QoS threshold is higher than a predetermined probability threshold; receiving a response to the information request from the NWDAF; and initiating an adjustment in operation of the UE based on the response.

In some of the third set of embodiments, the road segments correspond to portions of a road to be traversed in their entirety by the vehicle according to a planned or predicted route, and wherein each road sub-segment corresponds to a portion of a corresponding road segment for which QoS parameters, serving access nodes, or a combination thereof, are consistent. In some such embodiments, the NWDAF provides, in response to the request, one or both of: a probability that a QoS parameter will fall below a predetermined minimum QoS value specified in a QoS profile for the UE; and an indication of one or more road sub-segments for which the probability of QoS levels dropping below the predetermined critical QoS threshold is higher than the predetermined probability threshold.

In some of the third set of embodiments, the adjustment in operation of the UE comprises adjusting a mode by which the UE assists in driving the vehicle. Ion some such embodiments, adjusting the mode comprises selecting a mode from the group consisting of: fully automated driving at a high speed; fully automated driving at a low speed; remote controlled driving; and driving the vehicle in formation with one or more other nearby vehicles.

A fourth set of embodiments of the present invention provides for a method for supporting User Equipment (UE) operation in a wireless communication network, the method comprising, by a network data analytics function (NWDAF) or another function operating in the network: obtaining travel route information for the UE, the travel route information corresponding to a planned or predicted route to be traversed by a vehicle associated with the UE; obtaining QoS requirements for an application operating at least partially on the UE; determining whether portions of the route exist for which a determined probability of failing to meet the QoS requirements is at least equal to a predetermined threshold; and when one or more of said portions of the route exist, transmitting an indication of said one or more portions of the route toward one or more of: the UE; an application in the network which cooperates with the UE for assisting driving of the vehicle; a vehicle-to-everything control function (V2XCF) operating in the network; a policy control function (PCF) operating in the network; and another function operating in the network.

In some of the fourth set of embodiments, the UE is configured for assisting driving of the vehicle. In some such embodiments, the QoS requirements comprise one or more QoS levels, wherein each QoS level specifies minimum requirements for a respective operating mode of the application, each operating mode assisting driving of the vehicle in a different manner. In some embodiments, the operating modes comprise one or more of: fully automated driving at a high speed; fully automated driving at a low speed; remote controlled driving; and driving the vehicle in formation with one or more other nearby vehicles. Some of the embodiments further include obtaining PDU session information for the UE.

The fourth set of embodiments of the present invention may additionally or alternatively provide for a method for supporting User Equipment (UE) operation in a wireless communication network, the UE, the method comprising, by a vehicle-to-everything control function (V2XCF), a policy control function (PCF) operating in the network, or another function operating in the network: obtaining QoS requirements for an application operating at least partially on the UE; determining a potential QoS change notification configuration (PQCNC) indicative of network QoS information for a plurality of locations along a planned or predicted route to be traversed by a vehicle associated with the UE; and transmitting network QoS information as defined by the PQCNC toward one or more of: the UE; an application in the network which cooperates with the UE for assisting driving of the vehicle; a network data analytics function (NWDAF) operating in the network; and another function operating in the network.

In some of these fourth set of embodiments, a potential QoS change notification configuration (PQCNC) directs transmission of the QoS information from the NWDAF.

In some of these fourth set of embodiments, wherein the QoS information comprises an indication of one or more critical road segments for which a determined probability of failing to meet QoS requirements is at least equal to a predetermined threshold.

In some of these fourth set of embodiments, the QoS information further comprises an indication of corresponding times at which each of the one or more critical road segments occur.

In some of these fourth set of embodiments, the QoS requirements comprise one or more QoS levels, wherein each QoS level specifies minimum requirements for a respective operating mode for assisting driving of the vehicle in a different manner.

The fourth set of embodiments of the present invention may additionally or alternatively provide for a method supporting operation of an application interactive with a wireless communication network, wherein the application configured for assisting driving of a vehicle, the method comprising: receiving, by a control plane function, a request for network QoS information from an application function operating at least part of the application; obtaining the QoS information from a NWDAF; and transmitting the QoS information or data derived from the QoS information toward the application function.

In some of these fourth set of embodiments, the request includes a message usable for verifying that the application, a UE interoperating with the application to drive the vehicle, or both, are authorized to receive the network QoS information, and performing the obtaining and the transmitting if the application is authorized.

Some of these fourth set of embodiments further include determining whether the UE is authorized by: selecting a vehicle-to-everything control function (V2XCF) suitable for supporting operation of the application, the UE, or both; and obtaining application QoS information by querying the V2XCF.

A fifth set of embodiments of the present invention provides for a method according to the fourth set of embodiments (second variation), where the method is performed by the PCF, and wherein the PCF provides the PQCNC or an indication thereof to one or more other control plane functions operating in the network.

In some such ones of the fifth set of embodiments, the one or more other control plane functions comprise one or more of: an access management function (AMF); a session management function (SMF); and the NWDAF.

Additionally or alternatively, the fifth set of embodiments provides for a method according to the second set of embodiments (first variation), where the control plane function is a policy control function (PCF).

Some such ones of the fifth set of embodiments further include obtaining, from an access management function, updates indicative of a current location of the UE; comparing the updates indicative of the current location with an expected current location based on a planned or predicted route of the UE; and when there is a mismatch between the current location and the expected current location, obtaining updated QoS data from the NWDAF.

Some such ones of the fifth set of embodiments further include obtaining, from an application function, updates indicative of a current location of the UE; comparing the updates indicative of the current location with an expected current location based on a planned or predicted route of the UE; and when there is a mismatch between the current location and the expected current location, obtaining updated QoS data from the NWDAF.

Additionally or alternatively, the fifth set of embodiments of the present invention provides for a method according to the fourth set of embodiments (second variation), wherein the NWDAF or another function operating in the network transmits network QoS Information for the planned or predicted route to be traversed by the vehicle towards one or more of: the UE; the application in the network; the V2XCF; the PCF; and another function operating in the network.

Additionally or alternatively, the fifth set of embodiments of the present invention provides for a method according to the fourth set of embodiments (second variation), wherein the NWDAF or another function operating in the network transmits network QoS Information for two or more alternative routes traversable by the vehicle towards one or more of: the UE; the application in the network; the V2XCF; the PCF; and another function operating in the network.

In some such ones of the fifth set of embodiments, a QoS parameter value for one or more of the alternative routes is higher than the QoS parameter value for the planned or predicted route to be traversed by the vehicle.

Additionally or alternatively, the fifth set of embodiments of the present invention provides for a method according to the fourth set of embodiments (second variation), wherein the UE or an AF transmits indications of two or more alternative routes traversable by the vehicle towards the NWDAF or another function operating in the network.

In some such ones of the fifth set of embodiments, the UE or an AF transmits a plurality of locations along the alternative routes for the vehicle towards the NWDAF or another function operating in the network.

In some such ones of the fifth set of embodiments, the UE or an AF notifies the NWDAF or another function operating in the network of a preferred route to be traversed by the vehicle, the preferred route is determined by the UE or the AF based on one or more of the network QoS Information, travel distance, travel time, and network communication support for the planned or predicted route and the alternative routes.

In some such ones of the fifth set of embodiments, the NWDAF or other function operating in the network provides, to the UE or the AF, network QoS information for all road segments or sub-segments belonging to the alternative routes.

A sixth set of embodiments of the present invention provides for a method, comprising: transmitting, from a UE toward a control plane function, a Quality of Service (QoS) experience report, the transmitting performed via a control plane interface and using a background data transfer service. In some such embodiments, the control plane function is a NWDAF.

Additionally or alternatively, the sixth set of embodiments of the present invention provides for a method, comprising: receiving, by a control plane function, one or more QoS experience reports from a UE; correlating contents of the one or more QoS experience reports with one or more of: RAN PDU Session Context comprising RAN radio transmission parameters; PDU Session context; RAN node ID; Cell ID; time of the day; and day of the week; and providing, based on results of said correlating, QoS statistical data for a corresponding time, location, road segments, (R)AN node, network cell, or a combination thereof.

In some of these sixth set of embodiments, the method further includes storing the QoS statistical data. In some of these sixth set of embodiments, the control plane function is a NWDAF.

According to other ones of the first to sixth sets of embodiments as described above, there is provided an apparatus operative with a communication network and comprising a processor operatively coupled to a memory, the apparatus configured to perform operations according to the above-described methods.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A method comprising:
receiving, by a network data analytics function (NWDAF), a message from an application function (AF) through a network exposure function (NEF), wherein the message is indicative of a request or a subscription of the AF to data analytics information associated with network quality of service (QOS) information of one or more user equipment (UE), wherein the message includes: UE location of the one or more UE, a start time and an end time indicating a time duration for which the network QoS information of the one or more UE is applicable, a QoS level, and threshold value(s) of QOS parameters in the QOS level wherein the threshold value(s) of the QoS parameters is associated with a condition to trigger the data analytics;

collecting, by the NWDAF, network data for producing the data analytics information;

obtaining the data analytics information, by the NWDAF, by performing data analytics using information in the message and the network data, wherein the data analytics information indicates a threshold value which is met or exceeded, a location at which the threshold value is met or exceeded and a time period during which the threshold value is met or exceeded;

sending, by the NWDAF to the AF through the NEF, the data analytics information in response to the message, wherein the data analytics information is used for an adjustment in operation of the one or more UE based on the data analytics information.

2. The method according to claim 1, wherein the QoS level comprises the QoS parameters and their values for one or more of the UE location or the time duration.

3. The method according to claim 1, wherein the message further includes single network slice selection assistance information (S-NSSAI) associated with the data analytics.

4. The method according to claim 1, wherein the UE location is a cell ID of an access network (AN) node.

5. The method according to claim 1, wherein the UE location indicates a geographical UE location and/or a road segment.

6. The method according to claim 1, wherein the data analytics information includes statistics indicating the threshold value which is met or exceeded, the location at which the threshold value is met or exceeded, and the time period at which the threshold value is met or exceeded, the time period being prior to a current time.

7. The method according to claim 1, wherein the data analytics information includes predictions indicating the threshold value which is met or exceeded, the location at which the threshold value is met or exceeded, and the time period at which the threshold value is met or exceeded, the time period being a future time period.

8. The method according to claim 1, wherein the QoS parameters includes one or more of packet delay budget (PDB) and packet error rate (PER).

9. A network data analytics function (NWDAF), comprising: at least one processor and a non-transitory computer readable storage medium including instructions to be performed by the at least one processor to configure the NWDAF to:

receive a message from an application function (AF) through a network exposure function (NEF), wherein the message is indicative of a request or a subscription of the AF to data analytics information associated with network quality of service (QOS) information of one or more user equipment (UE), wherein the message includes: UE location of the one or more UE, a start time and an end time indicating a time duration for which the network QoS information of the one or more UE is applicable, a QoS level, and threshold value(s) of QoS parameters in the QoS level wherein the threshold value(s) of the QoS parameters is associated with a condition to trigger the data analytics;

collect network data for producing the data analytics information;

obtain the data analytics information by performing data analytics using information in the message and the network data, wherein the data analytics information indicates a threshold value which is met or exceeded, a location at which the threshold value is met or exceeded and a time period during which the threshold value is met or exceeded;

send to the AF through the NEF, the data analytics information in response to the message, wherein the data analytics information is used for an adjustment in operation of the one or more UE based on the data analytics information.

10. The NWDAF according to claim 9, wherein the QoS level comprises the QoS parameters and their values for one or more of the UE location or the time duration.

11. The NWDAF according to claim 9, wherein the message further includes single-network slice selection assistance information (S-NSSAI) associated with the data analytics.

12. The NWDAF according to claim 9, wherein the UE location is a cell ID of an access network (AN) node.

13. The NWDAF according to claim 9, wherein the UE location indicates a geographical UE location and/or a road segment.

14. The NWDAF according to claim 9, wherein the data analytics information includes statistics indicating the threshold value which is met or exceeded, the location at which the threshold value is met or exceeded, and the time period at which the threshold value is met or exceeded, the time period being prior to a current time.

15. The NWDAF according to claim 9, wherein the data analytics information includes predictions indicating the threshold value which is met or exceeded, the location at which the threshold value is met or exceeded, and the time period at which the threshold value is met or exceeded, the time period being a future time period.

16. The NWDAF according to claim 9, wherein the QoS parameters includes one or more of packet delay budget (PDB) and packet error rate (PER).

* * * * *